(12) United States Patent
Fiscus et al.

(10) Patent No.: US 7,985,804 B2
(45) Date of Patent: Jul. 26, 2011

(54) RUBBER TOUGHENED COMPOSITIONS, ARTICLES, FILMS, AND METHODS OF MAKING THE SAME

(75) Inventors: David Michael Fiscus, Houston, TX (US); Narayanaswami Raja Dharmarajan, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 403 days.

(21) Appl. No.: 11/818,981

(22) Filed: Jun. 15, 2007

(65) Prior Publication Data

US 2008/0106005 A1 May 8, 2008

Related U.S. Application Data

(60) Provisional application No. 60/857,196, filed on Nov. 6, 2006.

(51) Int. Cl.
C08L 45/00 (2006.01)
C08L 23/00 (2006.01)
C08L 23/04 (2006.01)
C08F 8/00 (2006.01)

(52) U.S. Cl. ........ 525/240; 525/191; 525/232; 525/211; 428/500; 428/523; 428/521

(58) Field of Classification Search ........... 525/232, 525/240, 191, 211; 428/500, 523, 521
See application file for complete search history.

(56) References Cited

U.S. PATENT DOCUMENTS

| | | | |
|---|---|---|---|
| 4,774,277 A * | 9/1988 | Janac et al. | 524/474 |
| 4,808,561 A | 2/1989 | Welborn, Jr. | |
| 4,851,478 A | 7/1989 | Su | |
| 5,017,714 A | 5/1991 | Welborn, Jr. | |
| 5,055,438 A | 10/1991 | Canich | |
| 5,064,802 A | 11/1991 | Stevens et al. | |
| 5,096,867 A | 3/1992 | Canich | |
| 5,124,418 A | 6/1992 | Welborn, Jr. | |
| 5,153,157 A | 10/1992 | Hlatky et al. | |
| 5,198,401 A | 3/1993 | Turner et al. | |
| 5,240,894 A | 8/1993 | Burkhardt et al. | |
| 5,264,405 A | 11/1993 | Canich | |
| 5,324,800 A | 6/1994 | Welborn, Jr. et al. | |
| 5,507,475 A | 4/1996 | Seel et al. | |
| 5,663,236 A | 9/1997 | Takahashi et al. | |
| 5,932,659 A | 8/1999 | Bambara et al. | |
| 5,993,922 A | 11/1999 | Babrowicz et al. | |
| 6,150,467 A * | 11/2000 | Dharmarajan et al. | 525/211 |
| 6,207,756 B1 * | 3/2001 | Datta et al. | 525/191 |
| 6,221,963 B1 * | 4/2001 | Kobayashi et al. | 525/191 |
| 6,271,311 B1 * | 8/2001 | Ravishankar et al. | 525/191 |
| 6,303,688 B1 * | 10/2001 | Schauder | 525/63 |
| 6,319,998 B1 * | 11/2001 | Cozewith et al. | 526/65 |
| 6,329,477 B1 * | 12/2001 | Harrington et al. | 526/65 |
| 6,331,592 B1 | 12/2001 | Wong | |
| 6,376,410 B1 | 4/2002 | Burkhardt et al. | |
| 6,380,122 B1 | 4/2002 | Kuchta et al. | |
| 6,492,010 B1 | 12/2002 | Karaoglu et al. | |
| 6,686,419 B2 * | 2/2004 | Wouters et al. | 525/237 |
| 6,723,794 B2 | 4/2004 | Kawasaki et al. | |
| 6,825,253 B2 | 11/2004 | Easter | |
| 7,199,189 B2 * | 4/2007 | Ravishankar et al. | 525/191 |
| 2004/0176540 A1 | 9/2004 | Nishihara | |
| 2004/0260025 A1 * | 12/2004 | Ravishankar et al. | 525/240 |

FOREIGN PATENT DOCUMENTS

| | | |
|---|---|---|
| CA | 1268753 | 5/1990 |
| EP | 0 277 003 | 8/1988 |
| EP | 0 277 004 | 8/1988 |
| EP | 0 520 732 | 12/1992 |
| EP | 0 426 637 | 4/1995 |
| EP | 0 570 982 | 1/1997 |
| EP | 0 495 375 | 2/1997 |
| EP | 0 500 944 | 10/1998 |
| EP | 0 573 403 | 11/1998 |
| EP | 0 129 368 | 7/1999 |
| EP | 0 963 409 | 4/2003 |
| GB | 2 128 899 | 5/1984 |
| WO | 91/09882 | 7/1991 |
| WO | 92/00333 | 1/1992 |
| WO | 94/03506 | 2/1994 |
| WO | 96/11960 | 4/1996 |
| WO | 96/11961 | 4/1996 |
| WO | 96/37899 | 11/1996 |
| WO | 97/00288 | 1/1997 |
| WO | 98/56012 | 12/1998 |
| WO | 00/29195 | 5/2000 |
| WO | 01/98409 | 12/2001 |
| WO | 03/068859 | 8/2003 |
| WO | 2006/116287 | 11/2006 |

OTHER PUBLICATIONS

VerStrate, Gary, "Ethylene-Propylene Elastomers", Encyclopedia of Polymer Science and Engineering, vol. 6, John Wiley & Sons (1986), pp. 522-561.
Paul J. Flory "Principles of Polymer Chemistry", Cornell University Press, (1953), p. 310.
Rooney, et al., "On Line Determination by Light Scattering of Mechanical Degradation in the GPC Process", J. Cazes editor, Marcel Dekker. 1981, pp. 207-235.
Cho et al., Miscibility and Processability in Linear Low Density Polyethylene and Ethylene-Propylene-Butene-1 Terpolymer Binary Blends, J Appl Polym sci 63: 1265-1274, 1997.

* cited by examiner

*Primary Examiner* — Vasu Jagannathan
*Assistant Examiner* — Irina Krylova
(74) *Attorney, Agent, or Firm* — Frank E. Reid

(57) ABSTRACT

This invention relates to a composition comprising (a) from about 5 to about 50 weight % mEPDM; and (b) from about 95 weight % to about 50 weight % of a first mPE, wherein the weight % is based on the total weight of the mEPDM and the mPE. This invention further relates to films and articles made from the compositions and methods of making the compositions, films and articles.

17 Claims, 38 Drawing Sheets

MD Load Bearing Capability of Exceed 1018 Film vs Minor Component Loading by Minor Component Type TD Load Bearing Capability of Exceed 1018 Film vs Minor Component Loading by Minor Component Type MD Load Bearing Capability of Exceed 1018 Film vs Minor Component Loading by Minor Component Type Ultimate Load Bearing Capability of Exceed 1018 Film vs Minor Component Loading by Minor Component Type Ultimate Elongation of Exceed 1018 Film vs Minor Component Loading by Minor Component Type Ultimate Load Bearing Capability of Exceed 1018 Film vs Minor Component Loading by Minor Component Type Tear Resistance of Exceed 1327 Film vs Minor Component Loading by Minor Component Type Tear Resistance of Exceed 1327 Film vs Minor Component Loading by Minor Component Type Ultimate Load Bearing Capability of Exceed 1327 Film vs Minor Component Loading by Minor Component Type Ultimate Elongation of Exceed 1327 Film vs Minor Component Loading by Minor Component Type MD Load Bearing Capability of HDPE Films vs Minor Component Loading by Minor Component Type MD Ultimate Strength of HDPE Films vs Minor Component Loading by Minor Component Type TD Ultimate Strength of HDPE Films vs Minor Component Loading by Minor Component Type MD Elongation at Break of HDPE Films vs Minor Component Loading by Minor Component Type

US 7,985,804 B2

RUBBER TOUGHENED COMPOSITIONS, ARTICLES, FILMS, AND METHODS OF MAKING THE SAME

CROSS REFERENCE TO RELATED APPLICATIONS

This application claims priority to Provisional application filed on Nov. 6, 2006, U.S. Ser. No. 60/857,196.

FIELD OF THE INVENTION

The present invention relates, generally, to polymer blends of high levels of a first polymer resin(s) and low levels of a low density modifier(s), and more particularly, to polymer blends of high levels of polyethylene resin(s) and low levels of an elastomeric polymer(s) and methods of producing the same. This invention also relates, generally, to films and articles made from polymer blends, and methods of producing the same.

BACKGROUND OF THE INVENTION

Polyolefins are often blended with elastomers in an effort to improve the toughness and processability of a the polyolefin. Various methods of blending polyolefins with elastomers have been explored. In one method, the polyolefin is compounded with bales of elastomer to create a masterbatch. Additional polyolefin are then typically added to the masterbatch at the hopper of an extruder, and the materials are extruded.

Many blends of polyolefins and elastomers have been tried to improve toughness and improve processability. None so far have achieved such.

For example, WO 96/037899 discloses a composition suitable for making the dielectric of a medium-voltage cable comprising, in parts by weight: polymer base, of which at least 50 parts are ethylene copolymer rubber and the balance, if any, polyethylene 100, mineral filler of which at least half is calcined clay 40-120, surface treatment agent for the filler 1-6, zinc oxide 10-30, lead compounds not to exceed 1 calculated as element and appropriate amounts of conventional ingredients comprising an antioxidant, a curing system and a processing aid.

WO 97/000288 discloses a thermoplastic elastomer comprising an elastomeric polymer, a thermoplastic and a curative, wherein the curative is present in the thermoplastic polymer in an amount effective to yield a cure level of the elastomeric polymer of at least 95 percent, preferably at least 97 percent, characterized in that the elastomeric polymer is an ethylene, alpha-olefin, vinyl norbornene, wherein the elastomeric polymer has a Mw/Mn greater than 6, preferably above 10 and wherein the elastomeric polymer has a branching index below 0.6.

WO 98/056012 discloses a cable coating compound based on Superohm 3728, having an electrical dissipation factor less than about 0.6%, a Mooney viscosity of less than about 35 ML (1+8) 100° C., a cure state above about 90 dN·m/min, a tensile strength above about 8.5 MPa, a cure rate above about 100 dN·m/min, and an elongation above about 250%, comprising a) an ethylene, propylene, 5-vinyl-2-norbornene elastomeric polymer having a branching index up to about 0.4, and a Mw/Mn greater than about 10; and b) 5-20 parts per hundred parts of said elastomeric polymer of an ethylene alpha-olefin copolymer having a Mw/Mn less than about 3, a CDBI greater than about 50% and a density in the range of from 0.86-0.92 g/cc. This patent discloses using 5-20 parts per hundred of the ethylene alpha-olefin copolymer.

WO 00/029195 discloses a process for the preparation of a rigid polyolefin article comprising coextruding a polyolefin resin and a friction material resin comprising from 1 to 100% by weight of a friction-increasing material and from 99% to 0% by weight of said polyolefin resin whereby to produce a polyolefin object having an external surface layer of said friction material resin on a substrate layer of said polyolefin resin, and if necessary forming said polyolefin object into said rigid article.

WO 03/068859 discloses a thermoplastic elastomer composition comprising a thermoplastic polyolefin, an elastomer and oil characterized in that it comprises less than 15% by weight of the thermoplastic polyolefin, relative to the total weight of the thermoplastic elastomer composition, the elastomer is peroxide vulcanized and the weight ratio oil/elastomer is above 1.5.

U.S. Pat. No. 5,993,922 discloses a multilayer film having at least one layer of said film containing a PCE composition comprising (i) copolymer having polymeric units derived from (a) at least one polyene monomer, (b) at least one C2-C20 olefinic monomer and, optionally, (c) at least one copolymerizable monomer other than (a) or (b); or (ii) polymer mixture composed of at least one polymer having polymeric units derived from (a) at least one polyene monomer, and at least one polymer having polymeric units derived from (b) at least one C2-C20 olefinic monomer and, optionally, at least one copolymerizable monomer other than (a) or (b); wherein each of at least one layer formed with PCE composition being crosslinked to a greater degree than at least one other layer of said film and wherein at least one layer forming a major surface of the film is sealable. This patent does not teach using more than 10 weight % of the metallocene catalyzed ethylene-propylene-diene monomer.

U.S. Pat. No. 5,932,659 discloses a polymer blend comprising a single-site initiated polyolefin resin having a density below 0.878 g/cm3 and no more than 40 weight percent of a polyolefin including repeating units derived from ethylene and propylene, wherein a portion of the polymer blend is cross-linked and the polymer blend is capable of being formed into a shaped article.

U.S. Pat. No. 6,221,963 discloses a thermoplastic elastomer based on olefin exhibiting the following characteristics (1) to (3): $8.18 \leq Y - 0.43X \leq 27$, (1) wherein X denotes a JIS A-hardness value of the thermoplastic elastomer based on olefin determined according to the prescription of JIS K 6301, and Y represents a permanent compressive strain value, of the thermoplastic elastomer based on olefin determined according to the prescription of JIS K 6301 under a condition of 70° C.×22 hours, (2) a tensile strength in the range from 5 to 30 MPa determined according to the prescription of JIS K 6301, and (3) a permanent elongation value of 18% or less determined according to the prescription of JIS K 6301.

U.S. Pat. No. 6,723,794 discloses an olefin thermoplastic elastomer composition comprising a crystalline polyolefin resin (A) in an amount of not less than 10 parts by weight and less than 60 parts by weight and an ethylene/alpha-olefin/ nonconjugated polyene copolymer rubber (B) which comprises ethylene, an alpha-olefin of 3 to 20 carbon atoms and a nonconjugated polyene in an amount of not more than 90 parts by weight and more than 40 parts by weight, the total amount of said components (A) and (B) being 100 parts by weight, and which is dynamically heat treated to be partially or completely crosslinked, wherein the ethylene/alpha-olefin/nonconjugated polyene copolymer rubber (B) is obtained by randomly copolymerizing ethylene, an alpha-olefin of 3 to 20 carbon atoms and a nonconjugated polyene in the presence of a metallocene catalyst, wherein said polyene contains only one carbon-to-carbon double bond, in one molecule, polymerizable by the metallocene catalyst among carbon-to carbon double bonds, wherein said copolymer rubber (B) has a long-chain branched structure, and has the following properties: (1) said copolymer rubber contains (a) units derived from ethylene and (b) units derived from the alpha-olefin of 3 to 20 carbon atoms in a molar ratio of 40/60 to 95/5; (2) the iodine value is in the range of 1 to 50, in terms of grams based on 100 grams of the copolymer rubber (B); (3) the intrinsic viscosity ($\eta$), as measured in decalin at 135° C., is in the range of 0.1 dl/g to 10 dl/g; and (4) the ratio g$\eta$* of the intrinsic viscosity ($\eta$) of said copolymer rubber (B) determined in the property (3) to the intrinsic viscosity ($\eta$)blank of a linear ethylene/propylene copolymer having the same weight-average molecular weight, measured by a light scattering method, as the copolymer rubber (B) and having an ethylene content of 70% by mol, ($\eta$)/($\eta$)blank, is 0.2 to 0.95.

U.S. Pat. No. 6,825,253 discloses an insulation composition for electric cable comprising (a) a base polymer comprising at least 20% by weight of ethylene-octene metallocene copolymer; (b) from about 10% to about 60% by weight of a filler; and (c) an additive comprising a blend of: (i) an amine antioxidant, and (ii) at least about 0.5% by weight based on said composition of a hindered amine light stabilizer, wherein the weight ratio of the stabilizer to the antioxidant is greater than 25:75.

US Publication No. 2004/0176540 discloses a vulcanized thermoplastic olefinic rubber composition comprising at least one vulcanizable rubber (A) selected from the group consisting of ethylene-alpha-olefin copolymers, which contain an ethylene unit and a unit of an alpha-olefin having 3 to 20 carbon atoms, and which are produced with use of a metallocene catalyst, and an olefinic resin (B), wherein X and Y as defined below of said (A) are from 1 to 40% and from 0.02 to 0.5, respectively, X=(W2/W0)×100(%) Y=W2/W1 wherein W1 is a weight of a swollen vulcanized rubber (A), which is obtained when (A) in an amount of W0 is extracted with hot xylene, and W2 is a weight measured after drying of the above-mentioned swollen vulcanized rubber (A).

In the above polymer blends, however, the incorporation of a polyolefin increases processability at the expense of toughness, and the incorporation of an elastomer increases toughness at the expense of processability. Additionally, the incorporation of too much of some polyolefins yields blends which are often not cost effective. Accordingly, what is needed are polymer blends that have improved toughness and processability or polymer blends that improve toughness at only a minor expense of processability. Likewise polymer blends having improved processability with no or little reduction in toughness are also desired. Additionally, there is a need for simple and cost effective methods of blending the polymers.

SUMMARY OF THE INVENTION

Definitions

For the purpose of this invention and the claims thereto, polyethylene(s) may be referred to as "PE(s)"; low density polyethylene may be referred to as "LDPE"; linear low density polyethylene may be referred to as "LLDPE"; medium density polyethylene may be referred to as "MDPE"; linear medium density polyethylene may be referred to as "LMDPE"; and high density polyethylenes may be referred to as "HDPEs". PEs produced using metallocene catalysts may be referred to using the prefix "m" before one of the above designations, e.g., mLLDPE or mHDPE.

For the purposes of this invention and the claims thereto, molecular weight distribution ("MWD") is equivalent to the expression Mw/Mn.

For purposes of this invention and the claims thereto, the terms "polyethylene" and "ethylene polymer" mean a polyolefin comprising at least 50 mol % ethylene units and having less than 15 mol % propylene units. Preferably the "polyethylene" and "ethylene polymer" comprise at least 60 mol %, preferably at least 70 mol %, preferably at least 80 mol %, even preferably at least 90 mol %, even preferably at least 95 mol % or preferably 100 mole %) ethylene units; and have less than 15 mol % propylene units. Thus, while ethylene-rich ethylene-propylene copolymers are generically a class of ethylene copolymer, a special distinction is made herein for the composition range commonly associated with EP Rubber, as defined below. The comonomers in an ethylene copolymer, if present, are preferably chosen from C3 to C20 olefins (preferably C3 to C8 1-olefins).

For purposes of this invention and the claims thereto, an "ethylene elastomer" is an ethylene copolymer having a density of less than 0.86 g/cm3. An "ethylene plastomer" (or simply a "plastomer") is an ethylene copolymer having a density of 0.86 to 0.91 g/cm3. A "low density polyethylene" is an ethylene polymer having a density of more than 0.91 g/cm3 to less than 0.94 g/cm3; this class of polyethylene includes copolymers made using a heterogeneous catalysis process (often identified as linear low density polyethylene, LLDPE) and homopolymers or copolymers made using a high-pressure/free radical process (often identified as LDPE). A "high density polyethylene" ("HDPE") is an ethylene polymer having a density of 0.94 g/cm3 or more.

For purposes if this invention and the claims thereto, the term "EP Rubber" means a copolymer of ethylene and propylene, and optionally one or more diene monomer(s), where the ethylene content is from 35 to 85 mol %, the total diene content is 0 to 5 mol %, and the balance is propylene with a minimum propylene content of 15 mol %; and where the copolymer has a Mooney viscosity, ML(1+4)@(125° C. (measured according to ASTM D1646) of 15 to 100.

For the purpose of this invention and the claims thereto, Mooney Viscosity is measured as ML (1+4) at 125° C. in Mooney units according to ASTM D1646 and the Mooney small thin test (MST) as described below. Viscoelastic properties are measured using a Rubber Process Analyzer, RPA 2000® (instrument from Alpha Technologies. The elastic modulus (G'), the loss modulus (G") and tan δ (G"/G') are measured at the shear rate of 0.21 sec$^{-1}$. The temperature for these measurements is 60° C.

For the purpose of this invention and the claims thereto, ethylene content is determined according to FTIR according to ASTM D3900, and ENB content by FTIR per ASTM method D6047.

For the purpose of this invention and the claims thereto, all percentages are weight percent based on the total weight of the blend, unless otherwise stated or indicated by context.

For the purpose of this invention and the claims thereto, all molecular weights are weight average molecular weight unless otherwise noted. Molecular weights (weight average molecular weight (Mw) and number average molecular weight (Mn) are measured by GPC (Gel Permeation Chromatography) on a Waters 150 gel permeation chromatograph equipped with a differential refractive index (DRI) detector and a Chromatix KMX-6 on line light scattering photometer. This technique is discussed in "Liquid Chromatography of Polymers and Related Materials III", J. Cazes editor, Marcel Dekker. 1981, p. 207, which is incorporated herein by reference, and explained further below.

Other properties were measured as follows:

| No. | Test | Test Method | Units |
|---|---|---|---|
| 1 | EP(D)M Polymer Ethylene Composition | ASTM D3900 | Wt % |
| 2 | EP(D)M Polymer Ethylidene Norbornene Composition | ASTM D6047 | Wt % |
| 3 | Mooney Viscosity (ML 1 + 4, 1256° C.) | ASTM D1646 | Mooney Units (MU) |
| 4 | Mooney Scorch | ASTM D2084 | MU |
| 5 | Hardness | ASTM D2240 | Shore A |
| 6 | 1% Secant Modulus | ASTM D882 | MPa |
| 7 | Tensile Strength | ASTM D882 | kPa (kN/m$^2$) |
| 8 | Haze | ASTM D1003 | % |
| 9 | Gloss | ASTM D2457 | % |
| 10 | Average Gauge Micrometer | ASTM D374 | microns |
| 11 | Film Density | ASTM D1505 | g/cc |
| 12 | DSC | ASTM 3417 | |
| 13 | Melt Index | ASTM D1238 (230° C., 2.16 kg) | dg/min |
| 14 | Elongation | ASTM D412 | % |
| 15 | Tear Strength- Die C | ASTM D624 | MPa |
| 16 | Elmendorf Tear | ASTM D1922 | MPa |
| 17 | Puncture Force | ASTM D5748 | g/micron |
| 18 | Puncture Energy | ASTM D1709 | N/micron |
| 19 | Dart Drop | ASTM D1709-91, method A and B as indicated | g/micron |

In an embodiment, the present invention provides a composition comprising a blend of:

(a) from about 11 to about 35 weight % (based upon the weight of the blend) of a low density modifier having a density less than 0.89 g/cc and an Mw of 50,000 or more; and (b) from about 89 to about 65 weight % (based upon the weight of the blend) of an ethylene polymer having a density ranging from 0.910 g/cc to less than 0.940 g/cc, a CDBI of greater than 60% and an Mw/Mn greater than 1 and less than 5.

In a preferred embodiment, the density of the low density modifier is at least 0.01 g/cc lower than the density of the ethylene polymer. Alternately the density of the low density modifier is at least 0.015 g/cc lower than the density of the ethylene polymer. Alternately the density of the low density modifier is at least 0.02 g/cc lower than the density of the ethylene polymer. Alternately the density of the low density modifier is at least 0.03 g/cc lower than the density of the ethylene polymer. Alternately the density of the low density modifier is at least 0.04 g/cc lower than the density of the ethylene polymer.

In another embodiment, the weight average molecular weights (Mw) of the low density modifier and the ethylene polymer are within 50% of each other, preferably within 25% or each other, preferably within 20% of each other. In another embodiment, the Composition Distribution Breadth Indicies (CDBIs) of the low density modifier and the ethylene polymer are within 50% of each other, preferably within 25% or each other, preferably within 20% of each other.

In an embodiment, the present invention provides a composition comprising: (a) from about 11 to about 35 weight % a low density modifier; and (b) from about 89 to about 65 weight % of a mLLDPE having a density ranging from about 0.910 to about 0.940 g/cc; and wherein the weight % is based on the total weight of the low density modifier and the mLLDPE.

In an alternative embodiment, the present invention provides a film having at least one layer, the at least one layer having a composition comprising: (a) from about 11 to about 35 weight % a low density modifier; and (b) from about 89 to about 65 weight % of a mLLDPE having a density ranging from about 0.910 to about 0.940 g/cc; and wherein the weight % is based on the total weight of the low density modifier and the mLLDPE.

In a still further embodiment, the present invention provides a process for making an article, the process comprising: (a) blending (i) from about 11 to about 35 weight % a low density modifier; and (ii) from about 89 to about 65 weight % of a mLLDPE having a density ranging from about 0.910 to about 0.940 g/cc; and wherein the weight % is based on the total weight of the low density modifier and the mLLDPE; and (b) forming the blend into the article.

In an alternative embodiment, the present invention provides a composition comprising a blend of:

(a) from about 11 to about 35 weight % (based upon the weight of the blend) of a low density modifier having a density less than 0.89 g/cc and an Mw of 50,000 or more; and (b) from about 89 to about 65 weight % (based upon the weight of the blend) of an HDPE having a density ranging from about 0.940 g/cc and less than 0.970 g/cc.

In an alternative embodiment, the present invention provides a composition comprising: (a) from about 11 to about 35 weight % low density modifier; and (b) from about 89 to about 65 weight % of an HDPE having a density ranging from about 0.940 g/cc and less than 0.970 g/cc; and wherein the weight % is based on the total weight of the low density modifier and the HDPE.

In an alternative embodiment, the present invention provides a film comprising at least one layer, the at least one layer having a composition comprising: (a) from about 11 to about 35 weight % low density modifier; and (b) from about 89 to about 65 weight % of an HDPE having a density ranging from about 0.940 g/cc and less than 0.970 g/cc; and wherein the weight % is based on the total weight of the low density modifier and the HDPE.

In an alternative embodiment, the present invention provides a process for making an article, the process comprising: (a) blending (i) from about 11 to about 35 weight % low density modifier; and (ii) from about 89 to about 65 weight % of an HDPE having a density ranging from about 0.940 g/cc and less than 0.970 g/cc; and wherein the weight % is based-on the total weight of the low density modifier and the HDPE; and (b) forming the blend into the article.

In an alternative embodiment, the present invention provides a composition comprising a blend of:

(a) from about 10 to about 40 weight % (based upon the weight of the blend) of a low density modifier having a density less than 0.89 g/cc and an Mw of 50,000 or more; and (b) from about 80 to about 20 weight % (based upon the weight of the blend) of an ethylene polymer having a density ranging from 0.910 g/cc to less than 0.940 g/cc, a CDBI of greater than 60% and an Mw/Mn greater than 1 and less than 5; and (c) from about 10 to about 40 weight % (based upon the weight of the blend) of an ethylene polymer having a density of 0.940 g/cc or more.

In an alternative embodiment, the present invention provides a composition comprising a blend of:

(a) from about 10 to about 40 weight % (based upon the weight of the blend) of a low density polyethylene having a density of 0.910 to less than 0.94 g/cc; and (b) from about 80 to about 20 weight % (based upon the weight of the blend) of a linear low density polyethylene having a density ranging from 0.910 g/cc to less than 0.940 g/cc, a CDBI of greater than 60% and an Mw/Mn greater than 1 and less than 5; and (c) from about 10 to about 40 weight % (based upon the weight of the blend) of a high density ethylene polymer having a density of 0.940 g/cc or more.

In an alternative embodiment, the present invention provides a composition comprising: (a) from about 5 to about 50 weight % a low density modifier; and (b) from about 95 to about 50 weight % of an ethylene polymer having a density ranging from 0.910 g/cc to less than 0.940 g/cc, a CDBI of greater than 60% and an Mw/Mn greater than 1 and less than 5 (preferably an mLLDPE having a density ranging from about 0.910 to about 0.940 g/cc); and wherein the weight % is based on the total weight of the low density modifier and the mLLDPE, and wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

In an alternative embodiment, the present invention provides a film comprising at least one layer, the at least one layer having a composition comprising: (a) from about 5 to about 50 weight % a low density modifier; and (b) from about 95 to about 50 weight % of a mLLDPE having a density ranging from about 0.910 to about 0.940 g/cc; and wherein the weight % is based on the total weight of the low density modifier and the mLLDPE, and wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

In an alternative embodiment, the present invention provides a process for making an article, the process comprising: (a) blending (i) from about 5 to about 50 weight % a low density modifier; and (ii) from about 95 to about 50 weight % of a mLLDPE having a density ranging from about 0.910 to about 0.940 g/cc; and wherein the weight % is based on the total weight of the low density modifier and the mLLDPE, and wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend; and (b) forming the m-EPDM-mPE blend into the article; wherein the weight % is based on the total weight of the mEPDM and the mLLDPE.

In an alternative embodiment, the present invention provides a film comprising at least one layer, the at least one layer having a composition comprising: (a) from about 5 to about 50 weight % low density modifier; and (b) from about 90 to about 50 weight % of an HDPE having a density ranging from about 0.940 g/cc and less than 0.970 g/cc; and wherein the weight % is based on the total weight of the low density modifier and the HDPE, and wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

In an alternative embodiment, the present invention provides a process for making an article, the process comprising: (a) blending (i) from about 5 to about 50 weight % low density modifier; and (ii) from about 90 to about 50 weight % of an HDPE having a density ranging from about 0.940 g/cc and less than 0.970 g/cc; and wherein the weight % is based on the total weight of the low density modifier and the HDPE, and wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend; and (b) forming the m-EPDM-mPE blend into the article; wherein the weight % is based on the total weight of the mEPDM and the mLLDPE.

In an alternative embodiment, the present invention provides a process for making a composition, the process comprising: blending (a) from about 5 to about 50 weight % pelletized mEPDM; and (b) from about 95 weight % to about 50 weight % of an mPE; wherein the weight % is based on the total weight of the mEPDM and the mPE.

In an alternative embodiment, the present invention provides a process for making a composition, the process comprising blending: from about 11 to about 35 weight % low density modifier; and (b) from about 89 to about 65 weight % of a PE; wherein the low density modifier and the PE are blended during the polymerization of the rubber.

In an alternative embodiment, the present invention provides a process for making a composition, the process comprising blending: from (a) about 11 to about 35 weight % low density modifier; and (b) from about 89 to about 65 weight % of a PE; wherein the low density modifier and the PE are blended during the polymerization of the PE.

In an alternative embodiment, the present invention provides a process for making a film, the process comprising: (1) blending: (a) from about 5 to about 95 weight % pelletized mEPDM; and (b) from about 95 weight % to about 5 weight % of a PE; to form a mEPDM-PE masterbatch: (2) blending: (a) from about 5 to about 95 weight % of the mEPDM-PE masterbatch; and (b) from about 95 weight % to about 5 weight % of an mPE; to form a mEPDM-PE-mPE blend comprising (a) from about 5 to about 50 weight % of the mEPDM; and (b) from about 95 weight % to about 50 weight % of the first mPE; and (3) forming the mEPDM-PE-mPE blend into a film; wherein the weight % is based on the total weight of the composition.

In an alternative embodiment, the present invention provides a process for making a film, the process comprising: (1) blending: (a) from about 5 to about 95 weight % pelletized mEPDM; and (b) from about 95 weight % to about 5 weight % of a PE; to form a mEPDM-PE masterbatch; and (2) blending: (a) from about 5 to about 95 weight % of the mEPDM-PE masterbatch; and (b) from about 95 weight % to about 5 weight % of an mPE; to form a mEPDM-PE-mPE blend comprising (a) from about 5 to about 50 weight % mEPDM; and (b) from about 95 weight % to about 50 weight % of a the mPE; and (3) forming the mEPDM-PE-mPE blend into the film; wherein the weight % is based on the total weight of the composition.

DETAILED DESCRIPTION OF THE INVENTION

Figure 1:
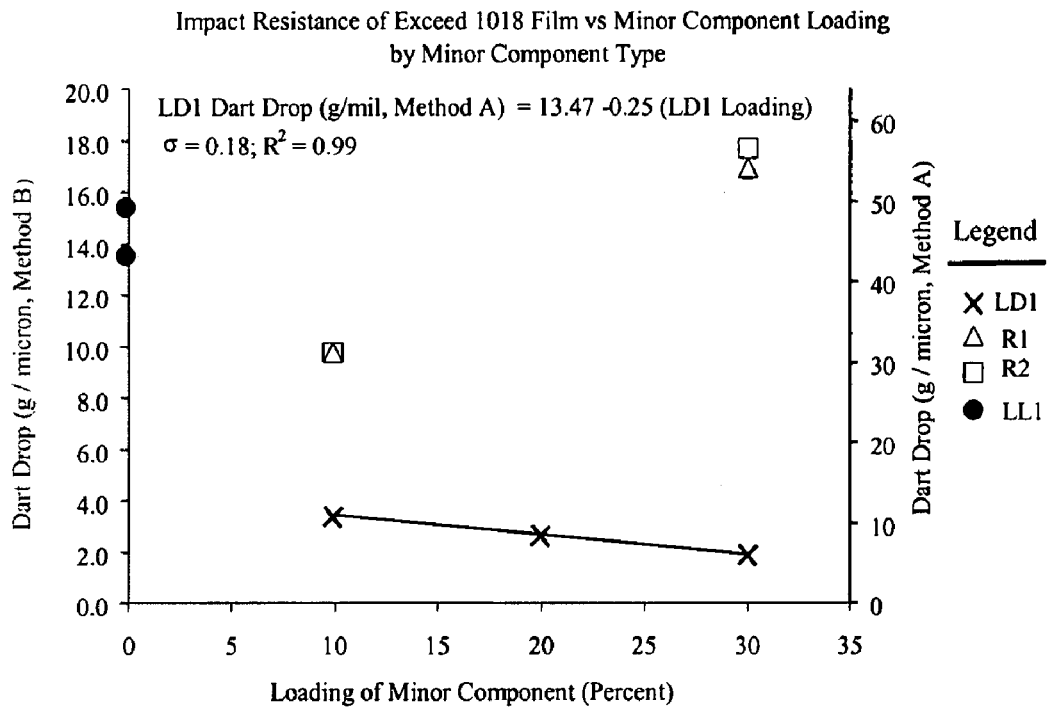
FIG. 1 is an illustration of an embodiment of the impact resistance of Exceed™ LLDPE 1018 versus the minor component loading by minor component type.

While the making and using of various embodiments of the present invention are discussed in detail below, it should be appreciated that the present invention provides many applicable inventive concepts, which can be embodied in a wide variety of specific contexts. The specific embodiments and figures discussed herein are merely illustrative and are not intended to limit the scope of the invention.

Polyethylene

Various types of PE(s) are known in the art. LDPE can be prepared at high pressure using free radical initiators and typically has a density in the range of 0.916 to less than 0.940 g/cm3. LDPE is also known as "branched" or "heterogeneously branched" polyethylene because of the relatively large number of long chain branches extending from the main polymer backbone. Polyethylene in the same density range, i.e., 0.916 to less than 0.940 g/cc, which is linear and does not contain large quantities of long chain branching is also known; this LLDPE can be produced with conventional Ziegler-Natta catalysts or with single site catalysts, such as metallocene catalysts, discussed further below. Relatively higher density LDPE or LLDPE, typically in the range of 0.928 to less than 0.940 g/cm3 are sometimes referred to as MDPE or LMDPE. PEs having still greater density may be referred to as HDPEs, i.e., polyethylenes having densities of 0.940 g/cm3 or more, and are generally prepared with Ziegler-Natta catalysts, chrome catalysts or even single site catalysts such as metallocene catalysts.

A "metallocene polyethylene" as used herein means a polyethylene produced by a metallocene catalyst. As used herein, the term "metallocene catalyst" is defined to be at least one metallocene catalyst component containing one or more substituted or unsubstituted cyclopentadienyl moieties (Cp) in combination with a Group 4, 5, or 6 transition metal (M), which is combined with an activator such as alumoxane (e.g., methylalumoxane, "MAO") and/or a non-coordinating anion ("NCA") in solution, slurry, high pressure, or gas phase. The catalyst and activator may be, independently, supported or unsupported, with the support being, when present, typically an inorganic oxide or chloride or a resinous material such as polyethylene.

The prior art discloses examples of metallocene catalysts/systems for producing metallocene polyethylene. Non-limiting examples of metallocene catalysts and catalyst systems useful in practicing the present invention include WO 96/11961; WO 96/11960; U.S. Pat. Nos. 4,808,561; 5,017,714; 5,055,438; 5,064,802; 5,124,418; 5,153,157; 5,324,800; more recent examples are U.S. Pat. Nos. 6,380,122; and 6,376,410; and WO01/98409, EP 0 963 409, and references cited therein.

Included within the definition of the "metallocene polyethylene" useful in the present invention are polyethylene resins having a low polydispersity (typically an Mw/Mn less than 2.5) as described, for instance, in U.S. Pat. No. 6,492,010, that is, a polydispersity produced by a catalyst variously described as "single site", "constrained geometry", or the aforementioned metallocene catalyst.

Metallocene or low polydispersity resins useful in the present invention are available from, among others, Dow Chemical Company, Exxon Chemical Company, and Chevron Phillips Chemical Company who are producers of single site or constrained geometry catalyzed polyethylenes. These resins are commercially available as the ENHANCED POLYETHYLENE™, ELITE™, AFFINITY™, EXACT™, EXCEED™, and MPACT™ polyethylene resins. Specifically, several commercial products produced with such catalyst/activator combinations are commercially available from ExxonMobil Chemical Company in Baytown, Tex. under the tradename EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438. TAFMER™ resins, available from Mitsui Chemical Company and also having low polydispersity, and having a density within the aforementioned range for LLDPE, are also useful in present invention.

Also useful in the present invention and included within the definition of metallocene polyethylenes are bimodal resins produced by catalyst systems having at least one metallocene catalyst. Particularly preferred examples are bimodal resins having as a component a resin produced using a single site, constrained geometry, or metallocene catalyst and having a density falling within the density range for LLDPE as previously described. Bimodal resins are well known in the art.

The MWD (Mw/Mn) can be measured directly by gel permeation chromatography techniques. Many typical Ziegler-Natta catalyzed polyethylenes have an MWD of 3 to 5, however, the MWD may range up to about 10. Single-site catalyzed-polyethylenes or metallocene-catalyzed polyethylenes generally have a lower MWD than the Zeigler-Natta catalyzed polyethylenes, typically the MWD of metallocene-catalyzed polyethylenes is approximately 2 to 4, preferably approximately 2 to 3. However, certain single-site-catalyzed polyethylenes may also have higher MWD values. In one embodiment the single-site catalyzed polyethylene or the metallocene-catalyzed polyethylene will have an MWD of about 4.5 to 6.5.

Polyethylene resins generally may also be characterized as homopolymers or copolymers of ethylene. Polymers having more than two types of monomers, such as terpolymers, are also included within the term "copolymer" as used herein.

Preferred ethylene polymer for use herein include ethylene homopolymers and copolymers. Preferred copolymers include those where ethylene is polymerized with one or more of alpha-olefins, such as C3-C20 alpha-olefins, and preferably C3-C12 alpha-olefins. The alpha-olefin comonomer can be linear or branched, and two or more comonomers can be used, if desired. Examples of suitable comonomers include linear C3-C12 alpha-olefins, and alpha-olefins having one or more C1-C3 alkyl branches, or an aryl group. Specific examples include propylene; 3-methyl-1-butene; 3,3-dimethyl-1-butene; 1-pentene; 1-butene; 1-pentene with one or more methyl, ethyl or propyl substituents; 1-hexene; 1-hexene with one or more methyl, ethyl or propyl substituents; 1-heptene with one or more methyl, ethyl or propyl substituents; 1-decene; 1-dodecene; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

If a comonomer is present in the copolymer then the comonomer is typically present at from about 0.1 to 35 wt % preferably 3 to 25 wt %, preferably 5 to 15 wt % The actual amount of comonomers will generally define the density range.

Low Density Modifier

For purposes of this invention and the claims thereto the term "low density modifier" is defined to mean an ethylene homopolymer of copolymer having a density of 0.90 g/cc or less. Preferably the low density modifier preferably has a density of 0.88 g/cc or less, preferably 0.86 g/cc or less, preferably 0.85 g/cc or less. In another embodiment, the low density modifier has a molecular weight (Mw) of 50,000 g/mol or more, alternately 100,000 g/mol or more, alternately 250,000 g/mol or more, alternately 500,000 g·mol or more. In another embodiment, the low density modifier has a heat of fusion (Hf) of 20 J/g or less, preferably 10 J/g or less, preferably 0 J/g or less. Heat of fusion is measured according to the procedure described below. In another embodiment, the low density modifier has a Mooney viscosity (ML 1+4, 125° C.) of 5 to 90, preferably 15 to 85, preferably 40 to 70. In another embodiment, the low density modifier has a melting point (Tm, DSC second melt) of 150° C. or less, alternately between −20° C. to 100° C., preferably between 0 and 75° C. In an alternate embodiment, the low density modifier has no measurable melting point (DSC).

The low density modifier may be any rubber including ethylene-propylene rubber ("EPM"), ethylene-propylene-diene monomer rubber ("EPDM"), metallocene-catalyzed EPM, (mEPM), EP Rubber (mEP Rubber) EPDM ("mEPDM"), and mEPDM formed in a reactor blend as described below. In a preferred embodiment the low density modifier is an ethylene/propylene copolymer having from 0 to 5 mol % diene, 35 to 85 mol % ethylene and from 15 to 65 mole % propylene, and having an Mw of 50,000 g/mol or more, alternately 100,000 g/mol or more, alternately 250,000 g/mol or more, alternately 500,000 g/mol or more; and a heat of fusion (Hf) of 20 J/g or less, preferably 10 J/g or less, preferably 0 J/g or less.

In another embodiment, the low density modifier is a mEPDM polymer. mEPDM polymers are terpolymers of ethylene, propylene and diene derived units as defined in ASTM D-1418-94. In an embodiment, the mEPDM has:

a) 10 to 30 wt. % (based upon the weight of the mEPDM) of a semi crystalline minor component having 40-77 wt. % ethylene derived units (based upon the weight of the semi-crystalline minor component); 0 to 10 weight percent diene derived units (based upon the weight of the semi-crystalline minor component); and alpha-olefin derived units having 3 to 10 carbon atoms making up the remainder of the minor component; and b) 70 to 90 weight percent (based upon the weight of the mEPDM) of an amorphous major component having 60 to 70 weight percent ethylene derived units (based upon the weight of the amorphous major component); 0 to 10 weight percent diene derived units (based upon the weight of the amorphous major component); and alpha olefin derived units having 3 to 10 carbon atoms making up the remainder of the major component; wherein the viscosity of the major component is less than one fourth the viscosity of the minor component, and wherein the mEPDM has a diene content of at least 0.5 weight percent based on the total weight of the mEPDM. As used herein the term "semicrystalline" is defined as having a discernable melting point as measured by DSC and a heat of fusion of at least 10 J/g. "Amorphous" is defined as either having an absence of a DSC melting point or having a heat of fusion less than 10 J/g. Further useful mEPDMs are described in U.S. Publication 2004/0260025, which is incorporated by reference in full.

In yet another embodiment, mEPDM polymers are metallocene catalyzed reactor blends of two components; a semi-crystalline minor component and an amorphous major component. As used herein the term "reactor blend" means that the components are blended during the polymerization process rather than after the polymerization process using mechanical means.

The semicrystalline minor component has from 65 to 75 weight percent ethylene derived units, preferably from 68 to 74 weight percent ethylene derived units, more preferably from 69 to 73 weight percent ethylene derived units based on the total weight of the minor component. Unless otherwise noted, ranges include the beginning and endpoints. If the minor component includes diene, then it contains no more than 10-weight percent diene derived units based on the total weight of the minor component. In one embodiment, the minor component contains 0.5 to 5 weight percent units derived from diene, more preferably from 1 to 4 weight percent diene derived units. Preferably, the diene is a non-conjugated diene illustrative examples of which include: dicyclopentadiene; alkyldicyclopentadiene; 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5,n-propylidene-2-norbornene, and 5-(2-methyl-2-butenyl)-2-norborene. 5-ethylidene-2-norbornene (ENB), 1,4-hexadiene, dicyclopentadiene (DCPD), norbornadiene, and 5-vinyl-2-norbornene (VNB) are preferred. ENB is preferred if a sulfur cure system is going to be used. The remainder of the minor component totaling 100 weight percent is derived from alpha-olefin units. The alpha-olefin has 3 to 10 carbon atoms, preferably 3, 4 or 6 carbon atoms, more preferably 3 carbon atoms, most preferably propylene.

The EPM/EPDM is the low density modifier, which is present in minor amount compared to the PE. Thus, in one embodiment, the minor major component is an EPM or EPDM rubber. The viscosity of the amorphous component measured by Mooney Small Thin ("MST") (5+4) @ 200° C. is preferably from 20 to 80, more preferably 30 to 70 and even more preferably from 55 to 70.

As used herein, Mooney viscosity is measured as ML(1+4@125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646 prescribes the dimensions of the rotor to be used within the cavity of the Mooney instrument. This method allows for both a large and a small rotor, differing only in diameter. These different rotors are referred to in ASTM D1646 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes at the end of which the Mooney reading is taken remains the same as the standard conditions. One MST point is approximately equivalent to 5 ML points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4 @125° C.) value equivalent. The MST rotor used herein was prepared and utilized according to the following specifications:

1. The rotor should have a diameter of 30.48+/−0.03 mm and a thickness of 2.8+/−0.03 mm (determined from the tops of serrations) and a shaft of 11 mm or less in diameter.

2. The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

4. The wear point (cone shaped protuberance located at the center of the top face of the rotor) shall be machined off flat with the face of the rotor.

The Mooney viscosity of a particular component of the blends produced herein is obtained herein using the relationship shown in Equation 1:

$$\log ML_{TOTAL} = n_A \log ML_A + n_B \log ML_B \quad \text{(Equation 1)}$$

wherein all logarithms are to the base 10; $ML_{TOTAL}$ is the Mooney viscosity of the blend of two polymers A and B each having individual Mooney viscosities $ML_A$ and $ML_B$, respectively; $n_A$ represents the weight percent (wt %) fraction of polymer A in the blend; and $n_B$ represents the weight percent fraction of the polymer B in the blend.

Equation (1) can be used to determine the Mooney viscosity of polymer B. Knowing ML, $ML_A$, $n_A$ and $n_B$, the value of $ML_B$ can be calculated.

However, for high Mooney viscosity polymers (i.e., Mooney viscosity greater than 100 ML(1+4@125° C.), $ML_A$ is measured using the MST rotor as described above. The Mooney viscosity of the low molecular weight polymer in the blend is then determined using Equation 1 above, wherein $ML_A$ is determined using the following correlation:

$$ML_A(1+4@125° C.) = 5.13 * MST_A(5+4@200° C.),$$

wherein $MST_A$ represents the Mooney viscosity of component A determined using the above described MST rotor.

In the event one wishes to determine the Mooney viscosity of a component of a reactor blend (e.g. where a first polymer is made then transferred to a second reactor where as second polymer is then made in an intimate blend with the first) Equation 1 may be used, where $ML_{Total}$ is the mooney viscosity of the neat polymer exiting the final reactor. $ML_A$ is the measured Mooney viscosity of the first polymer as it exits the first reactor, $ML_B$ is calculated from Equation 1, $n_A$ is the weight percent (wt %) fraction of polymer A in the reactor blend; and $n_B$ is the weight percent fraction of the polymer B in the reactor blend. The weight fractions of A and B are determined by withdrawing 1000 grams of neat polymer from the second reactor, fractionating the sample and determining the weight of the two major species, using polymer withdrawn from the first reactor as a comparator.

The amorphous major component has from 60 to 70 weight percent ethylene derived units, alternatively from 60 to 68 weight percent ethylene derived units, or from 60 to 66 weight percent ethylene derived units based on the total weight of the major component. If the major component includes diene, then it contains no more than 10 weight percent diene derived units based on the total weight of the major component. In one embodiment, the major component contains 0.5 to 5 weight percent units derived from diene, alternatively from 1 to 4 weight percent diene derived units. In another embodiment, the diene is as described above for the semicrystalline minor component. The remainder of the major component totaling 100 weight percent is derived from alpha-olefin units. The alpha-olefin has 3 to 10 carbon atoms, preferably 3, 4 or 6 carbon atoms, more preferably 3 carbon atoms. Thus the major component, like the minor component, may be an EPM or EPDM polymer.

The viscosity of the major component is calculated as follows: The ML of the blend and the MST of the minor component are independently measured. The minor component MST is multiplied by 5.13 to obtain the equivalent ML. Using Equation (1), the major component ML is calculated.

The value of major component ML thus obtained is less than one fourth (¼) the viscosity of the minor component, preferably from one fourth to one twentieth (¼ to ¹⁄₂₀), more preferably from one tenth to one twentieth (¹⁄₁₀ to ¹⁄₂₀) the viscosity of the minor component.

Both components will preferably have narrow MWD i.e., less than 5, preferably from 2 to 3, and more preferably from 2 to 2.5. And both components preferably have narrow compositions distributions, i.e., about 90% of the molecules in each component have an average ethylene content within 1% of bulk ethylene. Both components may be the same type of polymer, i.e., either an ethylene, alpha-olefin copolymer; an ethylene, alpha-olefin, diene terpolymer; an EPM polymer; or an EPDM polymer. In another embodiment, both components are EPM or EPDM polymers containing the same type of diene.

The EPDM blend preferably contains from 10 to 30 weight percent minor semicrystalline component and from 70 to 90 weight percent major amorphous component, based on the total weight of the blend. In one embodiment, the major amorphous component makes up from 70 to 85 weight percent of the blend, and the minor semicrystalline component makes up 15 to 30 weight percent of the blend, alternatively the major component makes up from 75 to 85 weight percent of the blend and the minor component makes up from 15 to 25 weight percent of the blend.

Whether from the major component, minor component or both, the diene content of one alternative blend is at least 0.5 weight percent, and in another alternative blend ranges from 0.5 to 5.0 weight percent based on the total weight of the blend, in a still further alternative blend from 1.0 to 4.0 weight percent.

The mEPDM blend may have an overall crystallinity of 1.5 percent or less (as measured by DSC), more preferably from 0.5 to 1.5 percent. (The percent crystallinity is calculated using the formula, [Heat of fusion (in Joules/gram) for the polymer in question/B (Joules/gram)]*100, where B is the heat of fusion for the homopolymer of the major monomer component. These values for B are to be obtained from the Polymer Handbook, Fourth Edition, published by John Wiley and Sons, New York 1999, except that a value of 189 J/g is used as the heat of fusion for homo-polypropylene, and a value of 290 J/g is used for home-polyethylene.

The Mooney Viscosity of the blend measured as ML(1+4) at 125° C. is from 40 to 80, and alternatively from 55 to 70. The molecular weight distribution of the mEPDM blend in one embodiment is narrow, i.e. from 2.0 to 5.0 or from 2.7 to 4.0.

In another embodiment, the mEPDM is substantially free of long chain branching, therefore, the branching index is at least 0.7, more preferably at least 0.8, even more preferably at least 0.9, and most preferably 1.0.

The relative degree of branching in ethylene, alpha-olefin, diene monomer elastomeric polymers is determined using a branching index factor (BI). This factor is calculated using a series of four laboratory measurements of polymer properties in solution, as disclosed in VerStrate, Gary, "Ethylene-Propylene Elastomers", Encyclopedia of Polymer Science and Engineering, 6, 2nd edition (1986), which is incorporated by reference herein. The four measurements are:

(i) weight average molecular weight ($M_w$) measured using a low angle laser light scattering detector (LALLS) in combination with Gel Permeation Chromatography (GPC), abbreviated herein as "$M_{w\ GPC\ LALLS}$";

(ii) weight average molecular weight ($M_w$) determined using a differential refractive index (DRI) detector in combination with GPC, and abbreviated herein as "$M_{w\ GPC\ DRI}$";

(iii) viscosity average molecular weight ($M_v$) determined using a differential refractive index (DRI) detector in combination with GPC, and abbreviated herein as "$M_{v\ GPC\ DRI}$"; and (iv) intrinsic viscosity (also referred to in the art as inherent viscosity, and abbreviated IV) measured in decalin at 135° C.

The first three measurements (i, ii, and iii) are obtained via GPC using a filtered dilute solution of the polymer in trichlorobenzene.

The average branching index factor (BI) as disclosed herein is defined by Equation (2) as:

$$BI = \frac{M_{v,br} \times M_{w,GPC\ DRI}}{M_{w,GPC\ LALLS} \times M_{v,GPC\ DRI}} \quad (2)$$

where, $M_{v,\ br}$=(IV/k) 1/a; wherein "k" is a measured constant from a linear polymer as described by Paul J. Flory at page 310 of PRINCIPLES OF POLYMER CHEMISTRY (1953), and the summation is over all the slices in the distribution, and wherein "a" is the Mark-Houwink constant (=0.759 for ethylene, propylene diene elastomeric polymers in decalin at 135° C.).

From equation (2) it follows that the average branching index factor for a linear polymer is 1.0. For branched polymers, the extent of branching is defined relative to a linear polymer. Since at a constant number average molecular weight $M_n$, $(M_w)_{branch} > (M_w)_{linear}$, BI for branched polymers is less than 1.0, and a smaller BI value denotes a higher level of branching. In instances wherein measuring IV in decalin is impossible, IV may be measured for comparison to the instant disclosure using a viscosity detector in tandem with DRI and LALLS detectors in a so-called GPC-3D instrument. In this case, "k" and "a" values are selected which are appropriate for the GPC solvent used in making the determination.

Blending Low Density Modifier and PE

In an embodiment, bales of the low density modifier and pelletized PE are pre-blended in a compounder to form a masterbatch. In an alternative embodiment, pellets of the low density modifier and pelletized PE are pre-blended in a compounder to form a masterbatch. Suitable compounders include any device or procedure that provides an intimate mixture of the polymeric components. For example, such devices include, but are not limited to a Carver press for melt pressing the components together or a Banbury mixer or a Brabender mixer for solution or melt blending of the components. Additional equipment used for continuous mixing procedures including single and twin screw extruders, static mixers, impingement mixers, as well as other machines and processes designed to disperse the components in intimate contact.

Once the masterbatch is formed an additional amount of the pelletized PE and the masterbatch are fed into the hopper of an extruder. Suitable extruders include those ordinarily known in the art as capable of forming a film, a sheet, a pipe, a blow molded part or an injection molded part. For example suitable extruders include a blown film extruder, a blow molding extruder, an injection molding extruder. Additionally, once the masterbatch is formed an additional amount of the pelletized PE and the masterbatch may be fed into a rotomolder.

In one embodiment, pellets of the low density modifier (such as a rubber) and pellets of PE (such as an (m)LLDPE, and or an HDPE) are blended together by being fed into the hopper of an extruder. In this embodiment, the low density modifier and pelletized PE are blended during extrusion and the step of forming a masterbatch is eliminated.

In one embodiment, the low density modifier (such as a rubber) and PE (such as an (m)LLDPE, and or an HDPE) are blended in situ, during the polymerization of the PE. In this embodiment, low density modifier (such as a rubber) is formed in a first reactor. The low density modifier (such as a rubber) is then passed into a second rector wherein PE (such as an (m)LLDPE, and or an HDPE) is contemporaneously polymerized in the presence of the rubber.

In an alternative embodiment, the low density modifier (such as a rubber) and PE (such as an (m)LLDPE, and or an HDPE) are blended in situ, during the polymerization of the low density modifier (such as a rubber). In this embodiment, a PE (such as an (m)LLDPE, and or an HDPE) is formed in a first reactor. The PE (such as an (m)LLDPE, and or an HDPE) is then passed into a second rector wherein low density modifier (such as a rubber) is contemporaneously polymerized in the presence of the PE (such as an (m)LLDPE, and or an HDPE).

Low Density Modifier and mLLDPE Blends

In an embodiment, a low density modifier and a mLLDPE are blended together in accordance with the above-stated methods of blending to produce a mLLDPE ("RmLLDPE"). The RmLLDPE has from about 11 to about 35 weight % low density modifier (such as a rubber); and from about 89 to about 65 weight % of an mLLDPE.

In one embodiment, the low density modifier is a mEPDM having a crystallinity ranging from about 0.5 to about 1.5 percent. In another embodiment, the mEPDM has a crystallinity ranging from about 0.65 to about 1.5 percent. In yet another embodiment, the mEPDM has a crystallinity ranging from about 0.75 to about 1.5 percent.

In one embodiment, the RmLLDPE has from about 11 to about 35 weight % low density modifier (such as a rubber). In another embodiment, the RmLLDPE has from about 11 to about 20 weight % low density modifier (such as a rubber).

In one embodiment, the RmLLDPE has from about 89 to about 70 weight % of the mLLDPE. In an embodiment, RmLLDPE has from about 89 to about 80 weight % of the mLLDPE.

In an embodiment, the mLLDPE of the RmLLDPE has a density greater than or equal to about 0.910 g/cc and less than about 0.935 g/cc. In another embodiment, the mLLDPE of the RmLLDPE has a density greater than or equal to about 0.916 g/cc and less than about 0.940 g/cc. In yet another embodiment, mLLDPE has a density greater than or equal to about 0.916 g/cc and less than about 0.929 g/cc.

In an embodiment, the mLLDPE of RmLLDPE has a molecular weight distribution of from about 1 to about 5. In another embodiment, the mLLDPE of RmLLDPE has a molecular weight distribution of from about 1 to about 3. In an embodiment, the mLLDPE of RmLLDPE has a molecular weight distribution of from about 2 to about 3.

In an embodiment, the mLLDPE of RmLLDPE has a melt index less than 7 g/10 minutes. In another embodiment, the mLLDPE of RmLLDPE has a melt index less than 5 g/10 minutes. In a further embodiment, the mLLDPE of RmLLDPE has a melt index less than 2 g/10 minutes.

In an embodiment, the mLLDPE of RmLLDPE has a CDBI of at least about 50%. In another embodiment, the mLLDPE of RmLLDPE has a CDBI of at least about 60%. In a further embodiment, the mLLDPE of RmLLDPE has a CDBI of at least about 70%. In a still further embodiment, the mLLDPE of RmLLDPE has a CDBI of at least about 80%. In a still further embodiment, the mLLDPE of RmLLDPE has a CDBI of from 60 to 80%.

The legend of FIG. 1 is defined in accordance with the examples below. With reference to FIG. 1 and in some embodiments, RmLLDPEs of the present invention are described by equation (a):

$$LD1\ MD\ \text{Elmendorf Tear} = 11.577 - 0.2861\ (LD1\ \text{Loading}) \quad (a)$$

wherein X is greater than or equal to 1, and Rubber Loading is defined as—the weight % of Rubber based on the total weight of Rubber and mLLDPE.

Figure 2:
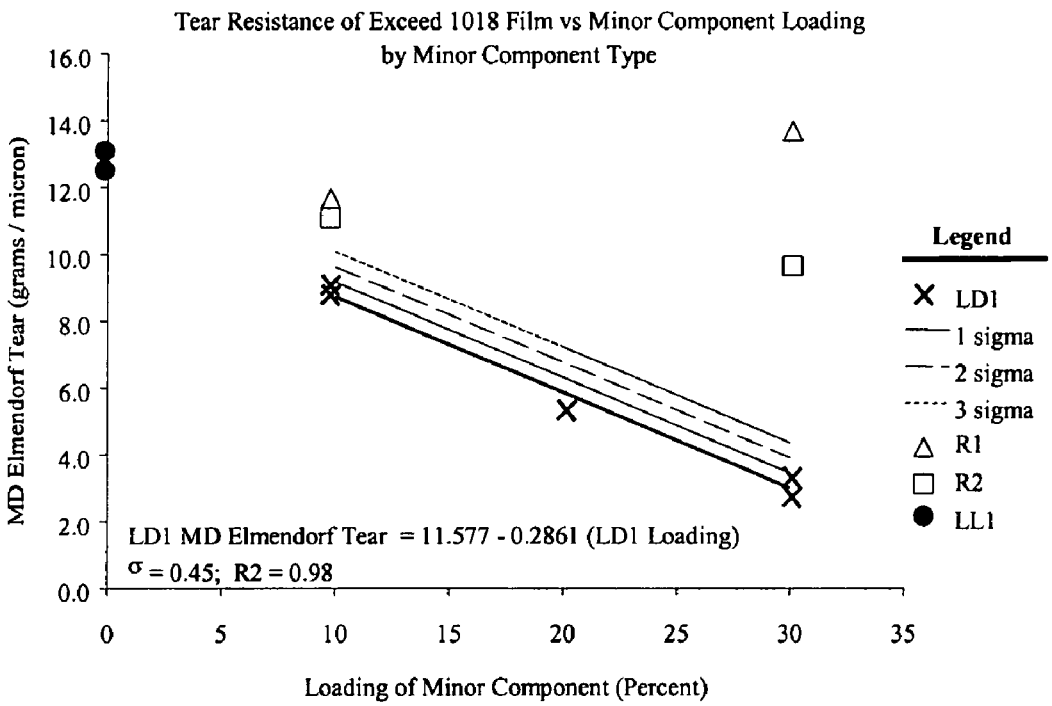
FIG. 2 is an illustration of an embodiment of the machine-direction tear resistance of Exceed LLDPE 1018 versus the minor component loading by minor component type.

The legend of FIG. 2 is defined in accordance with the examples below. With reference to FIG. 2 and in some embodiments, RmLLDPEs of the present invention are described by equation (b):

$$LD1\ \text{Dart prop (g/mil, Method A)} = 13.47 - 0.25\ (LD1\ \text{Loading}) \quad (b)$$

wherein X is greater than or equal to 1, and Rubber Loading is defined as—the weight % of Rubber based on the total weight of Rubber and mLLDPE.

Low Density Modifier and HDPE Blends

In an embodiment, a low density modifier and a HDPE are blended together in accordance with the above-stated methods of blending to produce a rubber-HDPE blend ("RHDPE"). The RHDPE blend has from about 11 to about 35 weight % low density modifier (such as rubber); and from about 89 to about 65 weight % of a HDPE.

In one embodiment, the low density modifier is a mEPDM having a crystallinity ranging from about 0.5 to about 1.5 percent. In another embodiment, the mEPDM has a crystallinity ranging from about 0.5 to about 0.75 percent. In yet another embodiment, the mEPDM has a crystallinity ranging from about 0.5 to about 0.65 percent.

In one embodiment, the RHDPE has from about 11 to about 30 weight % mEPDM. In another embodiment, the RHDPE has from about 11 to about 20 weight % mEPDM.

In one embodiment, the RHDPE has from about 89 to about 70 weight % HDPE. In an embodiment, RHDPE blend has from about 89 to about 80 weight % HDPE.

In an embodiment, the HDPE of RHDPE blend has a density greater than or equal to about 0.940 g/cc and less than about 0.970 g/cc. In another embodiment, the HDPE of RHDPE blend has a density greater than or equal to about 0.950 g/cc and less than about 0.970 g/cc. In yet another embodiment, mLLDPE has a density greater than or equal to about 0.955 g/cc and less than about 0.960 g/cc.

In an embodiment, the HDPE of RHDPE has a molecular weight distribution (Mw/Mn) of from about 1 to about 15. In another embodiment, the HDPE of RHDPE has a molecular weight distribution of from about 1 to about 10. In a further embodiment, the HDPE of RHDPE has a molecular weight distribution of from about 2 to about 3.

In an embodiment, the HDPE of RHDPE has a melt index (MI) less than 7 g/10 minutes. In another embodiment, the HDPE of RHDPE has a melt index less than 5 g/10 minutes. In a further embodiment, the HDPE of RHDPE has a melt index less than 2 g/10 minutes.

In an embodiment, the HDPE of RHDPE has a CDBI of at least about 50%. In another embodiment, the HDPE of RHDPE has a CDBI of at least about 60%. In a further embodiment, the HDPE of RHDPE has a CDBI of at least about 70%. In a still further embodiment, the HDPE of RHDPE has a CDBI of at least about 80%.

Figure 3:
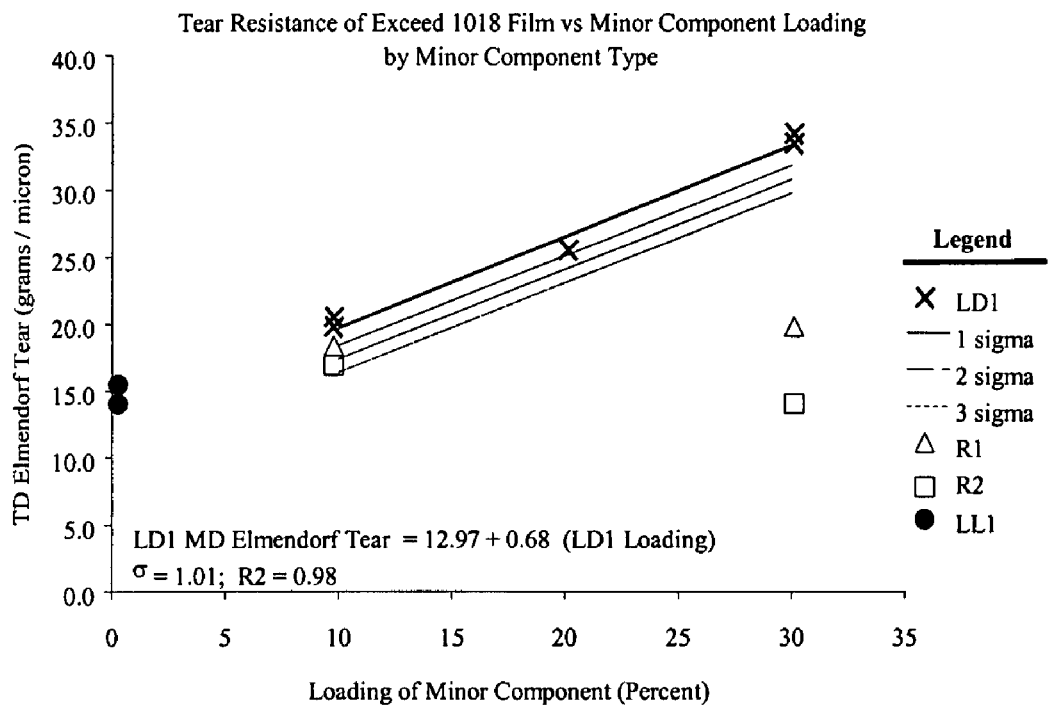
FIG. 3 is an illustration of an embodiment of the transverse-direction tear resistance of Exceed LLDPE 1018 versus the minor component loading by minor component type.

The legend of FIG. 3 is defined in accordance with the examples below. With respect to FIG. 3 and in some embodiments, RHDPEs of the present invention are described by equation (a):

$$LD1\ MD\ \text{Elmendorf Tear} = 0.7,$$

wherein X is greater than or equal to 1, and Rubber Loading is defined as the weight % of Rubber based on the total weight of Rubber and HDPE.

Figure 4:
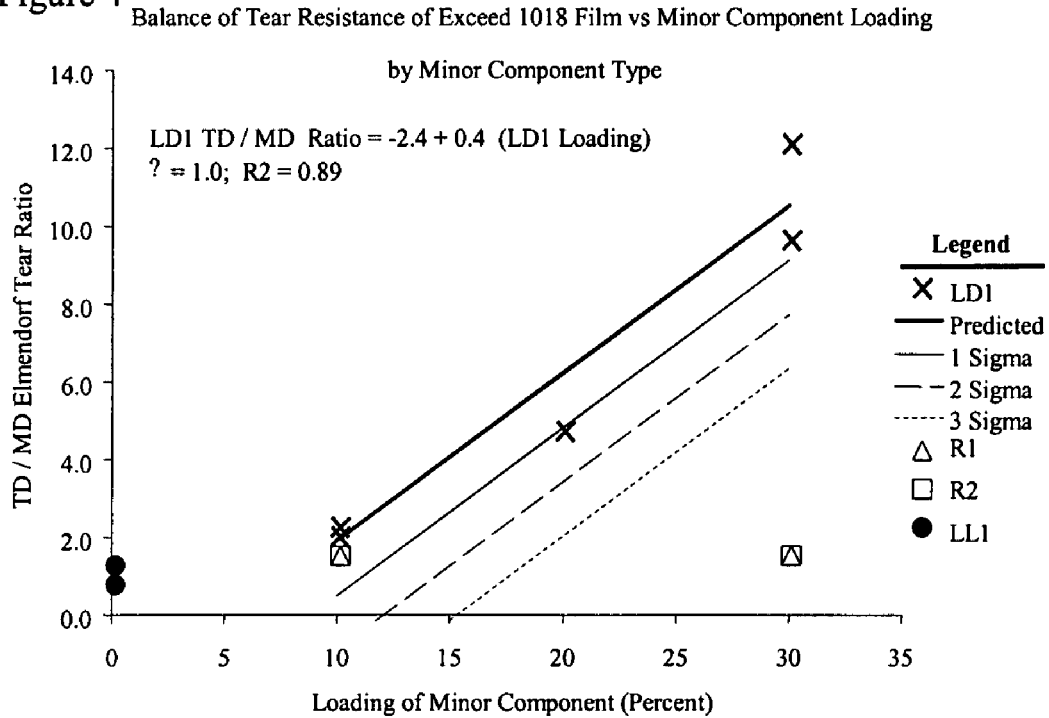
FIG. 4 is an illustration of an embodiment of the balance of the tear resistance of Exceed LLDPE 1018 versus the minor component loading by minor component type.

The legend of FIG. 4 is defined in accordance with the examples below. With reference to FIG. 4 and in some embodiments, RHDPEs of the present invention are described by equation (b):

$$LD1\ \text{Dart prop (g/mil, Method A)} = 1.7 - 0.014\ (LD1\ \text{Loading})$$

wherein X is greater than or equal to 1, and Rubber Loading is defined as the weight % of Rubber based on the total weight of Rubber and HDPE.

The blends of this invention may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a layer comprising the blend of this invention can be extrusion coated or laminated onto an oriented polymer layer or the blend of this invention and another polymer can be coextruded together into a film then oriented. Likewise, oriented polymer layers could be laminated to oriented blends of this invention or oriented blends of this invention could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another embodiment the layer comprising the polymer composition of this invention may be combined with one or more other layers. The other layer(s) may be any layer typically included in multilayer film structures. For example the other layer or layers may be:

1. Polyolefins

Preferred polyolefins include homopolymers or copolymers of C2 to C40 olefins, preferably C2 to C20 olefins, preferably a copolymer of an alpha-olefin and another olefin or .alpha.-olefin (ethylene is defined to be an .alpha.-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar Polymers

Preferred polar polymers include homopolymers and copolymers of esters, amides, acetates, anhydrides, copolymers of a C2 to C20 olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic Polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-.alpha.-methyl styrene.

4. Miscellaneous

Other preferred layers can be paper, wood, cardboard, metal, metal foils (such as aluminum foil and tin foil), metallized surfaces, glass (including silicon oxide (SiO.x) coatings applied by evaporating silicon oxide onto a film surface), fabric, spunbonded fibers, and non-wovens (particularly polypropylene spun bonded fibers or non-wovens), and substrates coated with inks, dyes, pigments, PVDC and the like.

The films may vary in thickness depending on the intended application, however films of a thickness from 1 to 250 micron are usually suitable. Films intended for packaging are usually from 10 to 60 microns thick. The thickness of the sealing layer is typically 0.2 to 50 microns. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium stearate, carbon black, low molecular weight resins and glass beads.

In another embodiment one more layers may be modified by corona treatment, electron beam irradiation, gamma irradiation, or microwave. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. The films comprising a hydrocarbon resin may be oriented in uniaxial or biaxial directions to the same or different degrees.

Low Density Modifier Blended with HDPE and mLLDPE

In an embodiment, a low density modifier and a second component comprising mLLDPE and HDPE are blended together in accordance with the above-stated methods of blending to produce a mLLDPE ("RmLLDPE"). The RmLLDPE has from about 11 to about 35 weight % low density modifier (such as a rubber); and from about 89 to about 65 weight % of a component comprising mLLDPE and HDPE.

In one embodiment, the low density modifier is a mEPDM having a crystallinity ranging from about 0.5 to about 1.5 percent. In another embodiment, the mEPDM has a crystallinity ranging from about 0.65 to about 1.5 percent. In yet another embodiment, the mEPDM has a crystallinity ranging from about 0.75 to about 1.5 percent.

In one embodiment, the RmLLDPE has from about 11 to about 35 weight % low density modifier (such as a rubber). In another embodiment, the RmLLDPE has from about 11 to about 20 weight % low density modifier (such as a rubber).

In one embodiment, the RmLLDPE has from about 89 to about 70 weight % of the mLLDPE. In an embodiment, RmLLDPE has from about 89 to about 80 weight % of a component comprising mLLDPE and HDPE.

In an embodiment the mLLDPE of the RmLLDPE has a density greater than or equal to about 0.910 g/cc and less than about 0.935 g/cc. In another embodiment, the mLLDPE of the RmLLDPE has a density greater than or equal to about 0.916 g/cc and less than about 0.940 g/cc. In yet another embodiment, mLLDPE has a density greater than or equal to about 0.916 g/cc and less than about 0.929 g/cc.

In an embodiment, the mLLDPE of RmLLDPE has a molecular weight distribution of from about 1 to about 5. In another embodiment, the mLLDPE of RmLLDPE has a molecular weight distribution of from about 1 to about 3. In an embodiment, the mLLDPE of RmLLDPE has a molecular weight distribution of from about 2 to about 3.

In an embodiment, the mLLDPE of RmLLDPE has a melt index less than 7 g/10 minutes. In another embodiment, the mLLDPE of RmLLDPE has a melt index less than 5 g/10 minutes. In a further embodiment, the mLLDPE of RmLLDPE has a melt index less than 2 g/10 minutes.

In an embodiment, the mLLDPE of RmLLDPE has a CDBI of at least about 50%. In another embodiment, the mLLDPE of RmLLDPE has a CDBI of at least about 60%. In a further embodiment, the mLLDPE of RmLLDPE has a CDBI of at least about 70%. In a still further embodiment, the mLLDPE of RmLLDPE has a CDBI of at least about 80%. In a still further embodiment, the mLLDPE of RmLLDPE has a CDBI of from 60 to 80%.

Extrusion

The materials of the present invention may be extruded through any extrusion apparatus including but not limited to a blown film line, a cast film line, a pipe extrusion line, a blow molding line, and an injection molding line. Examples of such extrusion apparatuses are generally disclosed in the Encyclopedia of Polymer Science and Technology Volume 11, 2004, Plastics Processing to Solid-State Extrusion, John Wiley & Sons, Inc; and in the Handbook of Polymer Science and Technology Volume 3, 1989, Applications and Processing Operations, Marcel Dekker, Inc.

Ethylene (co)polymers suitable for extrusion though a blown film line preferably have a melt index less than about 7 g/10 min. In another embodiment, PEs suitable for extrusion though a blown film line preferably have a melt index less than about 5 g/10 min. In a further embodiment, PEs suitable for extrusion though a blown film line preferably have a melt index less than about 3 g/10 min. In a still further embodiment, PEs suitable for extrusion though a blown film line preferably have a melt index less than about 2 g/10 min.

Ethylene (co)polymers suitable for extrusion though a cast film line preferably have a melt index greater than about 1 g/10 min. In another embodiment, PEs suitable for extrusion though a cast film line preferably have a melt index greater than about 2 g/10 min. In a further embodiment, PEs suitable for extrusion though a cast film line preferably have a melt index greater than about 5 g/10 min. In a still further embodiment, PEs suitable for extrusion though a cast film line preferably have a melt index greater than about 7 g/10 min.

Ethylene (co)polymers suitable for extrusion through a pipe extrusion line preferably have a melt index from about 0.5 to about 1 g/10 min. In another embodiment, ethylene (co)polymers suitable for extrusion thorough a pipe extrusion line preferably have a melt index from about 0.5 to about 0.8 g/10 min. In another embodiment, ethylene (co)polymers suitable for extrusion thorough a pipe extrusion line preferably have a melt index less than about 1 g/10 min, and a high load melt index between about 5 g/10 min and about 20 g/10 min. In another embodiment, ethylene (co)polymers suitable for extrusion thorough a pipe extrusion line preferably have a melt index less than about 1 g/10 min, and a high load melt index greater than about 20 g/10 min.

Ethylene (co)polymers suitable for extrusion through a blow molding line preferably have a melt index from about 0.5 to about 1 g/10 min. In one embodiment, ethylene (co) polymers suitable for extrusion thorough a blow molding line preferably have a melt index from about 0.5 to about 0.8 g/10 min. In another embodiment, ethylene (co)polymers suitable for extrusion thorough a blow molding line preferably have a melt index less than about 1 g/10 min, and a high load melt index between about 5 g/10 min and about 20 g/10 min. In yet another embodiment, ethylene (co)polymers suitable for extrusion thorough a blow molding line preferably have a melt index less than about 1 g/10 min, and a high load melt index greater than about 20 g/10 min.

Ethylene (co)polymers suitable for extrusion through an injection molding line preferably have a melt index greater than 4 g/10 min. In one embodiment, ethylene (co)polymers suitable for extrusion though an injection molding line preferably have a melt index greater than about 15 g/10 min. In a further embodiment, ethylene (co)polymers suitable for extrusion though an injection molding line preferably have a melt index greater than about 30 g/10 min. In a still further embodiment, ethylene (co)polymers suitable for extrusion though an injection molding line preferably have a melt index greater than about 100 g/10 min.

Ethylene (co)polymers suitable for use in rotomolding equipment preferably have a melt index greater than 1 g/10 min. In another embodiment, ethylene (co)polymers suitable for use in rotomolding equipment preferably have a melt index greater than about 2 g/10 min. In a further embodiment, ethylene (co)polymers suitable for use in rotomolding equipment preferably have a melt index greater than about 5 g/10 min.

Films

Blended compositions of the present invention may be formed into monolayer films following their extrusion.

In an alternative embodiment, the blended compositions of the present invention may be formed into multilayer (having at least 2 layers) films following their extrusion. In an embodiment, the multilayer films may have a first layer, a second layer, and a third layer in a ratio ranging from about 1:1:1 to about 1:8:1, preferably from about 1:1:1 to about 1:4:1, and more preferably from about 1:1:1 to about 1:2:1.

Figure 16:
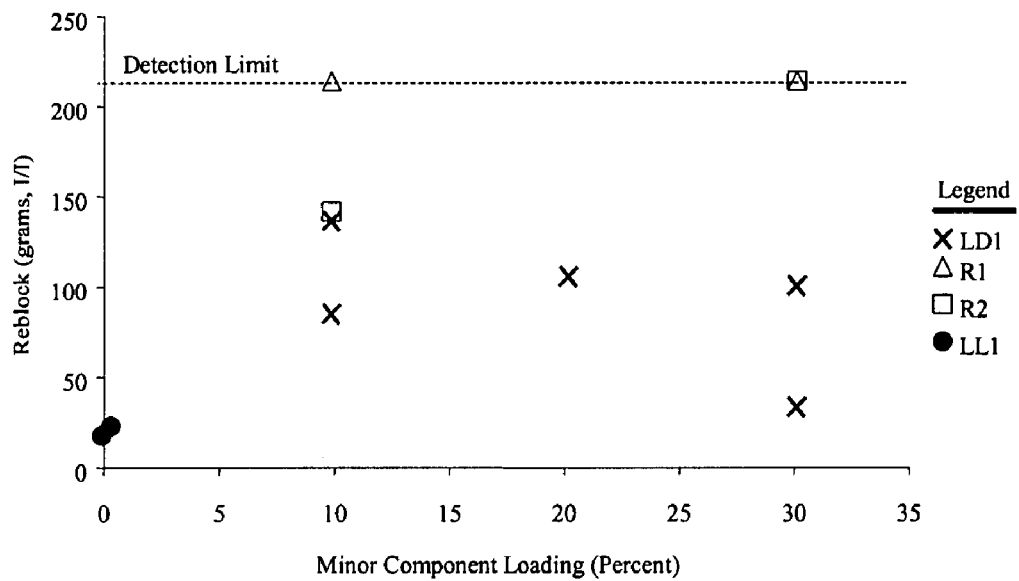
FIG. 16 is an illustration of an embodiment of the reblock of Exceed LLDPE 1018 versus the minor component loading by minor component type.
Figure 17:
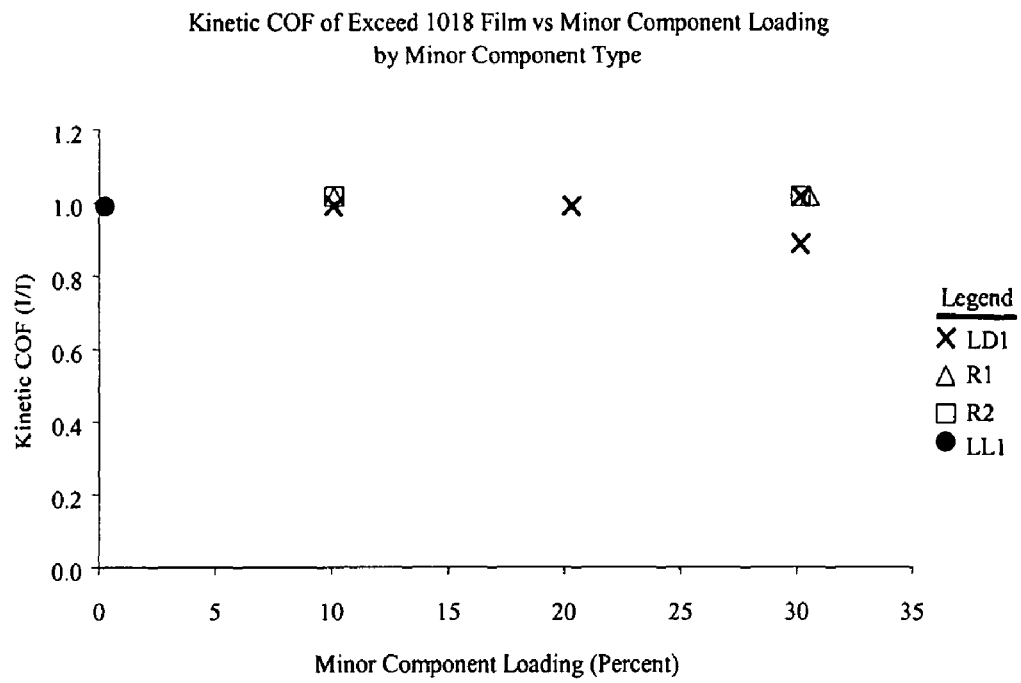
FIG. 17 is an illustration of an embodiment of the kinetic COF of Exceed LLDPE 1018 versus the minor component loading by minor component type.
Figure 18:
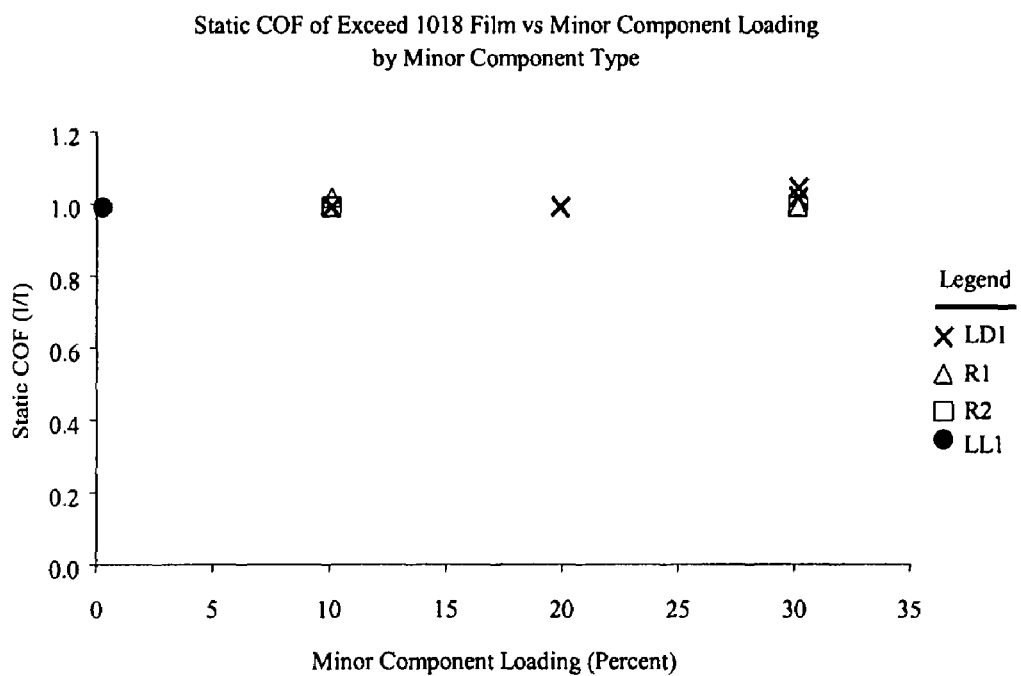
FIG. 18 is an illustration of an embodiment of the static COF of Exceed LLDPE 1018 versus the minor component loading by minor component type.

In an embodiment, the present invention provides a blended film having at least one layer. In the embodiment, the at least one layer comprises from about 11 to about 35 weight % of a low density modifier, and from about 89 to about 65 weight percent of a mLLDPE. In the embodiment, the mLLDPE has a density ranging from about 0.910 to about 0.940 g/cc and the weight percents are based on the total weight of the low density modifier and the mLLDPE. In an alternative embodiment, the mLLDPE has a density ranging from about 0.910 to about 0.925 g/cc. Moreover, the film of these embodiments have an increased Reblock as compared to either films comprising only the mLLDPE, or films comprising blends including the mLLDPE. In general, these films have a Reblock greater than about 70 grams, preferably greater than about 130 grams, more preferably greater than about 168 grams, and even more preferably greater than about 206 grams. The Reblock characteristics of inventive films with reference to comparative films are generally illustrated in FIG. 16. In addition, blended films of these embodiments, have generally the same coefficient of friction ("COF") as compared to either films comprising only the mLLDPE, or films comprising blends including the mLLDPE. In general, the blended films may have a Kinetic COF from about 0.8 to about 1.2, preferably from about 0.9 to about 1.1, and more preferably about 1.0. Still further, the blended films may have a Kinetic COF of at least about 85% of the Kinetic COF of the mLLDPE. The Kinetic COF characteristics of inventive films with reference to comparative films are generally illustrated in FIG. 17. In a further embodiment, the blended films may have a Static COF from about 0.8 to about 1.2, preferably from about 0.9 to about 1.1, and more preferably about 1.0. Further, the blended films may have a Static COF of at least about 85% of the Static COF of the mLLDPE. The Static COF characteristics of inventive films with reference to comparative films are generally illustrated in FIG. 18.

Accordingly and in an embodiment, an inventive blend is provided, which has an increased Reblock and generally the same COF (either Static or Kinetic) as compared to either films comprising only the mLLDPE, or films comprising blends including the mLLDPE. In this manner, an inventive blend is provided, which is tackier as compared to bare mLLDPE or other blends of mLLDPE, and yet is able to be machined. In an embodiment, films of this type may be folded onto themselves and allowed to become adhered together. Allowing the film to become adhered together may comprising pressing the film onto itself to form a seal.

In an alternative embodiment, films according to the present invention have a hot tack beginning at low temperature. In a still further embodiment, films according to the present invention have an improved heat seal heat seal exceeds the 2 lbs minimum at a lower temperature and has a broader seal window.

Articles

Blended compositions of the present invention may be formed into various articles, including but not limited to: pellets, 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementatious products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap. The article above, wherein the article is a bag or sack is fabricated using form-fill-seal (FFS) equipment or vertical FFS equipment.

Blended compositions which are blow molding, injection molding, sheet thermoforming and rotomolding may be formed into various articles, including but not limited to: flexible tubing, hoses, foam sheet, wire and cable applications, lids, injection molded products, injection molded plugs, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, rotomolded containers, industrial vessels, material handling, bumpers, and pipes.

In another embodiment, this invention relates to:

1. A composition comprising:
   (a) from about 11 to about 35 weight % a low density modifier; and
   (b) from about 89 to about 65 weight % of a mLLDPE having a density ranging from about 0.910 to about 0.940 g/cc; and
   wherein the weight % is based on the total weight of the low density modifier and the mLLDPE.

2. The composition of paragraph 1, wherein the low density modifier comprises a mEDPM having a) 10 to 30 weight percent semi crystalline minor component having 40 to 77 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the mEPDM has a diene content of at least 0.5 weight percent based on the total weight of the mEPDM.

3. The composition of paragraph 1 or 2, wherein the mEPDM comprises 70 to 85 weight percent of the amorphous major component, and 15 to 30 percent of the semicrystalline minor component.

4. The composition of paragraph 1 to 3, wherein the mEPDM comprises 75 to 85 weight percent of the amorphous major component, and 15 to 25 percent of the semicrystalline minor component.

5. The composition of paragraph 1 or 2, wherein the major component has from 60 to 68 weight percent ethylene derived units.

6. The composition of paragraph 1 to 5, wherein the major component has from 60 to 66 weight percent ethylene derived units.

7. The composition of paragraph 1 or 2, wherein the minor component has from 68 to 74 weight percent ethylene derived units.

8. The composition of paragraph 1 to 7, wherein the minor component has from 69 to 73 weight percent ethylene derived units.

9. The composition of paragraph 1 to 8, wherein the minor component has from 0.5 to 5 weight percent units derived from 5-ethylidene-2-norbornene, 5-vinyl-2-norbornene, or dicylcopentadiene.

10. The composition of paragraph 1 to 9, wherein the major component has from 0.5 to 5 weight percent units derived from 5-ethylidene-2-norbornene, 5-vinyl-2-norbornene, or dicylcopentadiene.

11. The composition of paragraph 1 to 10, wherein the mEPDM comprises has from 0.5 to 5 weight percent units derived from 5-ethylidene-2-norbornene, 5-vinyl-2-norbornene, or dicylcopentadiene.

12. The composition of paragraph 1 to 11, wherein the minor component has from 1 to 4 weight percent units derived from 5-ethylidene-2-norbornene, 5-vinyl-2-norbornene, or dicylcopentadiene.

13. The composition of paragraph 1 to 12, wherein the major component has from 1 to 4 weight percent units derived from 5-ethylidene-2-norbornene, 5-vinyl-2-norbornene, or dicylcopentadiene.
14. The composition of paragraph 1 to 13, wherein the mEPDM has from 1 to 4 weight percent diene units derived from 5-ethylidene-2-norbornene, 5-vinyl-2-norbornene, or dicylcopentadiene.
15. The composition of paragraph 1 to 14, wherein the alpha olefin derived units in both the major and minor components have 3, 4 or 6 carbon atoms.
16. The composition of paragraph 1 to 15, wherein the alpha olefin derived units in both the major and minor components have 3 carbon atoms.
17. The composition of paragraph 1 to 16, wherein the mEPDM has a percent crystallinity of from 0.5 to 1.5.
18. The composition of paragraph 1 to 17, wherein the mEPDM has a percent crystallinity of from 0.75 to 1.5.
19. The composition of paragraph 1 to 18, wherein the mEPDM has a percent crystallinity of from 0.8 to 1.5.
20. The composition of paragraph 1 to 19, wherein viscosity of the major component is from one tenth to one twentieth of the minor component.
21. The composition of paragraph 1 to 20, wherein viscosity of the mEPDM measured as ML (1+4) at 125° C. is from 30 to 90.
22. The composition of paragraph 1 to 21, wherein viscosity of the mEPDM measured as ML (1+4) at 125° C. is from 55 to 70.
23. The composition of paragraph 1 to 22, wherein both the major and minor components have $M_w/M_n$ of from 2 to 3.
24. The composition of paragraph 1 to 23, wherein both the major and minor components have $M_w/M_n$ of from 2 to 2.5.
25. The composition of paragraph 1 to 24, wherein the mEPDM has a $M_w/M_n$ of from 2 to 5.
26. The composition of paragraph 1 to 25, wherein the mEPDM has a $M_w/M_n$ of from 2 to 3.
27. The composition of paragraph 1 to 26, wherein the mEPDM is substantially free of long chain branching.
28. The composition of paragraph 1 to 27, wherein the branching index ranges from about 0.7 to about 1.0.
29. The composition of paragraph 1 to 28, wherein the branching index ranges from about 0.8 to about 1.0.
30. The composition of paragraph 1 to 29, wherein the branching index ranges from about 0.9 to about 1.0.
31. The composition of paragraph 1 to 30, wherein the composition comprises from about 11 to about 30 weight % mEPDM.
32. The composition of paragraph 1 to 31, wherein the composition comprises from about 11 to about 20 weight % mEPDM.
33. The composition of paragraphs 1 to 32, wherein the composition comprises from about 89 to about 70 weight % of the mLLDPE.
34. The composition of paragraphs 1 to 33, wherein the composition comprises from about 89 to about 80 weight % of the mLLDPE.
35. The composition of paragraphs 1 to 34, wherein the mLLDPE has a density greater than or equal to about 0.910 g/cc and less than about 0.940 g/cc.
36. The composition of paragraph 1 to 25, wherein the mLLDPE has a density greater than or equal to about 0.916 g/cc and less than about 0.940 g/cc.
37. The composition of paragraph 1 to 36, wherein the mLLDPE has a density greater than or equal to about 0.916 g/cc and less than about 0.929 g/cc.
38. The composition of paragraphs 1 to 37, wherein the mLLDPE comprises a $C_3$ to $C_{20}$ olefin comonomer.
39. The composition of paragraph 1 to 38, wherein the $C_3$ to $C_{20}$ olefin comonomer comprises one or more of propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1, styrene, alpha-methyl styrene, para-alkyl styrene (such as para-methyl styrene), hexadiene, norbornene, vinyl norbornene, ethylidene norbornene, butadiene, isoprene, heptadiene, octadiene, or cyclopentadiene.
40. The composition of paragraph 1 to 39, wherein the $C_3$ to $C_{20}$ olefin comonomer comprises one or more of propylene, butene, hexene or octene.
41. The composition according to paragraphs 1 to 40, wherein the mLLDPE has a molecular weight distribution of from about 1 to about 5.
42. The composition according to paragraph 1 to 41, wherein the mLLDPE has a molecular weight distribution of from about 1 to about 3.
43. The composition according to paragraph 1 to 42, wherein the mLLDPE has a molecular weight distribution of from about 2 to about 3.
44. The composition according to paragraphs 1 to 43, wherein the mLLDPE has a melt index less than 7 g/10 minutes.
45. The composition according to paragraph 1 to 44, wherein the mLLDPE has a melt index less than 5 g/10 minutes.
46. The composition according to paragraph 1 to 45, wherein the mLLDPE has a melt index less than 2 g/10 minutes.
47. The composition according to paragraphs 1 to 46, wherein the mLLDPE has a CDBI of at least about 50%.
48. The composition according to paragraph 1 to 47, wherein the mLLDPE has a CDBI of at least about 60%.
49. The composition according to paragraph 1 to 48, wherein the mLLDPE has a CDBI of at least about 70%.
50. The composition according to paragraph 1 to 49, wherein the mLLDPE has a CDBI of at least about 80%.
51. A film having at least one layer, the at least one layer having a composition comprising:
   (a) from about 11 to about 35 weight % a low density modifier; and
   (b) from about 89 to about 65 weight % of a mLLDPE having a density ranging from about 0.910 to about 0.940 g/cc; and
wherein the weight % is based on the total weight of the low density modifier and the mLLDPE.
52. The film of paragraph 51, wherein the film is formed by a process selected from the group consisting of cast extrusion or blown extrusion.
53. The film of paragraph 51 or 52, wherein the film is formed by blown extrusion, and the mLLDPE has a density ranging from 0.910 to 0.940 g/cc and a melt index less than 7.
54. The film of paragraphs 51 to 53, wherein the film is formed by blown extrusion, and the mLLDPE has a density ranging from 0.910 to 0.940 g/cc and a melt index less than 5 g/10 minutes.
55. The film of paragraphs 51 to 54, wherein the film is formed by blown extrusion, and the mLLDPE has a density ranging from 0.910 to 0.940 g/cc and a melt index less than 2 g/10 minutes.
56. The film of paragraphs 51 to 55, wherein the film is formed by cast extrusion, and the mLLDPE has a density ranging from 0.910 to 0.940 g/cc and a melt index greater than or equal to 2 g/10 min.

57. The film of paragraphs 51 to 56, wherein the film is formed by cast extrusion, and the mLLDPE has a density ranging from 0.910 to 0.940 g/cc and a melt index greater than or equal to 5 g/10 min.

58. The film of paragraphs 51 to 57, wherein the film is formed by cast extrusion, and the mLLDPE has a density ranging from 0.910 to 0.940 g/cc and a melt index greater than or equal to 7 g/10 min.

59. The film according to paragraphs 51 to 58, wherein the film has a haze less than about 50 percent preferably less than about 20 percent, and more preferably less than about 15 percent.

60. The film according to paragraphs 51 to 59, wherein the film has a gloss greater than about 37, preferably greater than about 45, and more preferably greater than about 53.

61. The film according to paragraphs 51 to 60, wherein the film has a MD Elmendorf Tear greater than about 9.2 g/μm, preferably greater than about 9.6 g/μm, and more preferably greater than about 10.1 g/μm.

62. The film according to paragraphs 51 to 61, wherein the film has a TD Elmendorf Tear greater than about 10 g/μm, preferably greater than about 15 g/μm, and more preferably greater than about 17 g/μm.

63. The film according to paragraphs 51 to 62, wherein the film has a ratio of the TD Elmendorf Tear to MD Elmendorf Tear less than about 3, preferably less than about 2.7, and more preferably less than about 2.

64. The film according to paragraphs 51 to 63, wherein the film has a MD Elongation at break greater than about 705%, preferably greater than about 709%, and more preferably greater than about 714%.

65. The film according to paragraphs 51 to 64, wherein the film has a TD Elongation at break greater than about 720%, preferably greater than about 740%, and more preferably greater than about 760%.

66. The film according to paragraphs 51 to 65, wherein the film has an Average Elmendorf Tear (average of MD and TD Elmendorf Tear) greater than about 10 g/μm and an Average Elongation at Break (Average of MD and TD Elongation at Break) greater than about 750%, preferably an Average Elmendorf Tear greater than about 12 g/μm and an Average Elongation at Break greater than about 800%, and more preferably an Average Elmendorf Tear greater than about 12 g/μm and an Average Elongation at Break greater than about 850%.

67. The film according to paragraphs 51 to 66, wherein the film by a process selected from the group consisting of cast extrusion or blown extrusion.

68. The film according to paragraphs 51 to 67, wherein the film has a melt viscosity less than 0.019 Newton-seconds/mm$^2$, preferably less than 0.015 Newton-seconds/mm$^2$, and more preferably less than 0.011 Newton-seconds/mm$^2$.

69. The film according to paragraphs 51 to 68, wherein the film has a draw ratio greater than 14, preferably greater than 15, and more preferably greater than 16.

70. The film according to paragraphs 51 to 69, wherein the film has a Seal Initiation temperature of less than about 120 Degrees Centigrade, preferably less than about 115 Degrees Centigrade, and more preferably less than about 110 Degrees Centigrade.

71. The film according to paragraphs 51 to 70, wherein the film has a maximum Hot Tack greater than about 2 N/25.4 mm, preferably greater than about 4 N/25.4 mm, and more preferably greater than about 6 N/25.4 mm.

72. The film according to paragraphs 51 to 71, wherein the film has a Hot Tack window greater than 10 Degrees Centigrade, preferably greater than about 15 Degrees Centigrade, and more preferably greater than about 20 Degrees Centigrade.

73. The film according to paragraphs 51 to 72, wherein the film has a Heat Seal Plateau greater than about 2 pounds force, preferably greater than about 3 pounds force, and more preferably greater than about 4 pounds force.

74. The film according to paragraphs 51 to 73, wherein the film has a Heat Seal Plateau begin at a temperature of less than about 125 Degrees Centigrade, preferably less than about 120 Degrees Centigrade, and more preferably less than about 115 Degrees Centigrade.

75. The film according to paragraphs 51 to 74, wherein the film has a Heat Seal Plateau greater than about 60 Degrees Centigrade, preferably greater than about 40 Degrees Centigrade, and more preferably greater than about 20 Degrees Centigrade.

76. The film according to paragraphs 51 to 75, wherein the film has a Reblock greater than about 70 grams, preferably 130 g, more preferably greater than about 168 g, and still more preferably greater than about 206 g.

77. The film according to paragraphs 51 to 76, wherein the film has a Kinetic coefficient of friction from about 0.8 to about 1.2, preferably from about 0.9 to about 1.1, and more preferably about 1.0.

78. The film according to paragraphs 51 to 77, wherein the film has a Kinetic COF of at least about 85% of the Kinetic COF of the mLLDPE.

79. The film according to paragraphs 51 to 78, wherein the film has a Static coefficient of friction from about 0.8 to about 1.2, preferably from about 0.9 to about 1.1, and more preferably about 1.0.

80. The film according to paragraphs 51 to 79, wherein the film has a Static COF of at least about 85% of the Static COF of the mLLDPE.

81. The film according to paragraphs 51 to 80, wherein the mLLDPE has a density from about 0.910 to about 0.925 g/cc.

82. A method of forming the films of paragraphs 51 to 81, into an article, comprising:
   (a) contacting a first film portion with a second film portion; and
   (b) allowing the first film portion and the second film portion to become adhered together,
   wherein the first film portion and the second film portion may be part of the same or different film.

83. The method of paragraph 82, wherein the film is folded onto itself and pressed together to form a seal.

84. The film according to paragraphs 51 to 83, wherein the mLLDPE has a density ranging from 0.910 to 0.925 g/cc and the film has a Dart prop, according to Method A, greater than about 13 g/μm preferably greater than about 30 g/μm and more preferably greater than about 40 g/μm.

85. The film according to paragraphs 51 to 84, wherein the film has a Reblock greater than about 130 g, preferably greater than about 168 g, and more preferably greater than about 206 g.

86. The film according to paragraphs 51 to 85, wherein the film has a MD 1% Secant Modulus of less than about 220 MPa, preferably less than about 195 MPa, and more preferably less than about 170 MPa.

87. The film according to paragraphs 51 to 86, wherein the film has a TD 1% Secant Modulus of less than about 240 MPa, preferably less than about 230 MPa, and more preferably less than about 225 MPa.

88. The film according to paragraphs 51 to 87, wherein the film has a ratio of the TD 1% Secant Modulus to MD 1%

Secant Modulus greater than 1, preferably greater than about 1.1, and more preferably greater than about 1.2.

89. The film according to paragraphs 51 to 88, wherein the film has a MD Tensile at Yield less than about 9.5 MPa, preferably less than about 9.0 MPa, and more preferably less than about 8.5 MPa.

90. The film according to paragraphs 51 to 89, wherein the film has a TD Tensile at Yield less than about 10.5 MPa, preferably less than about 10.0 MPa, and more preferably less than about 9.5 MPa.

91. The film according to paragraphs 51 to 90, wherein the film has a MD Tensile at 200% Elongation less than about 13 MPa, preferably less than about 12 MPa, and more preferably less than about 11 MPa.

92. The film according to paragraphs 51 to 91, wherein the film has a MD Ultimate Tensile greater than about 45 MPa, preferably greater than about 50 MPa, and more preferably greater than about 55 MPa.

93. The film according to paragraphs 51 to 92, wherein the film has a TD Ultimate Tensile greater than about 48 MPa, preferably greater than about 50 MPa, and more preferably greater than about 52 MPa.

94. The film according to paragraphs 51 to 93, wherein the mLLDPE has a density ranging from 0.926 to 0.940 g/cc and the film has a Dart prop according to Method A greater than about 5.3 g/µm preferably greater than about 5.5 g/µm and more preferably greater than about 5.6 g/µm.

95. The film according to paragraphs 51 to 94, wherein the film has a Reblock greater than about 40 g, preferably greater than about 50 g, and more preferably greater than about 60 g.

96. The film according to paragraphs 51 to 95, wherein the film has a Static COF less than about 0.15, preferably less than about 0.14, and more preferably less than about 0.13.

97. The film according to paragraphs 51 to 96, wherein the film has a Static COF less than about 85% of the Static COF of the mLLDPE, preferably less than about 80% of the Static COF of the mLLDPE, and more preferably less than about 75% of the Static COF of the mLLDPE.

98. The film according to paragraphs 51 to 97, wherein the film has a Kinetic COF less than about 0.13, preferably less than about 0.12, and more preferably less than about 0.11.

99. The film according to paragraphs 51 to 98, wherein the film has a Kinetic COF less than about 85% of the Static COF of the mLLDPE, preferably less than about 75% of the Kinetic COF of the mLLDPE, and more preferably less than about 70% of the Kinetic COF of the mLLDPE.

100. The film according to paragraphs 51 to 99, wherein the film has a ratio of TD 1% Secant Modulus to MD 1% Secant Modulus greater than 1.0, preferably greater than about 1.1, and more preferably greater than about 1.2.

101. The film according to paragraphs 51 to 100, wherein the film has a ratio of TD Tensile at Yield to MD Tensile at Yield greater than about 7, preferably greater than about 10, and more preferably greater than about 13.

102. The film according to paragraphs 51 to 101, wherein the film has a MD Tensile at 200% Elongation less than about 12 MPa, preferably less than about 13 MPa, and more preferably less than about 14 MPa.

103. The film according to paragraphs 51 to 102, wherein the film has a blow up ratio from about 1 to about 4, preferably from about 1.5 to about 3, and more preferably from about 2 to about 2.5.

104. The film according to paragraphs 51 to 103, wherein the film has a processing time from about 3 sec to 6 sec, preferably from about 4.0 sec to 5.5 sec, and more preferably from about 5.0 sec to 5.2 seconds.

105. The film according to paragraphs 51 to 104, wherein the film is a multi-layer having a first layer and a second layer in a ratio ranging from about 1:1 to about 1:8, preferably from about 1:1 to about 1:4, and more preferably 1:1 to about 1:2.

106. The film according to paragraphs 51 to 105, wherein the film is a multi-layer having a first layer, a second layer, and a third layer in a ratio ranging from about 1:1:1 to about 1:8:1, preferably from about 1:1:1 to about 1:4:1, and more preferably from about 1:1:1 to about 1:2:1.

107. The film according to paragraphs 51 to 106, wherein the mPE is a mLLDPE having a density ranging from 0.910 to 0.925 g/cc and wherein the film has a gauge ranging from about 55 microns to about 80 microns, preferably from about 70 microns to about 77 microns, and more preferably from about 74 microns to about 76 microns.

108. The film according to paragraphs 51 to 107, wherein the film has a MD Elmendorf Tear ranging from about 500 g to about 1300 g, preferably from about 700 g to about 1300 g; more preferably from about 800 g to about 1300 g.

109. The film according to paragraphs 51 to 108, wherein the film has a TD Elmendorf Tear ranging from about 500 g to about 1700 g, preferably from about 1000 g to about 1700 g; more preferably from about 1200 g to about 1700 g.

110. The film according to paragraphs 51 to 109, wherein the film has a MD Elongation at break greater than about 700%.

111. The film according to paragraphs 51 to 110, wherein the film has a TD Elongation at break greater than about 700%.

112. The film according to paragraphs 51 to 111, wherein the mPE is a mLLDPE having a density ranging from 0.910 to 0.925 g/cc and the film has a dart impact ranging from about 715 g to about 1040 g, preferably from about 2100 g to about 2310 g; more preferably from about 2960 g to about 3040 g.

113. The film according to paragraphs 51 to 112, wherein the mPE is a mLLDPE having a density ranging from 0.926 to 0.940 g/cc and wherein the film has a gauge ranging from about 55 microns to about 80 microns, preferably from about 70 microns to about 77 microns, and more preferably from about 74 microns to about 76 microns.

114. The film according to paragraphs 51 to 113, wherein the film has a dart impact ranging from about 290 g to about 450 g, preferably from about 350 g to about 450 g; more preferably from about 400 g to about 450 g.

115. The film of paragraphs 51 to 114 formed into an article, wherein the article is selected from the group consisting of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementatious products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

116. The article of paragraph 115, wherein the article is a bag.

117. The article of paragraphs 115 or 116, wherein the article is a sack.

118. The article of paragraphs 115 to 117, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, roto-molded containers, industrial vessels, material handling, bumbers, and pipes.

119. A process for making an article, the process comprising:
 (a) blending
  (i) from about 11 to about 35 weight % a low density modifier; and
  (ii) from about 89 to about 65 weight % of a mLLDPE having a density ranging from about 0.910 to about 0.940 g/cc; and
  wherein the weight % is based on the total weight of the low density modifier and the mLLDPE; and
 (b) forming the m-EPDM-mPE blend into the article;
  wherein the weight % is based on the total weight of the mEPDM and the mLLDPE.

120. The process according to paragraph 119, wherein the forming of the article comprises one of blow molding, cast molding, injection molding, roto-molding or sheet thermoforming.

121. The process according to paragraphs 119 to 120, wherein the article comprises one of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementatious products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

122. The process according to paragraphs 119 to 121, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, rotomolded containers, industrial vessels, material handling, bumbers, and pipes.

123. A composition comprising:
(a) from about 11 to about 35 weight % low density modifier; and
(b) from about 89 to about 65 weight % of an HDPE having a density ranging from about 0.940 g/cc and less than 0.970 g/cc; and
wherein the weight % is based on the total weight of the low density modifier and the HDPE.

124. The composition of paragraph 123, wherein the low density modifier comprises a mEDPM having a) 10 to 30 weight percent semi crystalline minor component having 40 to 77 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the mEPDM has a diene content of at least 0.5 weight percent based on the total weight of the mEPDM.

125. The composition of paragraph 123 or 124, wherein the mEPDM comprises 70 to 85 weight percent of the amorphous major component, and 15 to 30 percent of the semicrystalline minor component.

126. The composition of paragraphs 123 to 125, wherein the mEPDM comprises 75 to 85 weight percent of the amorphous major component, and 15 to 25 percent of the semicrystalline minor component.

127. The composition of paragraphs 123 to 126, wherein the major component has from 60 to 68 weight percent ethylene derived units.

128. The composition of paragraphs 123 to 127, wherein the major component has from 60 to 66 weight percent ethylene derived units.

129. The composition of paragraphs 123 to 128, wherein the minor component has from 68 to 74 weight percent ethylene derived units.

130. The composition of paragraphs 123 to 120, wherein the minor component has from 69 to 73 weight percent ethylene derived units.

131. The composition of paragraphs 123 to 130, wherein the minor component has from 0.5 to 5 weight percent units derived from 5-ethylidene-2-norbornene, 5-vinyl-2-norbornene, or dicylcopentadiene.

132. The composition of paragraphs 123 to 131, wherein the major component has from 0.5 to 5 weight percent units derived from 5-ethylidene-2-norbornene, 5-vinyl-2-norbornene, or dicylcopentadiene.

133. The composition of paragraphs 123 to 132, wherein the mEPDM comprises has from 0.5 to 5 weight percent units derived from 5-ethylidene-2-norbornene, 5-vinyl-2-norbornene, or dicylcopentadiene.

134. The composition of paragraphs 123 to 133, wherein the minor component has from 1 to 4 weight percent units derived from 5-ethylidene-2-norbornene, 5-vinyl-2-norbornene, or dicylcopentadiene.

135. The composition of paragraphs 123 to 134, wherein the major component has from 1 to 4 weight percent units derived from 5-ethylidene-2-norbornene, 5-vinyl-2-norbornene, or dicylcopentadiene 136. The composition of paragraphs 123 to 135, wherein the mEPDM has from 1 to 4 weight percent diene units derived from 5-ethylidene-2-norbornene, 5-vinyl-2-norbornene, or dicylcopentadiene.

137. The composition of paragraphs 123 to 136, wherein the alpha olefin derived units in both the major and minor components have 3, 4 or 6 carbon atoms.

138. The composition of paragraphs 123 to 137, wherein the alpha olefin derived units in both the major and minor components have 3 carbon atoms.

139. The composition of paragraphs 123 to 138, wherein the mEPDM has a percent crystallinity of from 0.5 to 1.5.

140. The composition of paragraphs 123 to 139, wherein the mEPDM has a percent crystallinity of from 0.5 to 0.75.

141. The composition of paragraphs 123 to 140, wherein the mEPDM has a percent crystallinity of from 0.5 to 0.65.

142. The composition of paragraphs 123 to 141, wherein the viscosity of the major component is from one tenth to one twentieth of the minor component.

143. The composition of paragraphs 123 to 142, wherein the viscosity of the mEPDM measured as ML (1+4) at 125° C. is from 30 to 90.

144. The composition of paragraphs 123 to 143, wherein the viscosity of the mEPDM measured as ML (1+4) at 125° C. is from 55 to 70.

145. The composition of paragraphs 123 to 144, wherein both the major and minor components have $M_w/M_n$ of from 2 to 3.

146. The composition of paragraphs 123 to 145, wherein both the major and minor components have $M_w/M_n$ of from 2 to 2.5.

147. The composition of paragraphs 123 to 146, wherein the mEPDM has a $M_w/M_n$ of from 2 to 5.

148. The composition of paragraphs 123 to 147, wherein the mEPDM has a $M_w/M_n$ of from 2 to 3.

149. The composition of paragraphs 123 to 148, wherein the mEPDM is substantially free of long chain branching.

150. The composition of paragraphs 123 to 149, wherein the branching index ranges from about 0.7 to about 1.0.

151. The composition of paragraphs 123 to 150, wherein the branching index ranges from about 0.8 to about 1.0.

152. The composition of paragraphs 123 to 151, wherein the branching index ranges from about 0.9 to about 1.0.

153. The composition of paragraphs 123 to 152, wherein the composition comprises from about 11 to about 30 weight % mEPDM.

154. The composition of paragraphs 123 to 153, wherein the composition comprises from about 11 to about 20 weight % mEPDM.

155. The composition of paragraphs 123 to 154, wherein the composition comprises from about 89 to about 70 weight % of the HDPE.

156. The composition of paragraphs 123 to 155, wherein the composition comprises from about 89 to about 80 weight % of the HDPE.

157. The composition of paragraphs 123 to 156, wherein the HDPE has a density greater than or equal to about 0.950 g/cc and less than about 0.970 g/cc.

158. The composition of paragraphs 123 to 157, wherein the HDPE has a density greater than or equal to about 0.955 g/cc and less than about 0.960 g/cc.

159. The composition of paragraphs 123 to 158, wherein the HDPE comprises a $C_3$ to $C_{20}$ olefin comonomer.

160. The composition of paragraphs 123 to 159, wherein the $C_3$ to $C_{20}$ olefin comonomer comprises one or more of propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1, styrene, alpha-methyl styrene, para-alkyl styrene (such as para-methyl styrene), hexadiene, norbornene, vinyl norbornene, ethylidene norbornene, butadiene, isoprene, heptadiene, octadiene, or cyclopentadiene.

161. The composition of paragraphs 123 to 160, wherein the $C_3$ to $C_{20}$ olefin comonomer comprises one or more of propylene, butene, hexene or octene.

162. The composition according to paragraphs 123 to 161, wherein the HDPE has a molecular weight distribution of from about 1 to about 15.

163. The composition according to paragraphs 123 to 162, wherein the HDPE has a molecular weight distribution of from about 1 to about 10.

164. The composition according to paragraphs 123 to 163, wherein the HDPE has a molecular weight distribution of from about 2 to about 3.

165. The composition according to paragraphs 123 to 164, wherein the HDPE has a melt index less than 7 g/10 minutes.

166. The composition according to paragraphs 123 to 165, wherein the HDPE has a melt index less than 5 g/10 minutes.

167. The composition according to paragraphs 123 to 166, wherein the HDPE has a melt index less than 2 g/10 minutes.

168. The composition according to paragraphs 123 to 167, wherein the HDPE has a CDBI of at least about 50%.

169. The composition according to paragraphs 123 to 168, wherein the HDPE has a CDBI of at least about 60%.

170. The composition according to paragraphs 123 to 169, wherein the HDPE has a CDBI of at least about 70%.

171. The composition according to paragraphs 123 to 170, wherein the HDPE has a CDBI of at least about 80%.

172. A film comprising at least one layer, the at least one layer having a composition comprising:
(a) from about 11 to about 35 weight % low density modifier; and
(b) from about 89 to about 65 weight % of an HDPE having a density ranging from about 0.940 g/cc and less than 0.970 g/cc; and
wherein the weight % is based on the total weight of the low density modifier and the HDPE.

173. The film according to paragraph 172, wherein the film has a haze less than about 60 percent preferably less than about 55 percent, and more preferably less than about 50 percent.

174. The film according to paragraphs 172 or 173, wherein the film has a gloss greater than about 10, preferably greater than about 15.

175. The film according to paragraphs 172 to 174, wherein the film has a MD Elmendorf Tear greater than about 0.7 g/μm, preferably greater than about 0.9 g/μm, and more preferably greater than about 1.0 g/μm.

176. The film according to paragraphs 172 to 175, wherein the film has a TD Elmendorf Tear greater than about 18 g/μm, preferably greater than about 20 g/μm, and more preferably greater than about 25 g/μm.

177. The film according to paragraphs 172 to 176, wherein the film has a ratio of the TD Elmendorf Tear to MD Elmendorf Tear less than about 50, preferably less than about 35, and more preferably less than about 20.

178. The film according to paragraphs 172 to 177, wherein the film has a MD Elongation at Break greater than about 780%, preferably greater than about 800%, and more preferably greater than about 820%.

179. The film according to paragraphs 172 to 178, wherein the film has a TD Elongation at Break greater than about 930%, preferably greater than about 937%, and more preferably greater than about 945%.

180. The film according to paragraphs 172 to 179, wherein the film has an Average Elmendorf Tear (average of MD and TD Elmendorf Tear) greater than about 10 g/μm and an Average Elongation at Break (Average of MD and TD Elongation at Break) greater than about 780%, preferably an Average Elmendorf Tear greater than about 12 g/μm and an Average Elongation at Break greater than about 800%, and more preferably an Average Elmendorf Tear greater than about 12 g/μm and an Average Elongation at Break greater than about 850%.

181. The film according to paragraphs 172 to 180, wherein the film has a Dart prop according to Method A greater than about 1.0 g/μm preferably greater than about 1.5 g/μm and more preferably greater than about 2.0 g/μm.

182. The film according to paragraphs 172 to 181, wherein the film has a Reblock greater than about 5 g, preferably greater than about 6 g, and more preferably greater than about 10 g.

183. The film according to paragraphs 172 to 182, wherein the film has a Static COF greater than about 0.25, preferably greater than about 0.26, and more preferably greater than about 0.27.

184. The film according to paragraphs 172 to 183, wherein the film has a Kinetic COF greater than about 0.24, preferably greater than about 0.25, and more preferably greater than about 0.26.

185. The film according to paragraphs 172 to 184, wherein the film has a MD 1% Secant Modulus of less than about 860 g/μm, preferably less than about 800 g/μm, and more preferably less than about 720 g/μm.

186. The film according to paragraphs 172 to 185, wherein the film has a TD 1% Secant Modulus of less than about 1100 g/μm, preferably less than about 1050 g/μm, and more preferably less than about 1000 g/μm.

187. The film according to paragraphs 172 to 186, wherein the film has a ratio of the TD 1% Secant Modulus to MD 1% Secant Modulus is greater than 1.3, preferably greater than about 1.34, and more preferably greater than about 1.38.

188. The film according to paragraphs 172 to 187, wherein the film has a MD Tensile at Yield less than about 25 MPa, preferably less than about 23 MPa, and more preferably less than about 20 MPa.

189. The film according to paragraphs 172 to 188, wherein the film has a TD Tensile at Yield less than about 30 MPa, preferably less than about 25 MPa, and more preferably less than about 20 MPa.

190. The film according to paragraphs 172 to 189, wherein the film has a ratio of the TD Tensile at Yield 1% to MD Tensile at Yield is greater than 1.2, preferably greater than about 1.22, and more preferably greater than about 1.25.

191. The film according to paragraphs 172 to 190, wherein the film has a MD Tensile at 200% Elongation less than about 25 MPa, preferably less than about 20 MPa, and more preferably less than about 15 MPa.

192. The film according to paragraphs 172 to 191, wherein the film has a MD Ultimate Tensile greater than about 40 MPa, preferably greater than about 45 MPa, and more preferably greater than about 50 MPa.

193. The film according to paragraphs 172 to 192, wherein the film has a TD Ultimate Tensile greater than about 30 MPa, preferably greater than about 35 MPa, and more preferably greater than 40 MPa.

194. The film according to paragraphs 172 to 193, wherein the film has a Peak Puncture Force greater than about 1 Newton/μm, preferably greater than about 1.2 Newton/μm, and more preferably greater than about 1.5 Newton/μm.

195. The film according to paragraphs 172 to 194, wherein the film has a Puncture Break Energy greater than about 0.3 Joules/μm, and more preferably greater than about 0.4 Joules/μm.

196. The film according to paragraphs 172 to 195, wherein the film has a Puncture Break Energy greater than about 0.05 Joules/μm and an Average 1% Secant Modulus (average of MD and TD 1% Secant Modulus) greater than about 400 MPa, preferably a Puncture Break Energy greater than about 0.6 Joules/μm and an Average 1% Secant Modulus greater than about 600 MPa and, more preferably a Puncture Break Energy greater than about 0.06 Joules/μm and an Average 1% Secant Modulus greater than about 700 MPa.

197. The film according to paragraphs 172 to 196, wherein the film has a processing time from about 3 sec to 6 sec, preferably from about 4.0 sec to 5.5 sec, and more preferably from about 5.0 sec to 5.2 seconds.

198. The film according to paragraphs 172 to 197, wherein the film is a multi-layer having a first layer and a second layer in a ratio ranging from about 1:1 to about 1:8, preferably from about 1:1 to about 1:4, and more preferably 1:1 to about 1:2.

199. The film according to paragraphs 172 to 198, wherein the film is a multi-layer having a first layer, a second layer, and a third layer in a ratio ranging from about 1:1:1 to about 1:8:1, preferably from about 1:1:1 to about 1:4:1 and more preferably from about 1:1:1 to about 1:2:1.

200. The film according to paragraphs 172 to 199, wherein the film has a gauge ranging from about 55 microns to about 80 microns, preferably from about 70 microns to about 77 microns, and more preferably from about 74 microns to about 76 microns.

201. The film according to paragraphs 172 to 200, wherein the film has a melt viscosity greater than 0.011 Newton-seconds/mm$^2$, preferably greater than 0.015 Newton-seconds/mm$^2$, and more preferably greater than 0.019 Newton-seconds/mm$^2$.

202. The film according to paragraphs 172 to 201, wherein the film has a density less than 0.950 g/cc, preferably less than 0.940 g/cc, and more preferably less than 0.930 g/cc.

203. The composition according to paragraphs 171 to 202, wherein the film has a Seal Initiation temperature of less than about 140 Degrees Centigrade, preferably less than about 135 Degrees Centigrade, and more preferably less than about 130 Degrees Centigrade.

204. The film according to paragraphs 171 to 203, wherein the film has a maximum Hot Tack greater than about 2 N/25.4 mm, preferably greater than about 4 N/25.4 mm, and more preferably greater than about 6 N/25.4 mm.

205. The film according to paragraphs 171 to 204, wherein the film has a Hot Tack window greater than about 10 Degrees Centigrade, preferably greater than about 15 Degrees Centigrade, and more preferably greater than about 20 Degrees Centigrade.

206. The film according to paragraphs 171 to 205, wherein the film has a Heat Seal Plateau greater than about 2 pounds force, preferably greater than about 4 pounds force, and more preferably greater than about 6 pounds force.

207. The film according to paragraphs 171 to 206, wherein the film has a Heat Seal Plateau begin at a temperature of less than about 145 Degrees Centigrade, preferably less than about 140 Degrees Centigrade, and more preferably less than about 135 Degrees Centigrade.

208. The film according to paragraphs 171 to 207, wherein the film has a Heat Seal Plateau greater than about 60 Degrees Centigrade, preferably greater than about 40 Degrees Centigrade, and more preferably greater than about 20 Degrees Centigrade.

209. The film of paragraphs 171 to 208 formed into an article, wherein the article is selected from the group consisting of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementatious products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

210. The article of paragraph 209, wherein the article is a bag.

211. The article of paragraphs 209 to 210, wherein the article is a sack.

212. The article of paragraphs 209 to 211, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, roto-molded containers, industrial vessels, material handling, bumbers, and pipes.

213. A process for making an article, the process comprising:
    (a) blending
        (i) from about 11 to about 35 weight % low density modifier; and
        (ii) from about 89 to about 65 weight % of an HDPE having a density ranging from about 0.940 g/cc and less than 0.970 g/cc; and
        wherein the weight % is based on the total weight of the low density modifier and the HDPE; and
    (b) forming the m-EPDM-mPE blend into the article;
    wherein the weight % is based on the total weight of the mEPDM and the mLLDPE.

214. The process according to paragraph 213, wherein the forming of the article comprises one of blow molding, cast molding, injection molding, roto-molding or sheet thermo-forming.

215. The process according to paragraphs 213 or 214, wherein the article comprises one of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multi-wall sack liner, newspaper bags, nose tissue, olive oil packaging, oriented films, oriented polypropylene (OPP) films, packaging of beans, packaging of cementatious products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

216. The process according to paragraphs 213 to 215, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, rotomolded containers, industrial vessels, material handling, bumbers, and pipes.

217. A composition comprising:
    (a) from about 5 to about 50 weight % a low density modifier; and
    (b) from about 95 to about 50 weight % of a mLLDPE having a density ranging from about 0.910 to about 0.940 g/cc; and
    wherein the weight % is based on the total weight of the low density modifier and the mLLDPE, and
    wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

218. The composition of paragraphs 217, wherein the mEPDM comprises 70 to 85 weight percent of the amorphous major component, and 15 to 30 percent of the semicrystalline minor component.

219. The composition of paragraphs 217 or 218, wherein the mEPDM comprises 75 to 85 weight percent of the amorphous major component, and 15 to 25 percent of the semicrystalline minor component.

220. The composition of paragraphs 217 to 219, wherein the major component has from 60 to 68 weight percent ethylene derived units.

221. The composition of paragraphs 217 to 220, wherein the major component has from 60 to 66 weight percent ethylene derived units.

222. The composition of paragraphs 217 to 221, wherein the minor component has from 68 to 74 weight percent ethylene derived units.

223. The composition of paragraphs 217 to 222, wherein the minor component has from 69 to 73 weight percent ethylene derived units.

224. The composition of paragraphs 217 to 223, wherein the minor component has from 0.5 to 5 weight percent units derived from 5-ethylidene-2-norbornene, 5-vinyl-2-norbornene, or dicylcopentadiene.

225. The composition of paragraphs 217 to 224, wherein the major component has from 0.5 to 5 weight percent units derived from 5-ethylidene-2-norbornene, 5-vinyl-2-norbornene, or dicylcopentadiene.

226. The composition of paragraphs 217 to 225, wherein the mEPDM comprises has from 0.5 to 5 weight percent units derived from 5-ethylidene-2-norbornene, 5-vinyl-2-norbornene, or dicylcopentadiene.

227. The composition of paragraphs 217 to 226, wherein the minor component has from 1 to 4 weight percent units derived from 5-ethylidene-2-norbornene, 5-vinyl-2-norbornene, or dicylcopentadiene.

228. The composition of paragraphs 217 to 227, wherein the major component has from 1 to 4 weight percent units derived from 5-ethylidene-2-norbornene, 5-vinyl-2-norbornene, or dicylcopentadiene.

229. The composition of paragraphs 217 to 228, wherein the mEPDM has from 1 to 4 weight percent diene units derived from 5-ethylidene-2-norbornene, 5-vinyl-2-norbornene, or dicylcopentadiene.

230. The composition of paragraphs 217 to 229, wherein the alpha olefin derived units in both the major and minor components have 3, 4 or 6 carbon atoms.

231. The composition of paragraphs 217 to 230, wherein the alpha olefin derived units in both the major and minor components have 3 carbon atoms.

232. The composition of paragraphs 217 to 231, wherein the mEPDM has a percent crystallinity of from 0.5 to 1.5.

233. The composition of paragraphs 217 to 232, wherein the mEPDM has a percent crystallinity of from 0.75 to 1.5.

234. The composition of paragraphs 217 to 233, wherein the mEPDM has a percent crystallinity of from 0.8 to 1.5.

235. The composition of paragraphs 217 to 234, wherein viscosity of the major component is from one tenth to one twentieth of the minor component.

236. The composition of paragraphs 217 to 235, wherein viscosity of the mEPDM measured as ML (1+4) at 125° C. is from 30 to 90.

237. The composition of paragraphs 217 to 236, wherein viscosity of the mEPDM measured as ML (1+4) at 125° C. is from 55 to 70.

238. The composition of paragraphs 217 to 237, wherein both the major and minor components have $M_w/M_n$ of from 2 to 3.

239. The composition of paragraphs 217 to 238, wherein both the major and minor components have $M_w/M_n$ of from 2 to 2.5.

240. The composition of paragraphs 217 to 239, wherein the mEPDM has a $M_w/M_n$ of from 2 to 5.

241. The composition of paragraphs 217 to 240, wherein the mEPDM has a $M_w/M_n$ of from 2 to 3.

242. The composition of paragraphs 217 to 241, wherein the mEPDM is substantially free of long chain branching.

243. The composition of paragraphs 217 to 242, wherein the branching index ranges from about 0.7 to about 1.0.

244. The composition of paragraphs 217 to 243, wherein the branching index ranges from about 0.8 to about 1.0.

245. The composition of paragraphs 217 to 244, wherein the branching index ranges from about 0.9 to about 1.0.

246. The composition of paragraphs 217 to 245, wherein the composition comprises from about 11 to about 30 weight % mEPDM.

247. The composition of paragraphs 217 to 246, wherein the composition comprises from about 11 to about 20 weight % mEPDM.

248. The composition of paragraphs 217 to 247, wherein the composition comprises from about 89 to about 70 weight % of the mLLDPE.

249. The composition of paragraphs 217 to 248, wherein the composition comprises from about 89 to about 80 weight % of the mLLDPE.

250. The composition of paragraphs 217 to 249, wherein the mLLDPE has a density greater than or equal to about 0.910 g/cc and less than about 0.940 g/cc.

251. The composition of paragraphs 217 to 250, wherein the mLLDPE has a density greater than or equal to about 0.916 g/cc and less than about 0.940 g/cc.

252. The composition of paragraphs 217 to 251, wherein the mLLDPE has a density greater than or equal to about 0.916 g/cc and less than about 0.929 g/cc.

253. The composition of paragraphs 217 to 252, wherein the mLLDPE comprises a $C_3$ to $C_{20}$ olefin comonomer.

254. A film formed from the compositions of paragraphs 217 to 253, wherein the film is formed by a process selected from the group consisting of cast extrusion or blown extrusion.

255. The film according to paragraph 254, wherein the film has a melt viscosity less than 0.019 Newton-seconds/mm$^2$, preferably less than 0.015 Newton-seconds/mm$^2$, and more preferably less than 0.011 Newton-seconds/mm$^2$.

256. The film according to paragraphs 254 to 255, wherein the film has a draw ratio greater than 14, preferably greater than 15, and more preferably greater than 16.

257. The film according to paragraphs 254 to 256, wherein the film has a Reblock greater than about 70 grams, preferably 130 g, more preferably greater than about 168 g, and still more preferably greater than about 206 g.

258. The film according to paragraphs 254 to 257, wherein the film has a Kinetic coefficient of friction from about 0.8 to about 1.2, preferably from about 0.9 to about 1.1, and more preferably about 1.0.

259. The film according to paragraphs 254 to 258, wherein the film has a Kinetic COF of at least about 85% of the Kinetic COF of the mLLDPE.

260. The film according to paragraphs 254 to 259, wherein the film has a Static coefficient of friction from about 0.8 to about 1.2, preferably from about 0.9 to about 1.1, and more preferably about 1.0.

261. The film according to paragraphs 254 to 260, wherein the film has a Static COF of at least about 85% of the Static COF of the mLLDPE.

262. The film according to paragraphs 254 to 261, wherein the mLLDPE has a density from about 0.910 to about 0.925 g/cc.

263. A method of forming the films of paragraphs 254 to 262, into an article, comprising:
- (c) contacting a first film portion with a second film portion; and
- (d) allowing the first film portion and the second film portion to become adhered together,
- wherein the first film portion and the second film portion may be part of the same or different film.

264. The method of paragraph 263, wherein the film is folded onto itself and pressed together to form a seal.

265. The composition of paragraphs 217 to 254, wherein the $C_3$ to $C_{20}$ olefin comonomer comprises one or more of propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1, styrene, alpha-methyl styrene, para-alkyl styrene (such as para-methyl styrene), hexadiene, norbornene, vinyl norbornene, ethylidene norbornene, butadiene, isoprene, heptadiene, octadiene, or cyclopentadiene.

266. The composition of paragraphs 217 to 254, wherein the $C_3$ to $C_{20}$ olefin comonomer comprises one or more of propylene, butene, hexene or octene.

267. The composition according to paragraphs 217 to 254, wherein the mLLDPE has a molecular weight distribution of from about 1 to about 5.

268. The composition according to paragraphs 217 to 254, wherein the mLLDPE has a molecular weight distribution of from about 1 to about 3.

269. The composition according to paragraphs 217 to 254, wherein the mLLDPE has a molecular weight distribution of from about 2 to about 3.

270. The composition according to paragraphs 217 to 254, wherein the mLLDPE has a melt index less than 7 g/10 minutes.

271. The composition according to paragraphs 217 to 254, wherein the mLLDPE has a melt index less than 5 g/10 minutes.

272. The composition according to paragraphs 217 to 254, wherein the mLLDPE has a melt index less than 2 g/10 minutes.

273. The composition according to paragraphs 217 to 254, wherein the mLLDPE has a CDBI of at least about 50%.

274. The composition according to paragraphs 217 to 254, wherein the mLLDPE has a CDBI of at least about 60%.

275. The composition according to paragraphs 217 to 254, wherein the mLLDPE has a CDBI of at least about 70%.

276. The composition according to paragraphs 217 to 254, wherein the mLLDPE has a CDBI of at least about 80%.

277. A film comprising at least one layer, the at least one layer having a composition comprising:
- (a) from about 5 to about 50 weight % a low density modifier; and
- (b) from about 95 to about 50 weight % of a mLLDPE having a density ranging from about 0.910 to about 0.940 g/cc; and
- wherein the weight % is based on the total weight of the low density modifier and the mLLDPE, and
- wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

278. The film of paragraph 277, wherein the film is formed by a process selected from the group consisting of cast extrusion or blown extrusion.

279. The film of paragraphs 277 or 278, wherein the film is formed by blown extrusion, and the mLLDPE has a density ranging from 0.910 to 0.940 g/cc and a melt index less than 7.

280. The film of paragraphs 277 to 279, wherein the film is formed by blown extrusion, and the mLLDPE has having a density ranging from 0.910 to 0.940 g/cc and a melt index less than 5 g/10 minutes.

281. The film of paragraphs 277 to 280, wherein the film is formed by blown extrusion, and the mLLDPE has having a density ranging from 0.910 to 0.940 g/cc and a melt index less than 2 g/10 minutes.

282. The film of paragraphs 277 to 281, wherein the film is formed by cast extrusion, and the mLLDPE has having a density ranging from 0.910 to 0.940 g/cc and a melt index greater than or equal to 2 g/10 min.

283. The film of paragraphs 277 to 282, wherein the film is formed by cast extrusion, and the mLLDPE has having a density ranging from 0.910 to 0.940 g/cc and a melt index greater than or equal to 5 g/10 min.

284. The film of paragraphs 277 to 283, wherein the film is formed by cast extrusion, and the mLLDPE has having a density ranging from 0.910 to 0.940 g/cc and a melt index greater than or equal to 7 g/10 min.

285. The film according to paragraphs 277 to 284, wherein the film has a haze less than about 50 percent preferably less than about 20 percent, and more preferably less than about 15 percent.

286. The film according to paragraphs 277 to 285, wherein the film has a gloss greater than about 37, preferably greater than about 45, and more preferably greater than about 53.

287. The film according to paragraphs 277 to 286, wherein the film has a MD Elmendorf Tear greater than about 9.2 g/μm, preferably greater than about 9.6 g/μm, and more preferably greater than about 10.1 g/μm.

288. The film according to paragraphs 277 to 287, wherein the film has a TD Elmendorf Tear greater than about 10 g/μm, preferably greater than about 15 g/μm, and more preferably greater than about 17 g/μm.

289. The film according to paragraphs 277 to 288, wherein the film has a ratio of the TD Elmendorf Tear to MD Elmendorf Tear less than about 3, preferably less than about 2.7, and more preferably less than about 2.

290. The film according to paragraphs 277 to 289, wherein the film has a MD Elongation at break greater than about 705%, preferably greater than about 709%, and more preferably greater than about 714%.

291. The film according to paragraphs 277 to 290, wherein the film has a TD Elongation at break greater than about 720%, preferably greater than about 740%, and more preferably greater than about 760%.

292. The film according to paragraphs 277 to 291, wherein the film has an Average Elmendorf Tear (average of MD and TD Elmendorf Tear) greater than about 10 g/μm and an Average Elongation at Break (Average of MD and TD Elongation at Break) greater than about 750%, preferably an Average Elmendorf Tear greater than about 12 g/μm and an Average Elongation at Break greater than about 800%, and more preferably an Average Elmendorf Tear greater than about 12 g/µm and an Average Elongation at Break greater than about 850%.

293. The film according to paragraphs 277 to 292, the mLLDPE has a density ranging from 0.910 to 0.925 g/cc and the film has a Dart prop, according to Method A, greater than about 13 g/µm preferably greater than about 30 g/µm and more preferably greater than about 40 g/µm.

294. The film according to paragraphs 277 to 293, wherein the film has a Reblock greater than about 130 g, preferably greater than about 168 g, and more preferably greater than about 206 g.

295. The film according to paragraphs 277 to 294, wherein the film has a MD 1% Secant Modulus of less than about 220 MPa, preferably less than about 195 MPa, and more preferably less than about 170 MPa.

296. The film according to paragraphs 277 to 295, wherein the film has a TD 1% Secant Modulus of less than about 240 MPa, preferably less than about 230 MPa, and more preferably less than about 225 MPa.

297. The film according to paragraphs 277 to 296, wherein the film has a ratio of the TD 1% Secant Modulus to MD 1% Secant Modulus greater than 1, preferably greater than about 1.1, and more preferably greater than about 1.2.

298. The film according to paragraphs 277 to 297, wherein the film has a MD Tensile at Yield less than about 9.5 MPa, preferably less than about 9.0 MPa, and more preferably less than about 8.5 MPa.

299. The film according to paragraphs 277 to 298, wherein the film has a TD Tensile at Yield less than about 10.5 MPa, preferably less than about 10.0 MPa, and more preferably less than about 9.5 MPa.

300. The film according to paragraphs 277 to 299, wherein the film has a MD Tensile at 200% Elongation less than about 13 MPa, preferably less than about 12 MPa, and more preferably less than about 11 MPa.

301. The film according to paragraphs 277 to 300, wherein the film has a MD Ultimate Tensile greater than about 45 MPa, preferably greater than about 50 MPa, and more preferably greater than about 55 MPa.

302. The film according to paragraphs 277 to 301, wherein the film has a TD Ultimate Tensile greater than about 48 MPa, preferably greater than about 50 MPa, and more preferably greater than about 52 MPa.

303. The film according to paragraphs 277 to 302, wherein the mLLDPE has a density ranging from 0.926 to 0.940 g/cc and the film has a Dart prop according to Method A greater than about 5.3 g/µm preferably greater than about 5.5 g/µm and more preferably greater than about 5.6 g/µm.

304. The film according to paragraphs 277 to 303, wherein the film has a melt viscosity greater than 0.011 Newton-seconds/mm$^2$, preferably greater than 0.015 Newton-seconds/mm$^2$, and more preferably greater than 0.019 Newton-seconds/mm$^2$.

305. The film according to paragraphs 277 to 304, wherein the film has a density less than 0.950 g/cc, preferably less than 0.940 g/cc, and more preferably less than 0.930 g/cc.

306. The film according to paragraphs 277 to 305, wherein the film has a Reblock greater than about 40 g, preferably greater than about 50 g, and more preferably greater than about 60 g.

307. The film according to paragraphs 277 to 306, wherein the film has a Static COF less than about 0.15, preferably less than about 0.14, and more preferably less than about 0.13.

308. The film according to paragraphs 277 to 307, wherein the film has a Static COF less than about 85% of the Static COF of the mLLDPE, preferably less than about 80% of the Static COF of the mLLDPE, and more preferably less than about 75% of the Static COF of the mLLDPE.

309. The film according to paragraphs 277 to 308, wherein the film has a Kinetic COF less than about 0.13, preferably less than about 0.12, and more preferably less than about 0.11.

310. The film according to paragraphs 277 to 309, wherein the film has a Kinetic COF less than about 85% of the Static COF of the mLLDPE, preferably less than about 75% of the Kinetic COF of the mLLDPE, and more preferably less than about 70% of the Kinetic COF of the mLLDPE.

311. The film according to paragraphs 277 to 310, wherein the film has a ratio of TD 1% Secant Modulus to MD 1% Secant Modulus greater than 1.0, preferably greater than about 1.1, and more preferably greater than about 1.2.

312. The film according to paragraphs 277 to 311, wherein the film has a ratio of TD Tensile at Yield to MD Tensile at Yield greater than about 7, preferably greater than about 10, and more preferably greater than about 13.

313. The film according to paragraphs 277 to 312, wherein the film has a MD Tensile at 200% Elongation less than about 12 MPa, preferably less than about 13 MPa, and more preferably less than about 14 MPa.

314. The film according to paragraphs 277 to 313, wherein the film has a blow up ratio from about 1 to about 4, preferably from about 1.5 to about 3, and more preferably from about 2 to about 2.5.

315. The film according to paragraphs 277 to 314, wherein the film has a processing time from about 3 sec to 6 sec, preferably from about 4.0 sec to 5.5 sec, and more preferably from about 5.0 sec to 5.2 seconds.

316. The film according to paragraphs 277 to 315, wherein the film is a multi-layer having a first layer and a second layer in a ratio ranging from about 1:1 to about 1:8, preferably from about 1:1 to about 1:4, and more preferably 1:1 to about 1:2.

317. The film according to paragraphs 277 to 316, wherein the film is a multi-layer having a first layer, a second layer, and a third layer in a ratio ranging from about 1:1:1 to about 1:8:1, preferably from about 1:1:1 to about 1:4:1 and more preferably from about 1:1:1 to about 1:2:1.

318. The film according to paragraphs 277 to 317, wherein the mPE is a mLLDPE having a density ranging from 0.910 to 0.925 g/cc and wherein the film has a gauge ranging from about 55 microns to about 80 microns, preferably from about 70 microns to about 77 microns, and more preferably from about 74 microns to about 76 microns.

319. The film according to paragraphs 277 to 318, wherein the film has a MD Elmendorf Tear ranging from about 500 g to about 1300 g, preferably from about 700 g to about 1300 g; more preferably from about 800 g to about 1300 g.

320. The film according to paragraphs 277 to 319, wherein the film has a TD Elmendorf Tear ranging from about 500 g to about 1700 g, preferably from about 1000 g to about 1700 g; more preferably from about 1200 g to about 1700 g.

321. The film according to paragraphs 277 to 320, wherein the film has a MD Elongation at break greater than about 700%.

322. The film according to paragraphs 277 to 321, wherein the film has a TD Elongation at break greater than about 700%.

323. The film according to paragraphs 277 to 322, wherein the mPE is a mLLDPE having a density ranging from 0.910 to 0.925 g/cc and the film has a dart impact ranging from about 715 g to about 1040 g, preferably from about 2100 g to about 2310 g; more preferably from about 2960 g to about 3040 g.

324. The film according to paragraphs 277 to 323, wherein the mPE is a mLLDPE having a density ranging from 0.926 to 0.940 g/cc and wherein the film has a gauge ranging from about 55 microns to about 80 microns, preferably from about 70 microns to about 77 microns, and more preferably from about 74 microns to about 76 microns.

325. The film according to paragraphs 277 to 324, wherein the film has a maximum Hot Tack greater than about 2 N/25.4 mm, preferably greater than about 4 N/25.4 mm, and more preferably greater than about 6 N/25.4 mm.

326. The film according to paragraphs 277 to 325, wherein the film has a Hot Tack window greater than about 10 Degrees Centigrade, preferably greater than about 15 Degrees Centigrade, and more preferably greater than about 20 Degrees Centigrade.

327. The film according to paragraphs 277 to 326, wherein the film has a Heat Seal Plateau greater than about 2 pounds force, preferably greater than about 3 pounds force, and more preferably greater than about 4 pounds force.

328. The film according to paragraphs 277 to 327, wherein the film has a Heat Seal Plateau begin at a temperature of less than about 125 Degrees Centigrade, preferably less than about 120 Degrees Centigrade, and more preferably less than about 115 Degrees Centigrade.

329. The film according to paragraphs 277 to 328, wherein the film has a Heat Seal Plateau greater than about 60 Degrees Centigrade, preferably greater than about 40 Degrees Centigrade, and more preferably greater than about 20 Degrees Centigrade.

330. The film according to paragraphs 277 to 329, wherein the film has a dart impact ranging from about 290 g to about 450 g, preferably from about 350 g to about 450 g; more preferably from about 400 g to about 450 g.

331. The film of paragraphs 277 to 330 formed into an article, wherein the article is selected from the group consisting of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementatious products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

332. The article of paragraph 331, wherein the article is a bag.

333. The article of paragraphs 331 or 332, wherein the article is a sack.

334. The article of paragraphs 331 to 333, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, rotomolded containers, industrial vessels, material handling, bumbers, and pipes.

335. A process for making an article, the process comprising:
  (a) blending
    (i) from about 5 to about 50 weight % a low density modifier; and
    (ii) from about 95 to about 50 weight % of a mLLDPE having a
    density ranging from about 0.910 to about 0.940 g/cc; and
    wherein the weight % is based on the total weight of the low density modifier and the mLLDPE, and
    wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend; and
  (b) forming the m-EPDM-mPE blend into the article;
  wherein the weight % is based on the total weight of the mEPDM and the mLLDPE.

336. The process according to paragraph 335, wherein the forming of the article comprises one of blow molding, cast molding, injection molding, roto-molding or sheet thermoforming.

337. The process according to paragraphs 335 or 336, wherein the article comprises one of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multi-wall sack liner, newspaper bags, nose tissue, olive oil packaging, oriented films, oriented polypropylene (OPP) films, packaging of beans, packaging of cementations products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

338. The process according to paragraphs 335 to 337, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, rotomolded containers, industrial vessels, material handling, bumbers, and pipes.

339. A composition comprising:
(a) from about 5 to about 50 weight % low density modifier; and
(b) from about 90 to about 50 weight % of an HDPE having a density ranging from about 0.940 g/cc and less than 0.970 g/cc; and
wherein the weight % is based on the total weight of the low density modifier and the HDPE, and
wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

340. The composition of paragraph 339, wherein the mEPDM comprises 70 to 85 weight percent of the amorphous major component, and 15 to 30 percent of the semicrystalline minor component.

341. The composition of paragraphs 339 or 340, wherein the mEPDM comprises 75 to 85 weight percent of the amorphous major component, and 15 to 25 percent of the semicrystalline minor component.

342. The composition of paragraphs 339 to 341, wherein the major component has from 60 to 68 weight percent ethylene derived units.

343. The composition of paragraphs 339 to 342, wherein the major component has from 60 to 66 weight percent ethylene derived units.

344. The composition of paragraphs 339 to 343, wherein the minor component has from 68 to 74 weight percent ethylene derived units.

345. The composition of paragraphs 339 to 344, wherein the minor component has from 69 to 73 weight percent ethylene derived units.

346. The composition of paragraphs 339 to 345, wherein the minor component has from 0.5 to 5 weight percent units derived from 5-ethylidene-2-norbornene, 5-vinyl-2-norbornene, or dicylcopentadiene.

347. The composition of paragraphs 339 to 346, wherein the major component has from 0.5 to 5 weight percent units derived from 5-ethylidene-2-norbornene, 5-vinyl-2-norbornene, or dicylcopentadiene.

348. The composition of paragraphs 339 to 347, wherein the mEPDM comprises has from 0.5 to 5 weight percent units derived from 5-ethylidene-2-norbornene, 5-vinyl-2-norbornene, or dicylcopentadiene.

349. The composition of paragraphs 339 to 348, wherein the minor component has from 1 to 4 weight percent units derived from 5-ethylidene-2-norbornene, 5-vinyl-2-norbornene, or dicylcopentadiene.

350. The composition of paragraphs 339 to 349, wherein the major component has from 1 to 4 weight percent units derived from 5-ethylidene-2-norbornene, 5-vinyl-2-norbornene, or dicylcopentadiene.

351. The composition of paragraphs 339 to 350, wherein the mEPDM has from 1 to 4 weight percent diene units derived from 5-ethylidene-2-norbornene, 5-vinyl-2-norbornene, or dicylcopentadiene.

352. The composition of paragraphs 339 to 351, wherein the alpha olefin derived units in both the major and minor components have 3, 4 or 6 carbon atoms.

353. The composition of paragraphs 339 to 352, wherein the alpha olefin derived units in both the major and minor components have 3 carbon atoms.

354. The composition of paragraphs 339 to 353, wherein the mEPDM has a percent crystallinity of from 0.5 to 1.5.

355. The composition of paragraphs 339 to 354, wherein the mEPDM has a percent crystallinity of from 0.5 to 0.75.

356. The composition of paragraphs 339 to 355, wherein the mEPDM has a percent crystallinity of from 0.5 to 0.65.

357. The composition of paragraphs 339 to 356, wherein viscosity of the major component is from one tenth to one twentieth of the minor component.

358. The composition of paragraphs 339 to 357, wherein viscosity of the mEPDM measured as ML (1+4) at 125° C. is from 30 to 90.

359. The composition of paragraphs 339 to 358, wherein viscosity of the mEPDM measured as ML (1+4) at 125° C. is from 55 to 70.

360. The composition of paragraphs 339 to 359, wherein both the major and minor components have $M_w/M_n$ of from 2 to 3.

361. The composition of paragraphs 339 to 360, wherein both the major and minor components have $M_w/M_n$ of from 2 to 2.5.

362. The composition of paragraphs 339 to 361, wherein the mEPDM has a $M_w/M_n$ of from 2 to 5.

363. The composition of paragraphs 339 to 362, wherein the mEPDM has a $M_w/M_n$ of from 2 to 3.

364. The composition of paragraphs 339 to 363, wherein the mEPDM is substantially free of long chain branching.

365. The composition of paragraphs 339 to 364, wherein the branching index ranges from about 0.7 to about 1.0.

366. The composition of paragraphs 339 to 365, wherein the branching index ranges from about 0.8 to about 1.0.

367. The composition of paragraphs 339 to 366, wherein the branching index ranges from about 0.9 to about 1.0.

368. The composition of paragraphs 339 to 367, wherein the composition comprises from about 11 to about 30 weight % mEPDM.

369. The composition of paragraphs 339 to 368, wherein the composition comprises from about 11 to about 20 weight % mEPDM.

370. The composition of paragraphs 339 to 369, wherein the composition comprises from about 89 to about 70 weight % of the HDPE.

371. The composition of paragraphs 339 to 370, wherein the composition comprises from about 89 to about 80 weight % of the HDPE.

372. The composition of paragraphs 339 to 371, wherein the HDPE has a density greater than or equal to about 0.950 g/cc and less than about 0.970 g/cc.

373. The composition of paragraphs 339 to 372, wherein the HDPE has a density greater than or equal to about 0.955 g/cc and less than about 0.960 g/cc.

374. The composition of paragraphs 339 to 373, wherein the HDPE comprises a $C_3$ to $C_{20}$ olefin comonomer.

375. The composition of paragraphs 339 to 374, wherein the $C_3$ to $C_{20}$ olefin comonomer comprises one or more of propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1, styrene, alpha-methyl styrene, para-alkyl styrene (such as para-methyl styrene), hexadiene, norbornene, vinyl norbornene, ethylidene norbornene, butadiene, isoprene, heptadiene, octadiene, or cyclopentadiene.

376. The composition of paragraphs 339 to 375, wherein the $C_3$ to $C_{20}$ olefin comonomer comprises one or more of propylene, butene, hexene or octene.

377. The composition according to paragraphs 339 to 376, wherein the HDPE has a molecular weight distribution of from about 1 to about 15.

378. The composition according to paragraphs 339 to 377, wherein the HDPE has a molecular weight distribution of from about 1 to about 10.

379. The composition according to paragraphs 339 to 378, wherein the HDPE has a molecular weight distribution of from about 2 to about 3.

380. The composition according to paragraphs 339 to 379, wherein the HDPE has a melt index less than 7 g/10 minutes.

381. The composition according to paragraphs 339 to 380, wherein the HDPE has a melt index less than 5 g/10 minutes.

382. The composition according to paragraphs 339 to 381, wherein the HDPE has a melt index less than 2 g/10 minutes.

383. The composition according to paragraphs 339 to 382, wherein the HDPE has a CDBI of at least about 50%.

384. The composition according to paragraphs 339 to 383, wherein the HDPE has a CDBI of at least about 60%.

385. The composition according to paragraphs 339 to 384, wherein the HDPE has a CDBI of at least about 70%.

386. The composition according to paragraphs 339 to 385, wherein the HDPE has a CDBI of at least about 80%.

387. A film comprising at least one layer, the at least one layer having a composition comprising:
(a) from about 5 to about 50 weight % low density modifier; and
(b) from about 90 to about 50 weight % of an HDPE having a density ranging from about 0.940 g/cc and less than 0.970 g/cc; and
wherein the weight % is based on the total weight of the low density modifier and the HDPE, and
wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

388. The film according to paragraph 387, wherein the film has a haze less than about 60 percent preferably less than about 55 percent, and more preferably less than about 50 percent.

389. The film according to paragraphs 387 or 388, wherein the film has a gloss greater than about 10, preferably greater than about 15.

390. The film according to paragraphs 387 to 389, wherein the film has a MD Elmendorf Tear greater than about 0.7 g/μm, preferably greater than about 0.9 g/μm, and more preferably greater than about 1.0 g/μm. (see Power Point Slide 45)

391. The film according to paragraphs 387 to 390, wherein the film has a TD Elmendorf Tear greater than about 18 g/μm, preferably greater than about 20 g/μm, and more preferably greater than about 25 g/μm.

392. The film according to paragraphs 387 to 391, wherein the film has a ratio of the TD Elmendorf Tear to MD Elmendorf Tear less than about 50, preferably less than about 35, and more preferably less than about 20.

393. The film according to paragraphs 387 to 392, wherein the film has a MD Elongation at Break greater than about 780%, preferably greater than about 800%, and more preferably greater than about 820%.

394. The film according to paragraphs 387 to 393, wherein the film has a TD Elongation at Break greater than about 930%, preferably greater than about 937%, and more preferably greater than about 945%.

395. The film according to paragraphs 387 to 394, wherein the film has an Average Elmendorf Tear (average of MD and TD Elmendorf Tear) greater than about 10 g/μm and an Average Elongation at Break (Average of MD and TD Elongation at Break) greater than about 780%, preferably an Average Elmendorf Tear greater than about 12 g/μm and an Average Elongation at Break greater than about 800%, and more preferably an Average Elmendorf Tear greater than about 12 g/μm and an Average Elongation at Break greater than about 850%.

396. The film according to paragraphs 387 to 395, wherein the film has a Dart prop according to Method A greater than about 1.0 g/μm preferably greater than about 1.5 g/μm and more preferably greater than about 2.0 g/μm.

397. The film according to paragraphs 387 to 396, wherein the film has a Reblock greater than about 5 g, preferably greater than about 6 g, and more preferably greater than about 10 g.

398. The film according to paragraphs 387 to 397, wherein the film has a Static COF greater than about 0.25, preferably greater than about 0.26, and more preferably greater than about 0.27.

399. The film according to paragraphs 387 to 398, wherein the film has a Kinetic COF greater than about 0.24, preferably greater than about 0.25, and more preferably greater than about 0.26.

400. The film according to paragraphs 387 to 399, wherein the film has a MD 1% Secant Modulus of less than about 860 g/μm, preferably less than about 800 g/μm, and more preferably less than about 720 g/μm.

401. The film according to paragraphs 387 to 400, wherein the film has a TD 1% Secant Modulus of less than about 1100 g/μm, preferably less than about 1050 g/μm, and more preferably less than about 1000 g/μm.

402. The film according to paragraphs 387 to 401, wherein the film has a ratio of the TD 1% Secant Modulus to MD 1% Secant Modulus is greater than 1.3, preferably greater than about 1.34, and more preferably greater than about 1.38.

403. The film according to paragraphs 387 to 402, wherein the film has a MD Tensile at Yield less than about 25 MPa, preferably less than about 23 MPa, and more preferably less than about 20 MPa.

404. The film according to paragraphs 387 to 403, wherein the film has a TD Tensile at Yield less than about 30 MPa, preferably less than about 25 MPa, and more preferably less than about 20 MPa.

405. The film according to paragraphs 387 to 404, wherein the film has a ratio of the TD Tensile at Yield 1% to MD Tensile at Yield is greater than 1.2, preferably greater than about 1.22, and more preferably greater than about 1.25.

406. The film according to paragraphs 387 to 405, wherein the film has a MD Tensile at 200% Elongation less than about 25 MPa, preferably less than about 20 MPa, and more preferably less than about 15 MPa.

407. The film according to paragraphs 387 to 406, wherein the film has a MD Ultimate Tensile greater than about 40 MPa, preferably greater than about 45 MPa, and more preferably greater than about 50 MPa.

408. The film according to paragraphs 387 to 407, wherein the film has a TD Ultimate Tensile greater than about 30 MPa, preferably greater than about 35 MPa, and more preferably greater than about 40 MPa.

409. The film according to paragraphs 387 to 408, wherein the film has a Peak Puncture Force greater than about 1 Newton/μm, preferably greater than about 1.2 Newton/μm, and more preferably greater than about 1.5 Newton/μm.

410. The film according to paragraphs 387 to 409, wherein the film has a Puncture Break Energy greater than about 0.3 Joules/μm, and more preferably greater than about 0.4 Joules/μm.

411. The film according to paragraphs 387 to 410, wherein the film has a Puncture Break Energy greater than about 0.05 Joules/μm and an Average 1% Secant Modulus (average of MD and TD 1% Secant Modulus) greater than about 400 MPa, preferably a Puncture Break Energy greater than about 0.6 Joules/μm and an Average 1% Secant Modulus greater than about 600 MPa and, more preferably a Puncture Break Energy greater than about 0.06 Joules/μm and an Average 1% Secant Modulus greater than about 700 MPa.

412. The film according to paragraphs 387 to 411, wherein the film has a processing time from about 3 sec to 6 sec, preferably from about 4.0 sec to 5.5 sec, and more preferably from about 5.0 sec to 5.2 seconds.

413. The film according to paragraphs 387 to 412, wherein the film is a multi-layer having a first layer and a second layer in a ratio ranging from about 1:1 to about 1:8, preferably from about 1:1 to about 1:4, and more preferably 1:1 to about 1:2.

414. The film according to paragraphs 387 to 413, wherein the film is a multi-layer having a first layer, a second layer, and a third layer in a ratio ranging from about 1:1:1 to about 1:8:1, preferably from about 1:1:1 to about 1:4:1 and more preferably from about 1:1:1 to about 1:2:1. (see Power Point Slide)

415. The film according to paragraphs 387 to 414, wherein the film has a gauge ranging from about 55 microns to about 80 microns, preferably from about 70 microns to about 77 microns, and more preferably from about 74 microns to about 76 microns.

416. The film according to paragraphs 387 to 415, wherein the film has a Seal Initiation temperature of less than about 140 Degrees Centigrade, preferably less than about 135 Degrees Centigrade, and more preferably less than about 130 Degrees Centigrade.

417. The film according to paragraphs 387 to 416, wherein the film has a maximum Hot Tack greater than about 2 N/25.4 mm, preferably greater than about 4 N/25.4 mm, and more preferably greater than about 6 N/25.4 mm.

418. The film according to paragraphs 387 to 417, wherein the film has a Hot Tack window greater than about 10 Degrees Centigrade, preferably greater than about 15 Degrees Centigrade, and more preferably greater than about 20 Degrees Centigrade.

419. The film according to paragraphs 387 to 418, wherein the film has a Heat Seal Plateau greater than about 2 pounds force, preferably greater than about 4 pounds force, and more preferably greater than about 6 pounds force.

420. The film according to paragraphs 387 to 419, wherein the film has a Heat Seal Plateau begin at a temperature of less than about 145 Degrees Centigrade, preferably less than about 140 Degrees Centigrade, and more preferably less than about 135 Degrees Centigrade.

421. The film according to paragraphs 387 to 420, wherein the film has a Heat Seal Plateau greater than about 60 Degrees Centigrade, preferably greater than about 40 Degrees Centigrade, and more preferably greater than about 20 Degrees Centigrade.

422. The film of paragraphs 387 to 421 formed into an article, wherein the article is selected from the group consisting of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementations products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

423. The article of paragraphs 422, wherein the article is a bag.

424. The article of paragraphs 422 or 423, wherein the article is a sack.

425. The article of paragraphs 422 to 424, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, roto-molded containers, industrial vessels, material handling, bumbers, and pipes.

426. A process for making an article, the process comprising:
    (a) blending
        (i) from about 5 to about 50 weight % low density modifier; and
        (ii) from about 90 to about 50 weight % of an HDPE having a density ranging from about 0.940 g/cc and less than 0.970 g/cc; and
    wherein the weight % is based on the total weight of the low density modifier and the HDPE, and
    wherein the low density modifier comprises a metallocene catalyzed reactor-blended polymer of: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend; and
    (b) forming the m-EPDM-mPE blend into the article;
    wherein the weight % is based on the total weight of the mEPDM and the mLLDPE.

427. The process according to paragraph 426, wherein the forming of the article comprises one of blow molding, cast molding, injection molding, roto-molding or sheet thermoforming.

428. The process according to paragraphs 426 or 427, wherein the article comprises one of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carryout sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementations products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

429. The process according to paragraphs 426 to 429, wherein the article is selected from the group consisting of flexible tubing, hoses, foam sheet, wire and cable applications, lids, injection molded products, injection molded plugs, housewares, housewares, tanks, caps and closures, toys, lids, pails, gas tanks, crates, drums, base cups, household industrial bottles, chemicals (hic), profile extrusion, color concentrates, tubing, additive masterbatches, pails, crates, housewares, toys, rotomolded containers, industrial vessels, material handling, bumbers, and pipes.

430. A process for making a composition, the process comprising:
blending
(a) from about 5 to about 50 weight % pelletized mEPDM; and
(b) from about 95 weight % to about 50 weight % of a first mPE;
wherein the weight % is based on the total weight of the mEPDM and the mPE.

431. The process of paragraph 430, wherein the pelletized mEPDM and the first mPE are blended within a hopper of a blown-film extruder.
   a. The process of paragraphs 430 or 431, wherein the pelletized mEPDM and the first mPE are compounded to form a rubber modified resin and the process further includes blending the rubber modified resin and a second mPE.

432. The process of paragraphs 430 to 432, wherein the first mPE and the second mPE are both mLLDPE, wherein the difference between the density of the first mPE and the density of the second mPE is within 0.01 g/cc, and wherein the difference between the melt index of the first mPE and the melt index of the second mPE is within 1 g/10 minute.

433. A process for making a composition, the process comprising blending:
(a) from about 11 to about 35 weight % low density modifier; and
(b) from about 89 to about 65 weight % of a PE;
wherein the low density modifier and the PE are blended during the polymerization of the rubber.

434. A process for making a composition, the process comprising blending:
(a) from about 11 to about 35 weight % low density modifier; and
(b) from about 89 to about 65 weight % of a PE;
wherein the low density modifier and the PE are blended during the polymerization of the PE.

435. A process for making a film, the process comprising:
(1) blending:
(a) from about 5 to about 95 weight % pelletized mEPDM; and
(b) from about 95 weight % to about 5 weight % of a PE; to form a mEPDM-PE blend; and
(2) forming the mEPDM-PE blend into a mEPDM-PE masterbatch:
(3) blending:
(a) from about 5 to about 95 weight % mEPDM-PE masterbatch; and
(b) from about 95 weight % to about 5 weight % of a first mPE;
to form a mEPDM-mPE blend comprising
(a) from about 5 to about 50 weight % pelletized mEPDM; and
(b) from about 95 weight % to about 50 weight % of a first mPE;
to form a mEPDM-mPE blend; and
(4) forming the mEPDM-mPE blend into the film;
wherein the weight % is based on the total weight of the mEPDM and the mPE.

436. A process for making a film, the process comprising:
(1) blending:
(a) from about 5 to about 95 weight % pelletized mEPDM; and
(b) from about 95 weight % to about 5 weight % of a PE; to form a mEPDM-PE blend; and (2) forming the mEPDM-PE blend into a mEPDM-PE masterbatch:

(3) blending:

(a) from about 5 to about 95 weight % mEPDM-PE masterbatch; and (b) from about 95 weight % to about 5 weight % of a first mPE;

to form a mEPDM-mPE blend comprising (a) from about 5 to about 50 weight % pelletized mEPDM; and (b) from about 95 weight % to about 50 weight % of a first mPE;

to form a mEPDM-mPE blend; and (4) forming the mEPDM-mPE blend into the film;

wherein the weight % is based on the total weight of the mEPDM and the mPE.

EXAMPLES

As used herein, Mooney Viscosity was measured as ML (1+4) at 125° C. in Mooney units according to ASTM D1646-99 and MST is measured as described previously.

Viscoelastic properties were measured using a Rubber Process Analyzer, RPA 2000® instrument from Alpha Technologies. The elastic modulus (G'), the loss modulus (G") and tan δ (G"/G') were measured at the lowest shear rate of 0.21 sec$^{-1}$. The temperature for these measurements was 60° C.

Ethylene content is determined according to FTIR according to ASTM D3900, and ENB content by FTIR per ASTM method D6047. All percentages are weight percent based on the total weight of the polymer or component as applicable unless otherwise indicated.

Thermal properties, melting point and crystallinity, were measured by DSC. The samples were compression molded into a plaque at 125° C. for 10 minutes, annealed at room temperature (21° C.) for 2 days prior to testing. About 6 mg polymer was loaded into the DSC cell. The sample was first cooled to −100° C., held for 2 minutes at this temperature and heated from −100° C. to 125° C. at a rate of 30° C./min. The peak melting temperature and the polymer crystallinity standardized to the heat of fusion of polyethylene, according to ASTM D3417-99 were recorded for each sample.

All molecular weights are weight average molecular weight unless otherwise noted. Molecular weights (weight average molecular weight (Mw) and number average molecular weight (Mn) were measured by GPC (Gel Permeation Chromatography) on a Waters 150 gel permeation chromatograph equipped with a differential refractive index (DRI) detector and a Chromatix KMX-6 on line light scattering photometer. The system was used at 135° C. with 1,2,4-trichlorobenzene as the mobile phase. Shoed (Showa Denko America, Inc) polystyrene gel columns 802, 803, 804 and 805 were used. This technique is discussed in "Liquid Chromatography of Polymers and Related Materials III", J. Cazes editor, Marcel Dekker. 1981, p. 207, which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on molecular weight were less than 0.05 units. Mw and Mn were calculated from elution times. The numerical analyses were performed using the commercially available Beckman/CIS customized LALLS software in conjunction with the standard Gel Permeation package.

Other tests were conducted in accordance with Table 1, except where noted.

TABLE 1

| No. | Test | Test Method | Units |
|---|---|---|---|
| 1 | EP(D)M Polymer Ethylene Composition | ASTM D3900 | Wt % |
| 2 | EP(D)M Polymer Ethylidene Norbornene Composition | ASTM D6047 | Wt % |
| 3 | Mooney Viscosity (ML 1 + 4, 1256 ° C.) | ASTM D1646 | Mooney Units (MU) |
| 4 | Mooney Scorch | ASTM D2084 | MU |
| 5 | Hardness | ASTM D2240 | Shore A |
| 6 | 1% Secant Modulus | ASTM D882 | MPa |
| 7 | Tensile Strength | ASTM D882 | kPa (kN/m$^2$) |
| 8 | Haze | ASTM D1003 | % |
| 9 | Gloss | ASTM D2457 | % |
| 10 | Average Gauge Micrometer | ASTM D374 | microns |
| 11 | Film Density | ASTM D1505 | g/cc |
| 12 | DSC | ASTM 3417 | |
| 13 | Melt Index | ASTM D1238 (230° C., 2.16 kg) | dg/min |
| 14 | Elongation | ASTM D412 | % |
| 15 | Tear Strength- Die C | ASTM D624 | MPa |
| 16 | Elmendorf Tear | ASTM D1922 | MPa |
| 17 | Puncture Force | ASTM D5748 | g/micron |
| 18 | Puncture Energy | ASTM D1709 | N/micron |
| 19 | Dart Drop | ASTM D1709-91, method A and B as indicated | g/micron |

Table 2 lists the polymers used in Example 1-28. The polymers of Table 2 were obtained from ExxonMobil Chemical Company in Baytown, Tex.

TABLE 2

| Example Identification | ExxonMobil Tradename |
|---|---|
| R1 | Vistalon ™ 3702 resin |
| R2 | Vistalon 9301 resin |
| LL1 | Exceed LLDPE 1018 |
| LL2 | Exceed LLDPE 1327 |
| HD1 | HD 7845 PE |
| LD1 | LD 071 |

Table 3 lists various properties of the rubber resins used in the Examples.

TABLE 3

| | Material | |
|---|---|---|
| | R1 | R2 |
| Rheology | | |
| MI (I2) dg/min | 0.11 | 0.07 |
| HLMI (I21) dg/min | 4.50 | 2.36 |
| MI Swell | 1.25 | 1.18 |
| Ratio (I21/I2) | 42.86 | 36.31 |
| Density Molded g/cc | 0.8599 | 0.8595 |

Tables 4 and 5 list various properties of the majority component resins used in the Example. The suffix "A" or "B" indicates that the PE used in the example was taken from different lots.

TABLE 4

| | Resin | | | | |
|---|---|---|---|---|---|
| | LL1A | LL1B | LL2 | HD1A | HD1B |
| Rheology | | | | | |
| MI (I2) dg/min | 1.00 | 1.03 | 1.11 | 0.50 | 0.48 |
| HLMI (I21) dg/min | 16.16 | 16.10 | 20.21 | 34.80 | 29.93 |
| MI Swell Ratio | 1.05 | 1.08 | 1.24 | 1.33 | 1.30 |
| (I21/I2) dg/min | 16.16 | 15.63 | 18.21 | 69.60 | 62.35 |
| Density Molded (g/cc) | 0.9195 | 0.9199 | 0.9278 | 0.9585 | 0.9573 |
| DSC (Celsius) | | | | | |
| Tm 2nd melt | 118.57 | 117.90 | 120.91 | 131.73 | 131.73 |
| Tm 2nd peak | 108.43 | 108.72 | 111.22 | | |
| Tc | 104.31 | 105.15 | 109.64 | 118.00 | 117.84 |
| 2nd peak | 68.77 | 67.64 | 7316 | | |

ASTM Method D1238-01, ASTM Method D1505-98, *

TABLE 5

| | Resin | |
|---|---|---|
| | LD1A | LD1B |
| Rheology | | |
| MI (I2) dg/min | 0.71 | 0.64 |
| HLMI (I21) dg/min | 45.47 | 39.97 |
| MI Swell | 1.45 | 1.42 |
| Ratio (I21/I2) | 64.04 | 62.45 |
| Density Molded (g/cc) | 0.9257 | 0.9255 |
| DSC (Celsius) | | |
| 2nd melt | 112.39 | 111.73 |
| Tc | 99.82 | 99.32 |
| 2nd peak | 63.69 | 63.32 |

TABLE 6

Rubber Masterbatches prepared and used in this study

| | Example Number | |
|---|---|---|
| | 1 | 2 |
| Exceed LLDPE 1012 | 35 | 35 |
| R1 (wt %) | 65 | |
| R2 (wt %) | | 65 |
| MI (I2) dg/min | 0.27 | 0.26 |
| HLMI (I21) dg/min | 8.32 | 6.31 |
| MI Swell | 1.11 | 1.09 |
| Ratio (I21/I2) | 30.82 | 24.27 |
| Density Molded (g/cc) | 0.8806 | 0.8808 |

The masterbatches (see Table 6) discussed above were made using R1 and R2 (see Table 4) and were extruded into pellets using a 60 mm Reifenhouser single screw extruder, operated as described in Table 7. Each master batch was made using one Vistalon resin and Exceed LLDPE 1012 in a 1.9:1 ratio of Vistalon resin to Exceed LLDPE 1012. The extruder was equipped with a standard cut PP barrier screw employing a compression ratio of 3 and a carbide mixing section at the end. The barrier clearance was 0.030 inches. The clearance of the carbide mixing section was 0.025 inches. A 20/100/40 screen pack was used. The extruder was operated at 50 lbs/hr under nitrogen using the extrusion profile shown in the Table 7. The master batches were converted into 3-4 mm wide pellets using a strand cut process. These pellets were similar in size to the LD1 pellets.

TABLE 7

Extrusion conditions used to make Ruber Masterbatches

| | | | 24009-042-00 | |
|---|---|---|---|---|
| Variable | Units | Set Points | 1 | 2 |
| Screw Speed | RPM | 30 | 30 | 30 |
| Screw Amps | AMPS | 40 | 40 | 40 |
| Zone 1 | °C. | 182/188 | 185 | 188 |
| Zone 2 | °C. | 182/188 | 188 | 192 |
| Zone 3 | °C. | 188/193 | 193 | 194 |
| Zone 4 | °C. | 193/199 | 211 | 211 |
| Zone 5 | °C. | 199/204 | 229 | 230 |
| Screen Changer | °C. | 204/210 | 210 | 210 |
| Adapter | °C. | 210/216 | 216 | 216 |
| Die | °C. | 210/216 | 216 | 216 |
| Melt | °C. | 243 | 243 | 244 |
| Pressure | PSI | N/A | 2340 | 2670 |

LL1A LL2A and HD1A were made into film using a 2.5" Gloucester blown film line equipped with a low work DSB-II screw, a 45 mil die gap and a Saturn Future Design Air Ring. The films were processed at a die throughput rate ranging from 9.8 lbs/hr/die inch to 10.1 lbs/hr/die inch to produce a monolayer file having a thickness of 75 μm. The temperature of the melts ranged from 411° F. to 432° F.

LL1B and HD1B were made into film using a 3.5" Sano blown film line equipped with DSB-II screw, a 40 mil die gap and a Saturn Future Design Air Ring. The films were processed at a die throughput rate ranging from 10.1 lbs/hr/die inch to 10.02 lbs/hr/die inch to produce a monolayer file having a thickness of 75 μm. The temperature of the melts ranged from 407° F. to 410° F.

Films containing 10% of R1 and R2 were made into film using a 2.5" Gloucester blown film line equipped with a low work DSB-II screw, a 45 mil die gap and a Saturn Future Design Air Ring. Pellet blends of the Rubber and the PE were added to the hopper of the Gloucester blow film line, and converted into blown films. The films were processed at a die throughput rate ranging from 9.7 lbs/hr/die inch to 10.2 lbs/hr/die inch to produce a monolayer film having a thickness of 75 μm. The temperature of the melts ranged from 399° F. to 432° F.

Films containing 10% of LD1A were made into film using a 2.5" Gloucester blown film line equipped with a low work DSB-II screw, a 45 mil die gap and a Saturn Future Design Air Ring. Pellet blends of the LD1 and the majority resins were added to the hoppers of the Gloucester blow film line, and converted into blown films. The films were processed at a die throughput ranging from 9.90 lbs/hr/die inch to 10.09 lbs/hr/die inch to produce a monolayer film having a thickness of 75 μm. The temperature of the melts ranged from 417° F. to 428° F.

Films containing 10% of R1 were made into film using a 2.5" Gloucester blown film line equipped with a low work DSB-II screw, a 45 mil die gap and a Saturn Future Design Air Ring. Pellet blends of 15% of the Rubber Masterbatches and 85% of the majority resins were added to the hoppers of the Gloucester blow film line and converted into blown films as follows. The films were processed at a die throughput rate ranging from 9.85 lbs/hr/die inch to 10.8 lbs./hr/die inch to produce a monolayer film having a thickness of 75 μm. The temperature of the melts ranged from 413° F. to 431° F.

The films containing 30% of R1 and R2 were made on 3.5" Sano blown film line equipped with DSB-II screw, a 40 mil die gap and a Saturn Future Design Air Ring. Specifically, pellet blends composed of 30% of the R1 or R2 and 70% of LL1 or HD1 were prepared in the hoppers of the Sano blow film line and converted into blown films as follows. The films were processed at a die throughput rate ranging from 3.21 lbs/hr/die inch to 13.33 lbs/hr/die inch. The temperature of the melts ranged from 399° F. to 419° F.

The films containing 30% of LD1 were made on 3.5" Sano blown film line equipped with DSB-II screw, a 40 mil die gap and a Saturn Future Design Air Ring. Specifically, pellet blends composed of 30% of the commercially available LD1 resin and 70% of the commercially available LL1 or HD1 resins were prepared in the hoppers of the Sano blow film line and converted into blown films as follows. The films were processed at a die throughput rate ranging from 10.10 lbs/hr/die inch to 11.11 lbs/hr/die inch. The temperature of the melts ranged from 400° F. to 402° F.

All of the films used in this study were made using a blow-up ratio of 2, and a ⅜" land.

The films are described in Table 8.

TABLE 8

| | Example Number | | | | | | | | | |
|---|---|---|---|---|---|---|---|---|---|---|
| | 3 | 4 | 5 | 6 | 7 | 8 | 9 | 10 | 11 | 12 |
| LL1 | 100% | 90% | 90% | 85% | 90% | 85% | 100% | 70% | 70% | 70% |
| LD1 | | 10% | | | | | | 30% | | |
| R1 | | | 10% | 10% | | | | | 30% | |
| R2 | | | | | 10% | 10% | | | | 30% |
| Gauge (microns) | | | | | | | | | | |
| Average | 75.4 | 76.5 | 75.4 | 76.5 | 74.9 | 74.9 | 75.4 | 76.2 | 78.2 | 75.4 |
| Low | 71.4 | 70.6 | 70.9 | 70.6 | 72.6 | 70.4 | 71.1 | 73.7 | 73.2 | 71.6 |
| High | 79.2 | 81.5 | 78.7 | 83.1 | 78.0 | 78.5 | 80.3 | 79.5 | 82.0 | 79.8 |
| Haze (%) | 41 | 7 | 7 | 13 | 14 | 10 | 34 | 7 | 17 | 43 |
| Gloss 45o MD | 32 | 80 | 76 | 64 | 69 | 69 | 24 | 76 | 77 | 54 |
| Gloss 45o TD | 37 | 82 | 78 | 65 | 72 | 72 | 27 | 77 | 78 | 56 |
| 1% Secant (MPa) | | | | | | | | | | |
| MD | 211.5 | 221.3 | 169.5 | 159.6 | 164.1 | 157.2 | 197.4 | 222.7 | 106.4 | 92.7 |
| TD | 221.1 | 243.5 | 216.3 | 198.2 | 206.3 | 199.7 | 207.7 | 249.6 | 133.7 | 113.9 |
| Tensile @ Yield (MPa) | | | | | | | | | | |
| MD | 9.3 | 9.8 | 8.2 | 8.0 | 8.0 | 8.1 | 9.3 | 10.4 | 5.8 | 5.6 |
| TD | 9.5 | 10.6 | 9.7 | 9.0 | 9.2 | 8.7 | 9.7 | 11.4 | 6.6 | 5.8 |
| at 200% MD | 11.6 | 13.0 | 10.9 | 10.7 | 10.8 | 10.9 | 11.6 | 18.4 | 8.9 | 8.6 |
| Ultimate Tensile (MPa) | | | | | | | | | | |
| MD | 58.6 | 52.2 | 59.2 | 56.7 | 59.9 | 57.4 | 58.8 | 43.6 | 50.1 | 52.2 |
| TD | 54.0 | 51.5 | 54.2 | 51.4 | 53.9 | 52.6 | 57.6 | 46.9 | 48.4 | 50.7 |
| Elongation @ Yield (%) | | | | | | | | | | |
| MD | 6 | 6 | 6 | 6 | 6 | 6 | 6 | 6 | 6 | 7 |
| TD | 5 | 6 | 7 | 6 | 6 | 5 | 6 | 6 | 6 | 6 |
| Break Elongation (%) | | | | | | | | | | |
| MD | 708 | 728 | 732 | 729 | 710 | 691 | 708 | 679 | 715 | 723 |
| TD | 751 | 762 | 767 | 756 | 761 | 747 | 739 | 796 | 786 | 792 |
| Elmendorf Tear | | | | | | | | | | |
| MD (g) | 954 | 689 | 879 | 964 | 823 | 922 | 917 | 263 | 1063 | 734 |
| TD (g) | 1162 | 1464 | 1333 | 1339 | 1267 | 1247 | 1088 | 2563 | 1502 | 1065 |
| MD (g/micron) | 12.6 | 9.0 | 11.7 | 12.6 | 11.0 | 12.3 | 12.2 | 3.5 | 13.6 | 9.7 |
| TD (g/micron) | 15.4 | 19.1 | 17.7 | 17.5 | 16.9 | 16.6 | 14.4 | 33.6 | 19.2 | 14.1 |
| Dart Drop | | | | | | | | | | |
| Method A (g) | 0 | 835 | 0 | 0 | 0 | 0 | 0 | 474 | 0 | 0 |
| Method A (g/micron) | 0 | 10.92 | 0 | 0 | 0 | 0 | 0 | 6.22 | 0 | 0 |
| Method B (g) | 1001 | 0 | 741 | 829 | 741 | 845 | 1168 | 0 | >1328 | >1328 |
| Method B (g/micron) | 13.3 | 0.0 | 9.8 | 10.8 | 9.9 | 11.3 | 15.5 | 0.0 | 17.0 | 17.0 |
| Puncture | | | | | | | | | | |
| Peak Puncture Force (Newton) | 101.3 | 107.2 | 96.7 | 96.8 | 93.0 | 96.1 | 108.2 | 112.2 | 91.3 | 90.5 |
| Peak Puncture Force (Newton/micron) | 1.3 | 1.4 | 1.3 | 1.3 | 1.2 | 1.3 | 1.4 | 1.5 | 1.2 | 1.2 |
| Puncture Break Energy (Joule) | 7.07 | 7.06 | 6.83 | 6.88 | 6.45 | 6.92 | 7.90 | 7.18 | 7.46 | 7.34 |
| Puncture Break Energy (Joule/micron) | 0.09 | 0.09 | 0.09 | 0.09 | 0.09 | 0.09 | 0.10 | 0.09 | 0.10 | 0.10 |

TABLE 8-continued

| | Example Number | | | | | | | | | |
|---|---|---|---|---|---|---|---|---|---|---|
| | 3 | 4 | 5 | 6 | 7 | 8 | 9 | 10 | 11 | 12 |
| Reblock (I/I, g) | 18 | 84 | >214 | >214 | 140 | >214 | 16 | 35 | >214 | >214 |
| COF (I/I, Kinetic) | >1 | >1 | >1 | >1 | >1 | >1 | >1 | 1 | >1 | >1 |
| COF (I/I, Static) | >1 | >1 | >1 | >1 | >1 | >1 | >1 | 1 | >1 | >1 |
| Film Density (g/cm3) | 0.9170 | 0.9183 | 0.9142 | 0.9135 | 0.9133 | 0.9187 | 0.9168 | 0.9199 | 0.9050 | 0.9036 |

Table 9 shows selected physical properties of monolayer films made in this study.

TABLE 9

| | Example Number | | | | |
|---|---|---|---|---|---|
| | 13 | 15 | 16 | 17 | 18 |
| LL2 | 100% | 90% | 90% | 90% | 90% |
| LD1 | | 10% | | | |
| R1 | | | 10% | 10% | |
| R2 | | | | | 10% |
| Gauge (microns) | | | | | |
| Average | 76.5 | 77.0 | 75.2 | 74.9 | 64.5 |
| Low | 73.2 | 71.4 | 71.9 | 71.9 | 57.4 |
| High | 80.5 | 80.5 | 79.0 | 78.5 | 74.9 |
| Haze (%) | 22 | 13 | 14 | 12 | 9 |
| Gloss 45o MD | 38 | 57 | 68 | 68 | 73 |
| Gloss 45o TD | 43 | 60 | 70 | 70 | 75 |
| 1% Secant (MPa) | | | | | |
| MD | 331.6 | 303.4 | 229.4 | 250.2 | 207.8 |
| TD | 340.4 | 344.2 | 282.5 | 300.6 | 258.7 |
| Tensile @ Yield (MPa) | | | | | |
| MD | 12.9 | 12.8 | 10.5 | 10.9 | 10.1 |
| TD | 13.4 | 13.6 | 12.6 | 13.0 | 11.2 |
| at 200% MD | 13.0 | 14.6 | 11.6 | 11.7 | 11.4 |
| Ultimate Tensile (MPa) | | | | | |
| MD | 40.6 | 40.8 | 43.4 | 42.1 | 45.4 |
| TD | 39.8 | 39.9 | 41.6 | 40.1 | 38.9 |
| Elongation @ Yield (%) | | | | | |
| MD | 6 | 6 | 7 | 7 | 8 |
| TD | 6 | 6 | 7 | 7 | 6 |
| Break Elongation (%) | | | | | |
| MD | 733 | 715 | 744 | 728 | 683 |
| TD | 737 | 779 | 803 | 766 | 803 |
| Elmendorf Tear | | | | | |
| MD (g) | 637 | 437 | 852 | 863 | 504 |
| TD (g) | 1021 | 1464 | 1501 | 1495 | 1339 |
| MD (g/micron) | 8.3 | 5.7 | 11.3 | 11.5 | 7.8 |
| TD (g/micron) | 13.4 | 19.0 | 20.0 | 20.0 | 20.8 |
| Dart Drop | | | | | |
| Method A (g) | 409 | 427 | 424 | 434 | 289 |
| Method A (g/micron) | 5.3 | 5.5 | 5.6 | 5.8 | 4.5 |
| Method B (g) | 0.0 | 0.0 | 0.0 | 0.0 | 0.0 |
| Method B (g/micron) | 0.0 | 0.0 | 0.0 | 0.0 | 0.0 |
| Puncture | | | | | |
| Peak Puncture Force (Newton) | 83.6 | 75.1 | 61.1 | 65.2 | 53.1 |
| Peak Puncture Force (Newton/micron) | 1.1 | 1.0 | 0.8 | 0.9 | 0.8 |
| Puncture Break Energy (Joule) | 3.81 | 2.87 | 2.61 | 2.87 | 2.23 |
| Puncture Break Energy (Joule/micron) | 0.05 | 0.04 | 0.03 | 0.04 | 0.03 |
| Reblock (I/I, g) | 6 | 9 | 79 | 70 | 37 |
| COF (I/I, Kinetic) | 0.15 | 0.13 | 0.11 | 0.1 | 0.14 |
| COF (I/I, Static) | 0.16 | 0.14 | 0.15 | 0.12 | 0.18 |
| Film Density (g/cm3) | 0.9252 | 0.9252 | 0.9183 | 0.9199 | 0.9183 |

TABLE 9-continued

| | Example Number | | | | | | | | | |
|---|---|---|---|---|---|---|---|---|---|---|
| | 19 | 20 | 21 | 22 | 23 | 24 | 25 | 26 | 27 | 28 |
| HDPE | 100% | 90% | 90% | 85% | 90% | 85% | 100% | 70% | 70% | 70% |
| LD1 | | 10% | | | | | | 30% | | |
| R1 | | | 10% | 10% | | | | | 30% | |
| R2 | | | | | 10% | 10% | | | | 30% |
| Gauge (microns) | | | | | | | | | | |
| Average | 75.9 | 78.7 | 73.7 | 77.5 | 57.9 | 78.2 | 73.4 | 75.2 | 71.6 | 75.2 |
| Low | 69.6 | 73.7 | 65.5 | 69.3 | 54.9 | 68.6 | 69.6 | 69.6 | 66.3 | 70.9 |
| High | 81.3 | 84.8 | 80.3 | 85.1 | 62.7 | 87.1 | 76.5 | 79.2 | 77.0 | 81.0 |
| Haze (%) | 64 | 38 | 54 | 46 | 48 | 46 | 69 | 31 | 46 | 50 |
| Gloss 45o MD | 8 | 24 | 12 | 18 | 15 | 17 | 7 | 33 | 18 | 14 |
| Gloss 45o TD | 9 | 25 | 13 | 17 | 15 | 18 | 7 | 33 | 18 | 14 |
| 1% Secant (MPa) | | | | | | | | | | |
| MD | 947.6 | 862.1 | 672.1 | 697.9 | 713.9 | 655.2 | 947.3 | 669.0 | 391.4 | 354.0 |
| TD | 1210.3 | 1125.2 | 933.2 | 952.2 | 1033.2 | 912.1 | 1209.1 | 864.2 | 522.6 | 505.6 |
| Tensile @ Yield (MPa) | | | | | | | | | | |
| MD | 29.7 | 27.2 | 22.6 | 23.9 | 24.3 | 22.2 | 28.8 | 23.1 | 14.3 | 13.8 |
| TD | 33.2 | 33.5 | 28.6 | 30.1 | 29.9 | 28.5 | 34.1 | 28.7 | 18.3 | 17.6 |
| at 200% MD | 24.9 | 22.6 | 20.0 | 19.5 | 23.6 | 18.8 | 21.3 | 21.9 | 13.7 | 13.8 |
| Ultimate Tensile (MPa) | | | | | | | | | | |
| MD | 37.9 | 39.1 | 46.1 | 48.0 | 58.8 | 49.7 | 44.3 | 40.9 | 40.9 | 45.4 |
| TD | 34.4 | 35.0 | 36.0 | 39.7 | 34.0 | 40.5 | 39.1 | 32.3 | 34.0 | 38.0 |
| Elongation @ Yield (%) | | | | | | | | | | |
| MD | 6 | 7 | 6 | 7 | 7 | 6 | 6 | 6 | 6 | 6 |
| TD | 7 | 6 | 6 | 6 | 5 | 6 | 6 | 7 | 6 | 7 |
| Break Elongation (%) | | | | | | | | | | |
| MD | 857 | 684 | 727 | 833 | 641 | 825 | 819 | 772 | 832 | 821 |
| TD | 934 | 594 | 1025 | 1070 | 949 | 995 | 921 | 932 | 1067 | 986 |
| Elmendorf Tear | | | | | | | | | | |
| MD (g) | 50 | 54 | 63 | 72 | 35 | 82 | 64 | 54 | 155 | 303 |
| TD (g) | 1494 | 1132 | 3218 | 2364 | 3030 | 2175 | 293 | 1298 | 1969 | 2115 |
| MD (g/micron) | 0.7 | 0.7 | 0.9 | 0.9 | 0.6 | 1.0 | 0.9 | 0.7 | 2.2 | 4.0 |
| TD (g/micron) | 19.7 | 14.4 | 43.7 | 30.5 | 52.3 | 27.8 | 4.0 | 17.3 | 27.5 | 28.1 |
| Dart Drop | | | | | | | | | | |
| Method A (g) | 115 | 127 | 106 | 113 | 70 | 108 | 114 | 101 | 315 | 378 |
| Method A (g/micron) | 1.5 | 1.6 | 1.4 | 1.5 | 1.2 | 1.4 | 1.6 | 1.3 | 4.4 | 5.0 |
| Puncture | | | | | | | | | | |
| Peak Puncture Force (Newton) | 123.1 | 94.9 | 112.3 | 116.7 | 97.7 | 112.1 | 87.4 | 81.3 | 81.7 | 93.3 |
| Peak Puncture Force (Newton/micron) | 1.6 | 1.2 | 1.5 | 1.5 | 1.7 | 1.4 | 1.2 | 1.1 | 1.1 | 1.2 |
| Puncture Break Energy (Joule) | 5.43 | 3.29 | 5.40 | 5.47 | 4.33 | 5.66 | 2.44 | 2.42 | 4.82 | 6.17 |
| Puncture Break Energy (Joule/micron) | 0.07 | 0.04 | 0.07 | 0.07 | 0.07 | 0.07 | 0.03 | 0.03 | 0.07 | 0.08 |
| Reblock (I/I, g) | 5 | 5 | 6 | 5 | 5 | 6 | 5 | 6 | >214 | >214 |
| COF (I/I, Kinetic) | 0.26 | 0.25 | 0.24 | 0.25 | 0.27 | 0.26 | 0.23 | 0.24 | 0.36 | 0.37 |
| COF (I/I, Static) | 0.29 | 0.27 | 0.26 | 0.27 | 0.3 | 0.29 | 0.25 | 0.26 | 0.4 | 0.4 |
| Film Density (g/cm3) | 0.9541 | 0.9508 | 0.9439 | 0.9441 | 0.9438 | 0.9433 | 0.9535 | 0.9446 | 0.9291 | 0.9273 |

TABLE 10

|  | Example Number | | | | |
|---|---|---|---|---|---|
|  | 29 | 30 | 31 | 32 | 33 |
| LL1 | 100% | 40% | 40% | 40% | 50% |
| HD1 |  | 30% | 30% | 30% | 10% |
| R1 |  |  | 30% |  |  |
| R2 |  | 30% |  |  |  |
| LD1 |  |  |  | 30% | 40% |
| Gauge (microns) | | | | | |
| Average | 73.0 | 75.3 | 74.0 | 71.0 | 73.5 |
| Low | 69.8 | 72.3 | 71.3 | 67.5 | 63.5 |
| High | 75.3 | 80.8 | 77.0 | 77.5 | 83.3 |
| Haze (%) | 29.2 | 19.1 | 19 | 15.5 | 11.3 |
| Gloss 45o MD | 31 | 47 | 46 | 51 | 61 |
| Gloss 45o TD | 38 | 48 | 48 | 52 | 62 |
| 1% Secant (MPa) | | | | | |
| MD | 178 | 314 | 479 | 249 | 184 |
| TD | 182 | 368 | 568 | 302 | 213 |
| Tensile @ Yield (MPa) | | | | | |
| MD | 9.5 | 13.5 | 18.3 | 11.2 | 10.1 |
| TD | 9.5 | 15.6 | 21.3 | 12.7 | 10.8 |
| at 200% MD | 11.5 | 13.5 | 16.1 | 11.7 | 19.2 |
| Ultimate Tensile (MPa) | | | | | |
| MD | 56.3 | 53.2 | 51.8 | 46.3 | 43.1 |
| TD | 53.5 | 51.7 | 47.3 | 45.3 | 46.9 |
| Elongation @ Yield (%) | | | | | |
| MD | 6.2 | 5.4 | 5.4 | 5.4 | 5.8 |
| TD | 5.8 | 5.3 | 5.2 | 5.6 | 5.8 |

TABLE 10-continued

|  | Example Number | | | | |
|---|---|---|---|---|---|
|  | 29 | 30 | 31 | 32 | 33 |
| Break Elongation (%) | | | | | |
| MD | 712 | 747 | 797 | 700 | 564 |
| TD | 736 | 834 | 855 | 853 | 806 |
| Elmendorf Tear | | | | | |
| MD (g) | 972 | 1000 | 964 | 153 | 187 |
| TD (g) | 1133 | 1724 | 1679 | 1896 | 2197 |
| MD (g/micron) | 13 | 13 | 13 | 2 | 3 |
| TD (g/micron) | 16 | 23 | 23 | 27 | 30 |
| Dart Drop | | | | | |
| Method A (g) | >1368 | 483 | 443 | 186 | 279 |
| Method A (g/micron) | >475 | 2.3 | 2.4 | 2.2 | 0.9 |
| Method B (g) | 986 | | | | |
| Method B (g/micron) | 13.5 | | | | |
| Puncture | | | | | |
| Peak Puncture Force (lb) | 20.08 | 25.57 | 19.88 | 24.7 | 25.2 |
| Peak Puncture Force (lb/micron) | 0.28 | 0.34 | 0.27 | 0.35 | 0.34 |
| Puncture Break Energy (in-lb) | 53.47 | 64.34 | 51.32 | 48.49 | 48.01 |
| Puncture Break Energy (in-lb/micron) | 0.73 | 0.86 | 0.69 | 0.68 | 0.65 |
| Reblock (I/I, g) | 38 | >214 | >214 | 6 | 6 |
| COF (I/I, Kinetic) | >1 | 0.51 | 0.48 | 0.39 | 0.47 |
| COF (I/I, Static) | >1 | 0.64 | 0.55 | 0.43 | 0.53 |

Table 11 shows hot tack data.

| Hot Tack Composition (Percent) | | | | | | | | | |
|---|---|---|---|---|---|---|---|---|---|
|  | Sample Identification | | | | | | | | |
|  | 001 | 002 | 003 | 004 | 005 | 006 | 007 | 008 | 008b |
| LL1 | 100 | 90 | 90 | 90 | 100 | 90 | 90 | 90 |  |
| LL2 |  |  |  |  |  |  |  |  |  |
| HD1 |  |  |  |  |  |  |  |  |  |
| R2 |  |  | 10 |  |  | 10 |  |  |  |
| R1 |  |  |  | 10 |  |  | 10 |  |  |
| LD1 |  | 10 |  |  |  |  |  | 10 |  |
| Temperature | | | | | | | | | |
| 90 |  |  |  | 0.31 |  |  |  |  |  |
| 95 |  |  |  | 0.55 | 0.25 |  |  |  |  |
| 100 | 0.26 |  | 2.09 | 0.60 |  |  | 0.23 |  |  |
| 105 | 0.73 | 0.24 | 3.05 | 2.60 |  |  | 0.40 | 0.28 | 0.25 |
| 110 | 8.39 | 2.69 | 6.19 | 4.41 | 0.22 | 0.30 | 3.00 | 1.38 | 0.55 |
| 115 | 13.66 | 13.53 | 12.37 | 12.84 | 0.34 | 0.42 | 7.22 | 3.75 | 4.15 |
| 120 | 15.25 | 14.30 | 12.22 | 14.41 | 6.07 | 12.07 | 11.26 | 8.79 | 10.92 |
| 125 | 9.88 | 9.86 | 9.00 | 11.92 | 12.31 | 9.94 | 7.96 | 10.83 | 11.23 |
| 130 | 7.93 | 7.96 | 7.00 | 8.26 | 9.03 | 6.50 | 6.08 | 6.73 | 7.99 |
| 135 |  |  |  |  | 6.32 |  |  | 5.07 | 5.36 |

|  | Sample Identification | | | | | | | |
|---|---|---|---|---|---|---|---|---|
|  | 009 | 010 | 011 | 012 | 013 | 014 | 015 | 016 |
| LL1 |  |  |  |  | 85 | 85 |  |  |
| LL2 |  |  |  |  |  |  |  |  |
| HD1 | 100 | 90 | 90 | 90 |  |  | 85 | 85 |
| R2 |  |  | 10 |  | 10 |  |  | 10 |
| R1 |  |  |  | 10 |  | 10 | 10 |  |
| LD1 |  | 10 |  |  |  |  |  |  |

Hot Tack Composition (Percent) -continued

| Temperature | | | | | | | | |
|---|---|---|---|---|---|---|---|---|
| 90 | | | | | | | | |
| 95 | | | | | 0.27 | 0.33 | | |
| 100 | | | | | 1.49 | 0.63 | | |
| 105 | | | | | 2.85 | 2.71 | | |
| 110 | | | | | 10.42 | 4.96 | | |
| 115 | | | | | 13.44 | 10.32 | | |
| 120 | | | | | 11.65 | 10.26 | | |
| 125 | | | 0.24 | | 9.10 | 8.03 | | |
| 130 | 0.25 | 0.30 | 1.47 | 0.29 | | 6.13 | 0.30 | 0.32 |
| 135 | 0.97 | 0.82 | 8.85 | 0.63 | | | 0.43 | 0.73 |
| | 5.70 | 4.75 | 8.38 | 2.47 | | | 2.75 | 7.89 |
| | 9.23 | 10.57 | 5.76 | 6.91 | | | 6.54 | 9.15 |
| | 9.45 | 9.22 | 4.91 | 5.89 | | | 6.71 | 6.80 |
| | 6.74 | 6.77 | | 4.06 | | | 5.55 | 6.03 |
| | | | | | | | | 3.40 |

| | Sample Identification | | | | | | | |
|---|---|---|---|---|---|---|---|---|
| | 017 | 018 | 019 | 020 | 021 | 022 | 023 | 024 |
| LL1 | | | 100 | 70 | 70 | | | 870 |
| LL2 | | | | | | | | |
| HD1 | 100 | 70 | | | | 70 | 80 | |
| R2 | | 30 | | 30 | | | | |
| R1 | | | | | 30 | 30 | | |
| LD1 | | | | | | | 30 | 30 |
| Temperature | | | | | | | | |
| 95 | | | | | 1.89 | | | |
| 100 | | | | 0.28 | 1.18 | 2.95 | | |
| 105 | | | 0.91 | 2.58 | 3.30 | | | 0.27 |
| 110 | | | 12.73 | 2.87 | 2.97 | | | 1.39 |
| 115 | | | 14.54 | 4.11 | 6.58 | | | 8.26 |
| 120 | | | 13.29 | 11.35 | 10.50 | | | 13.47 |
| 125 | 0.30 | | 10.23 | 9.01 | 8.93 | | | 11.78 |
| 130 | 1.18 | 0.26 | 8.55 | 6.65 | 6.75 | 0.36 | 0.25 | 7.95 |
| 135 | 2.85 | 0.98 | | | | 2.84 | 2.02 | |
| 140 | 4.37 | 8.33 | | | | 4.99 | 10.17 | |
| 145 | 5.37 | 9.13 | | | | 5.68 | 8.90 | |
| 150 | 4.17 | 7.69 | | | | 4.78 | 6.10 | |
| 155 | 2.97 | 6.45 | | | | 2.80 | | |

| | Sample Identification | | | | | | | | |
|---|---|---|---|---|---|---|---|---|---|
| | 25 | 26 | 27 | 28 | 29 | 30 | 31 | 32 | 33 |
| LL1 | 100 | 70 | 40 | 40 | 40 | 70 | 40 | 40 | 50 |
| LL2 | | | | | | | | | |
| HD1 | | 30 | 60 | 30 | 30 | | 30 | | 10 |
| R2 | | | | | 30 | | | | |
| R1 | | | | 30 | | | | | |
| LD1 | | | | | | 30 | 30 | 60 | 40 |
| Temperature | | | | | | | | | |
| 100 | | | | | | | | | |
| 105 | 0.28 | | | | | | | | |
| 110 | 8.38 | | | 0.34 | 0.37 | 0.52 | | 0.37 | 0.3 |
| 115 | 14.53 | 0.33 | | 1.56 | 3.06 | 11.77 | 0.32 | 3.28 | 4.71 |
| 120 | 15.21 | 5.26 | 0.30 | 4.77 | 6.16 | 12.69 | 3.26 | 10 | 12.44 |
| 125 | 10.18 | 12.23 | 1.34 | 9.47 | 6.90 | 12.18 | 11.68 | 7.99 | 12.95 |
| 130 | 8.53 | 10.24 | 10.51 | 7.38 | 8.91 | 7.30 | 10.7 | 6.52 | 7.28 |
| 135 | | 5.71 | 10.81 | 6.88 | 6.11 | | 6.76 | | 6.21 |
| 140 | | | 6.57 | | 4.01 | | | | |
| 145 | | | 5.76 | | | | | | |

Table 12 shows heat seal data.

| Heat Seal Data Composition (Percent) | | | | | | | | | |
|---|---|---|---|---|---|---|---|---|---|
| | Sample Identification | | | | | | | | |
| | 001 | 002 | 003 | 004 | 005 | 006 | 007 | 008 | 008b |
| LL1 | 100 | 90 | 90 | 90 | | | | | |
| LL2 | | | | | 100 | 90 | 90 | 90 | 90 |
| HD1 | | | | | | | | | |
| R1 | | | | 10 | | | | 10 | 10 |
| R2 | | | 10 | | | | 10 | | |
| LD1 | | 10 | | | | 10 | | | |
| Temperature | | | | | | | | | |
| 95 | | | 0.30 | 0.22 | | | | | |
| 100 | | | 0.51 | 0.34 | | | | | |
| 105 | 0.09 | | 1.64 | 0.67 | | | 0.13 | | |
| 110 | 1.37 | 0.22 | 4.45 | 3.87 | | | 0.26 | 0.14 | 0.20 |
| 115 | 5.18 | 1.72 | 4.76 | 4.75 | | | 0.46 | 0.31 | 0.37 |
| 120 | 5.39 | 6.08 | 5.01 | 4.98 | | 0.15 | 4.25 | 0.91 | 0.85 |
| 125 | 5.76 | 6.26 | 5.20 | 5.19 | 0.27 | 0.42 | 4.54 | 5.24 | 4.14 |
| 130 | 6.28 | 7.18 | 5.76 | 5.67 | 1.25 | 1.73 | 4.93 | 5.54 | 5.70 |
| 135 | 6.24 | 6.75 | 6.15 | 5.94 | 6.89 | 7.39 | 4.94 | 6.01 | 6.46 |
| 140 | 6.36 | 7.10 | 6.26 | 5.95 | 7.32 | 7.51 | 5.25 | 6.15 | 6.58 |
| 145 | | | | | 7.73 | 7.08 | | 6.51 | 6.60 |
| 150 | | | | | | | | | |

| | Sample Identification | | | | | | | |
|---|---|---|---|---|---|---|---|---|
| | 009 | 010 | 011 | 012 | 013 | 014 | 015 | 016 |
| LL1 | | | | | 85 | 85 | | |
| LL2 | | | | | | | | |
| HD1 | 100 | 90 | 90 | 90 | | | 85 | 85 |
| R1 | | | | 10 | | 10 | | 10 |
| R2 | | | 10 | | 10 | | 10 | |
| LD1 | | 10 | | | | | | |
| Temperature | | | | | | | | |
| 95 | | | | | 0.18 | 0.23 | | |
| 100 | | | | | 0.33 | 0.54 | | |
| 105 | | | | | 0.59 | 0.79 | | |
| 110 | | | | | 4.34 | 4.26 | | |
| 115 | | | | | 4.59 | 4.63 | | |
| 120 | | | | | 4.82 | 4.89 | | |
| 125 | | | 0.09 | | 5.23 | 5.39 | | |
| 130 | | | 0.43 | 0.10 | 5.43 | 5.86 | 0.13 | |
| 135 | 0.08 | | 6.10 | 0.35 | 5.87 | 5.64 | 0.25 | 0.14 |
| 140 | 0.47 | 0.30 | 8.50 | 1.30 | 5.92 | 5.60 | 1.06 | 0.97 |
| 145 | 1.73 | 2.15 | 8.30 | 9.25 | | | 7.92 | 8.30 |
| 150 | 4.94 | 6.62 | 8.45 | 9.79 | | | 9.38 | 9.30 |
| | 11.42 | 12.01 | 8.69 | 9.89 | | | 9.65 | 10.45 |
| | 11.53 | 12.43 | | 10.58 | | | 9.86 | 10.59 |
| | 11.67 | 10.27 | | | | | | |

| | Sample Identification | | | | | | | |
|---|---|---|---|---|---|---|---|---|
| | 17 | 18 | 19 | 20 | 21 | 22 | 23 | 24 |
| LL1 | | | 100 | 70 | 70 | | | 70 |
| LL2 | | | | | | | | |
| HD1 | 70 | 100 | | | | 70 | 70 | |
| R1 | | | | 30 | | | | |
| R2 | 30 | | | | 30 | 30 | | |
| LD1 | | | | | | | 30 | 30 |
| Temperature | | | | | | | | |
| 100 | | | | 0.36 | 0.37 | | | |
| 105 | | | 0.10 | 1.07 | 0.84 | | | |
| 110 | | | 2.82 | 1.88 | 2.71 | | | |
| 115 | | | 5.02 | 3.74 | 3.90 | | | 0.36 |
| 120 | 0.16 | | 5.33 | 4.30 | 4.17 | | | 6.86 |
| 125 | 0.23 | | 5.44 | 4.56 | 4.43 | 0.17 | | 7.46 |
| 130 | 0.32 | | 6.09 | 4.75 | 4.54 | 0.25 | | 8.29 |
| 135 | 2.80 | 0.08 | 5.90 | 4.85 | 4.26 | 2.99 | 0.18 | 8.06 |
| 140 | 6.14 | 1.03 | 5.51 | 4.87 | 4.41 | 6.64 | 0.82 | 8.09 |
| 145 | 7.39 | 2.74 | | 4.79 | | 7.27 | 7.88 | |

-continued

| Heat Seal Data Composition (Percent) | | | | | |
|---|---|---|---|---|---|
| 150 | 7.36 | 10.64 | 4.75 | 7.35 | 10.11 |
| 155 | 7.53 | 11.08 | 4.78 | 7.81 | 11.01 |
| 160 | 7.96 | 11.35 | 4.81 | 7.74 | 10.27 |
| 165 | | | 4.65 | | |
| 170 | | | 4.68 | | |
| 175 | | | 4.47 | | |
| 180 | | | 4.80 | | |
| 185 | | | 4.74 | | |
| 190 | | | 4.93 | | |
| 195 | | | 4.56 | | |
| 200 | | | 4.75 | | |

| | Sample Identification | | | | | |
|---|---|---|---|---|---|---|
| | 25 | 26 | 27 | 28 | 29 | 30 |
| LL1 | 90 | 90 | 80 | 80 | 70 | 70 |
| LD1 | 10 | 10 | 20 | 20 | 30 | 30 |
| Temperature | | | | | | |
| 110 | | 0.13 | | 0.13 | | 0.10 |
| 115 | | 0.96 | | 0.45 | | 0.48 |
| 120 | 0.11 | 5.85 | 0.10 | 6.30 | | 6.75 |
| 125 | 0.36 | 6.07 | 0.54 | 6.70 | 0.35 | 7.47 |
| 130 | 1.46 | 6.71 | 2.64 | 7.63 | 1.79 | 8.47 |
| 135 | 9.17 | 6.94 | 9.63 | 7.37 | 10.09 | 8.26 |
| 140 | 9.35 | 7.17 | 9.70 | 8.31 | 10.75 | 8.98 |
| 145 | 10.25 | | 10.88 | | 11.61 | |
| 150 | 9.74 | | 12.12 | | 12.62 | |

Figure 5:
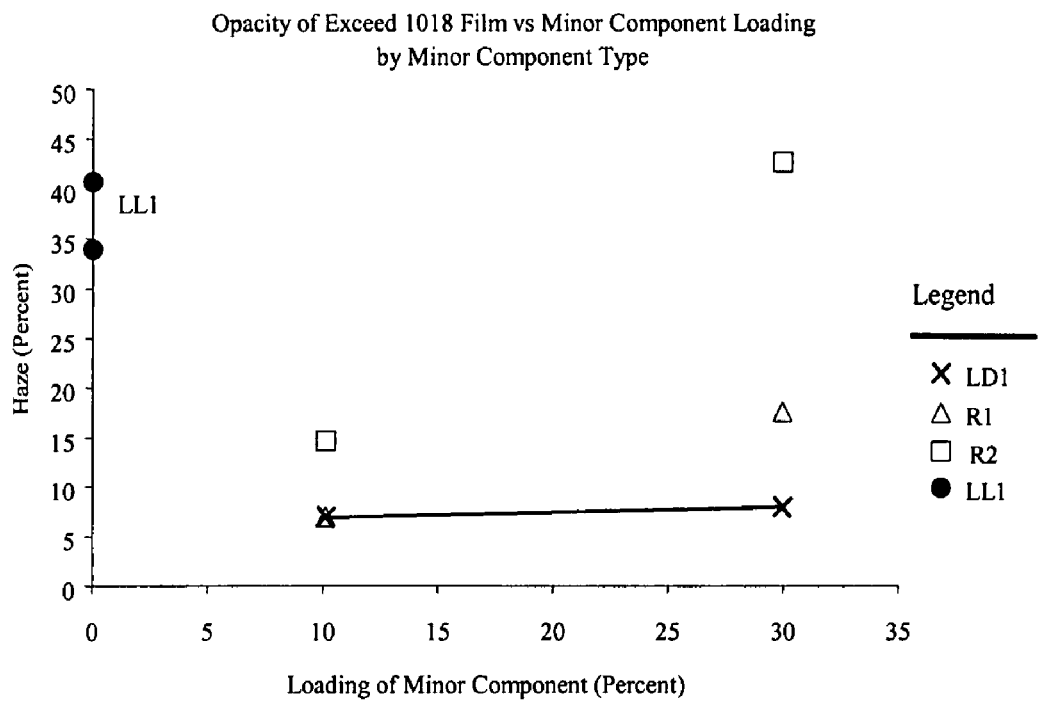
FIG. 5 is an illustration of an embodiment of the haze of Exceed LLDPE 1018 versus the minor component loading by minor component type.
Figure 6:
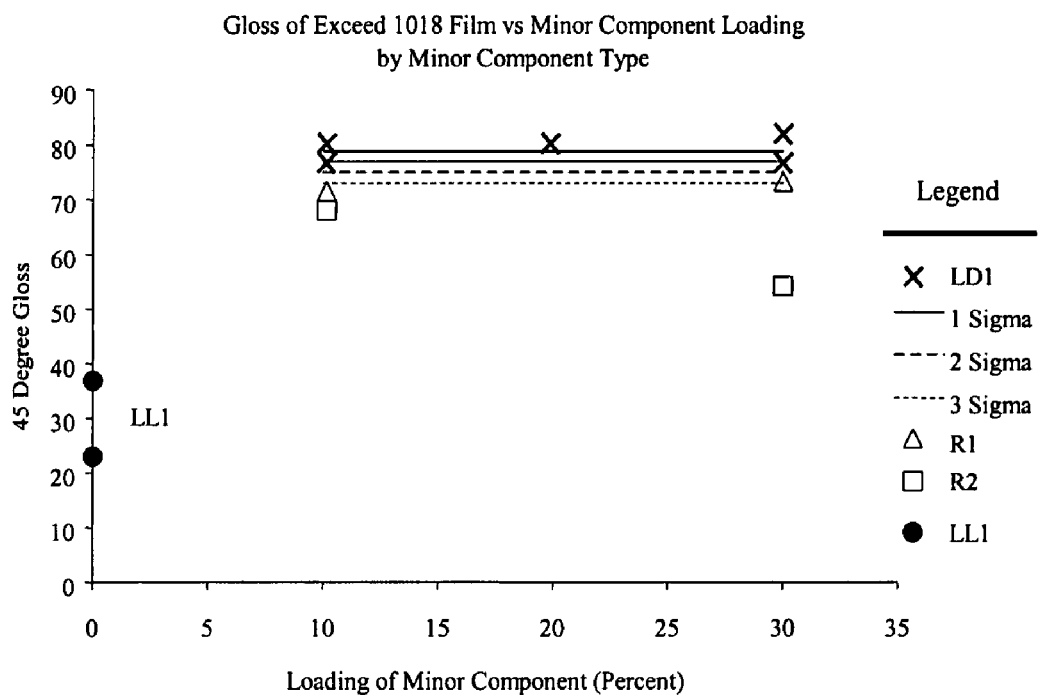
FIG. 6 is an illustration of an embodiment of the gloss of Exceed LLDPE 1018 versus the minor component loading by minor component type.
Figure 7:
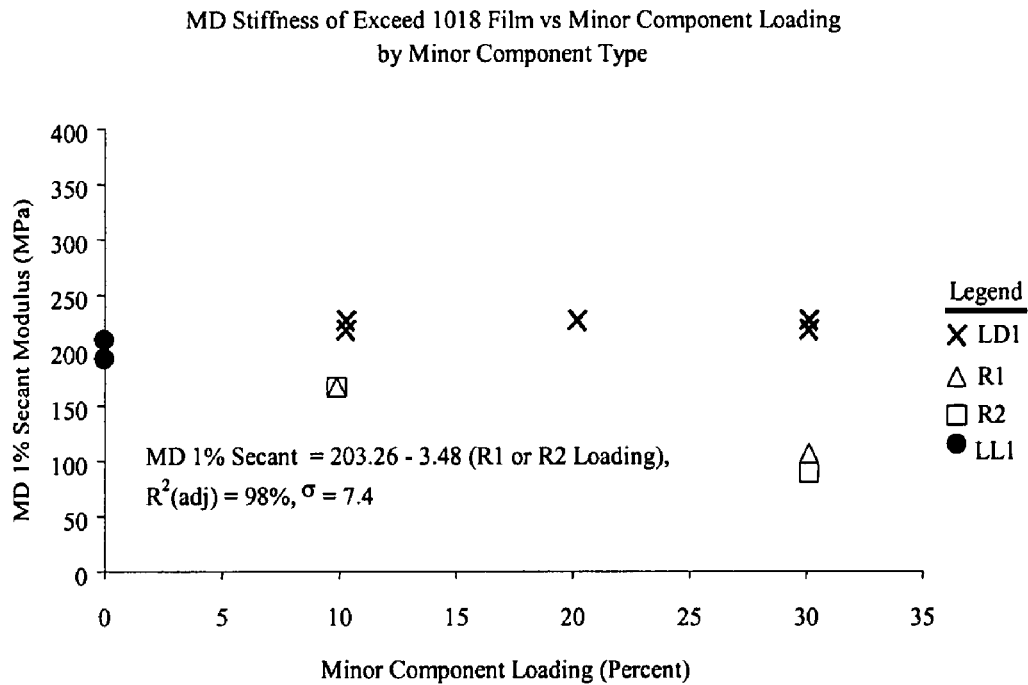
FIG. 7 is an illustration of an embodiment of the machine-direction stiffness of Exceed LLDPE 1018 versus the minor component loading by minor component type.
Figure 8:
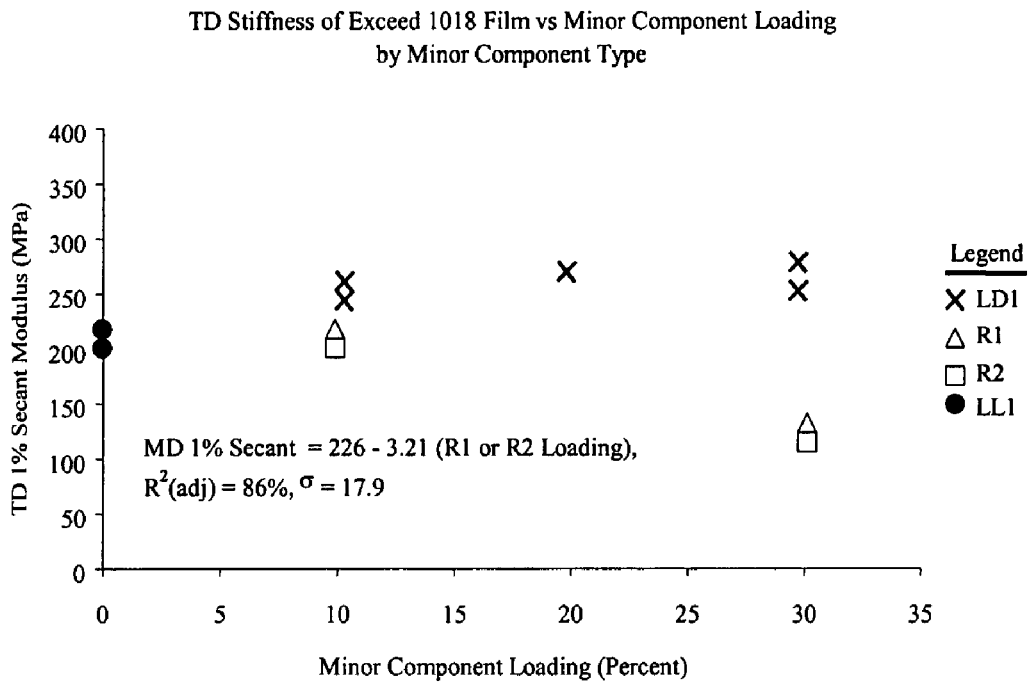
FIG. 8 is an illustration of an embodiment of the transverse direction stiffness of Exceed LLDPE 1018 versus the minor component loading by minor component type.
Figure 9:
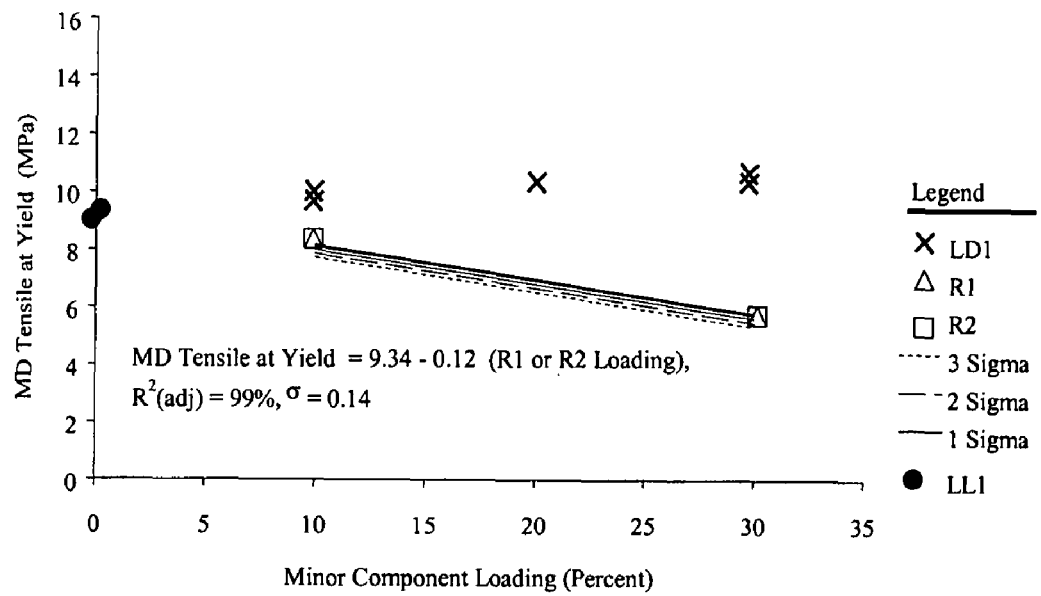
FIG. 9 is an illustration of an embodiment of the machine direction load bearing capability of Exceed LLDPE 1018 versus the minor component loading by minor component type.
Figure 10:
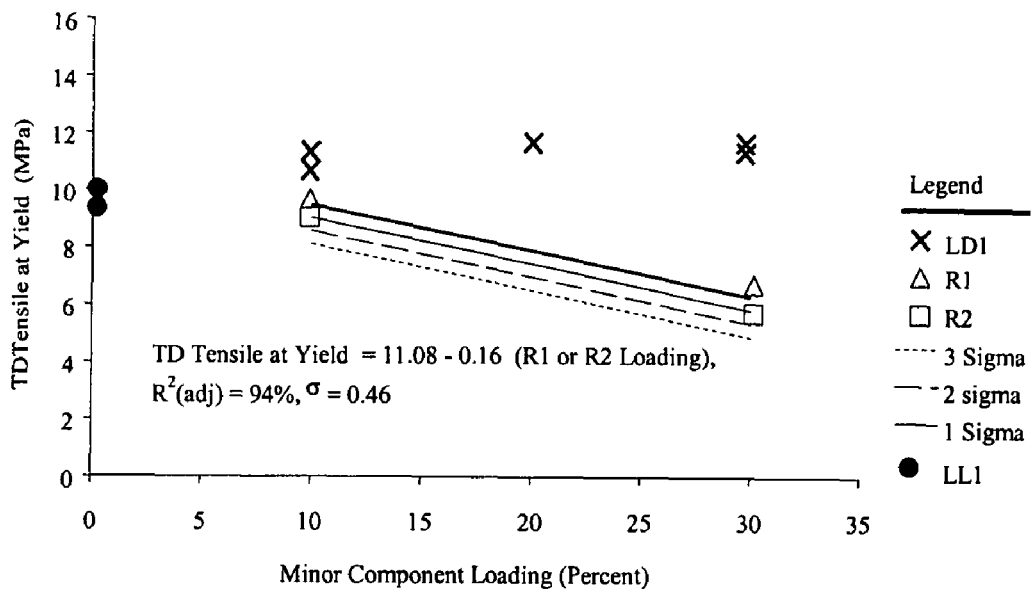
FIG. 10 is an illustration of an embodiment of the traverse direction load bearing capability of Exceed LLDPE 1018 versus the minor component loading by minor component type.
Figure 11:
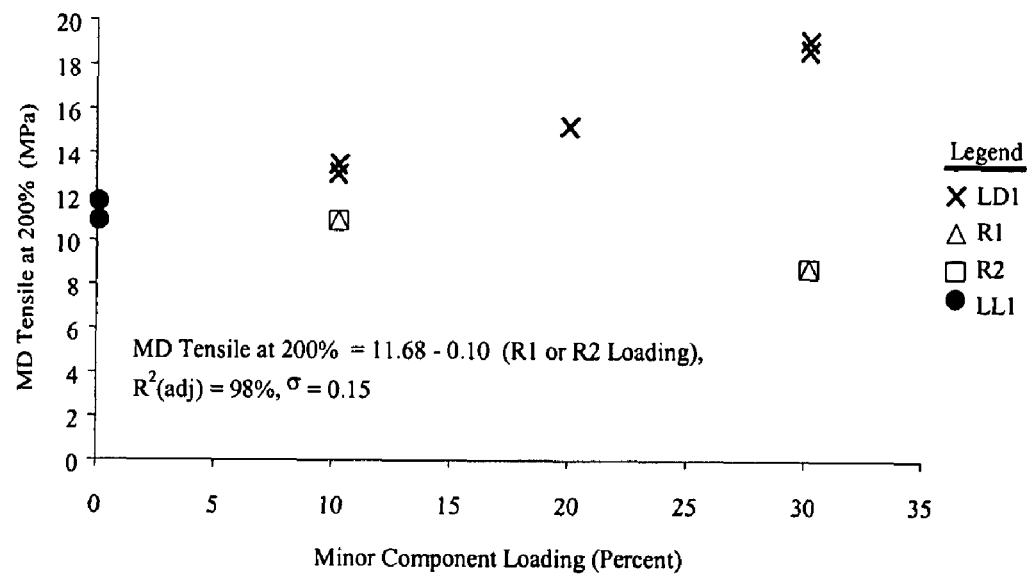
FIG. 11 is an illustration of an embodiment of the machine direction load bearing capability of Exceed LLDPE 1018 versus the minor component loading by minor component type.
Figure 12:
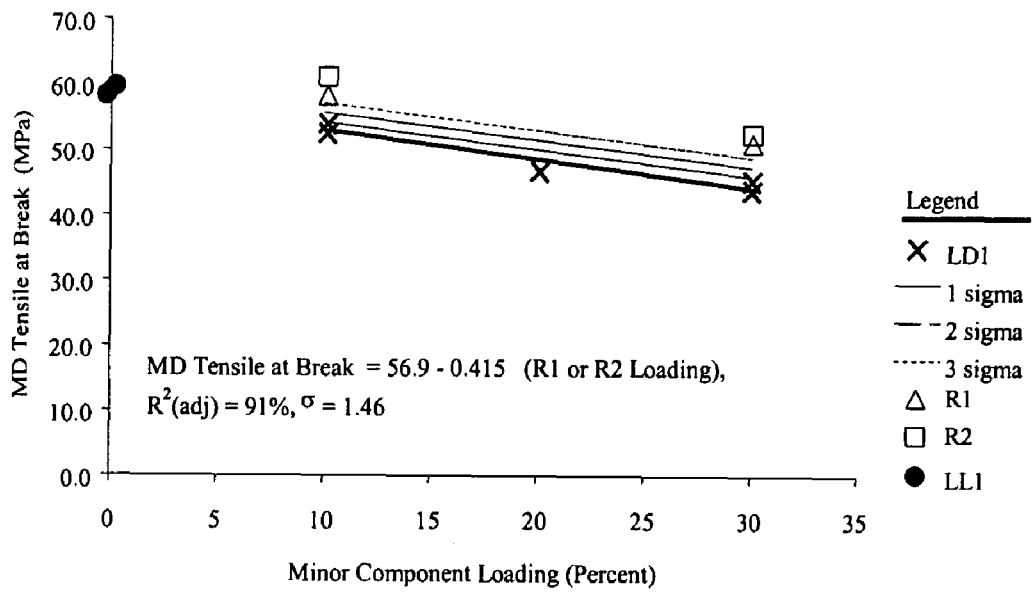
FIG. 12 is an illustration of an embodiment of the ultimate load bearing capability of Exceed LLDPE 1018 versus the minor component loading by minor component.
Figure 13:
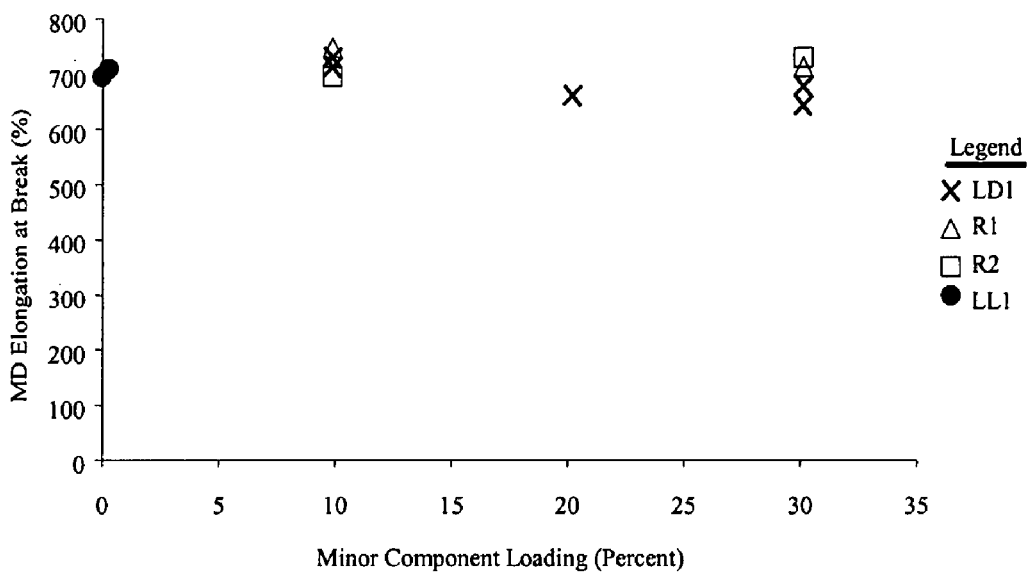
FIG. 13 is an illustration of an embodiment of the machine direction elongation break of Exceed LLDPE 1018 versus the minor component loading by minor component type.
Figure 14:
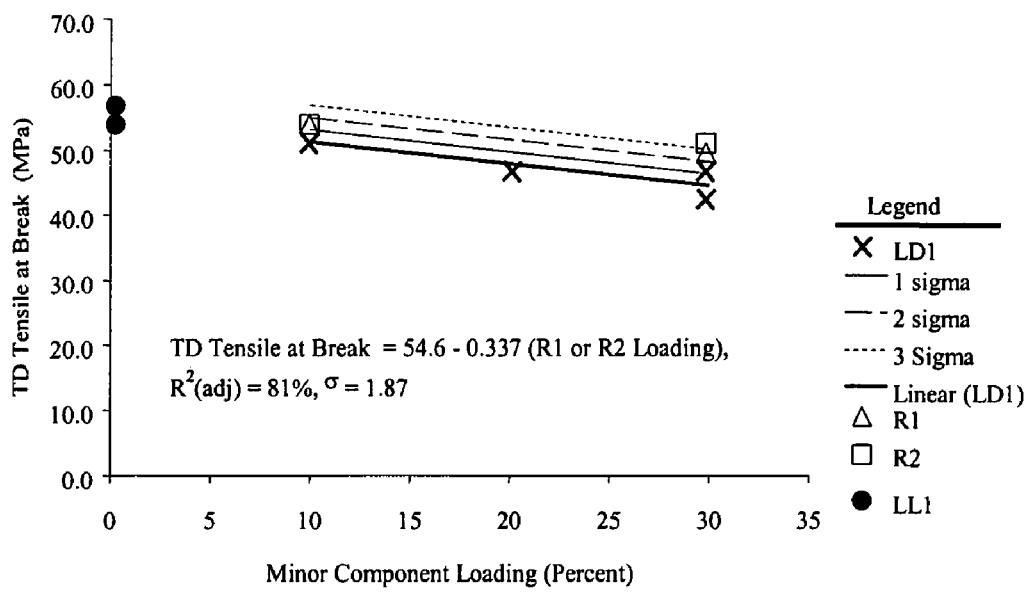
FIG. 14 is an illustration of an embodiment of the traverse direction tensile break of Exceed LLDPE 1018 versus the minor component loading by minor component type.
Figure 15:
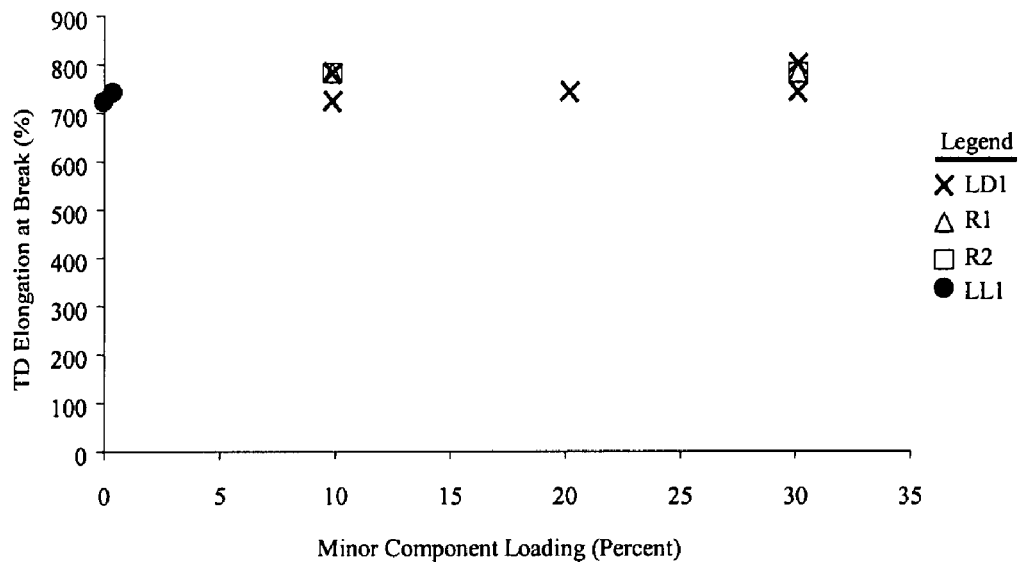
FIG. 15 is an illustration of an embodiment of the traverse direction elongation break of Exceed LLDPE 1018 versus the minor component loading by minor component type.
Figure 19:
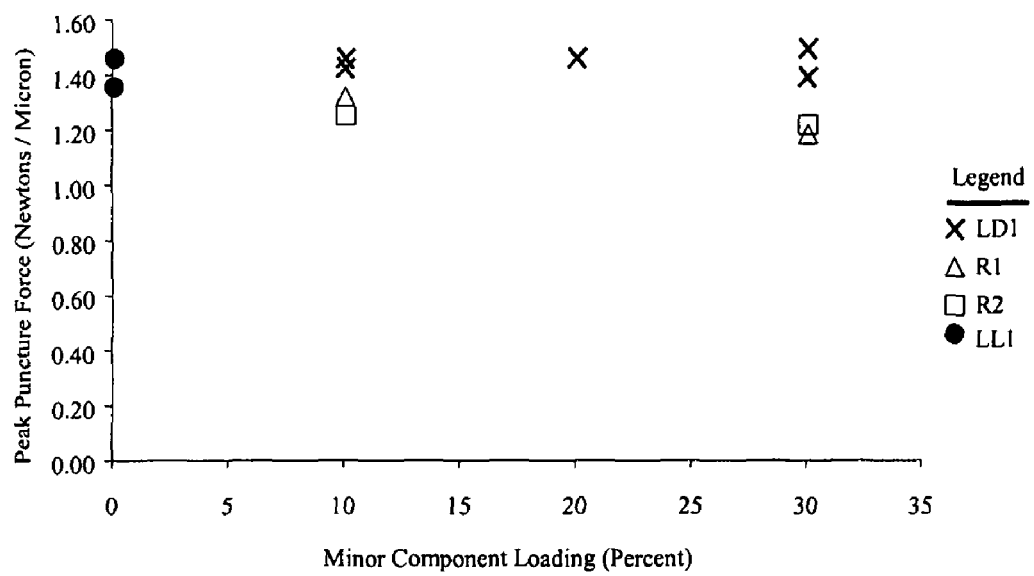
FIG. 19 is an illustration of an embodiment of the puncture resistance force of Exceed LLDPE 1018 versus the minor component loading by minor component type.
Figure 20:
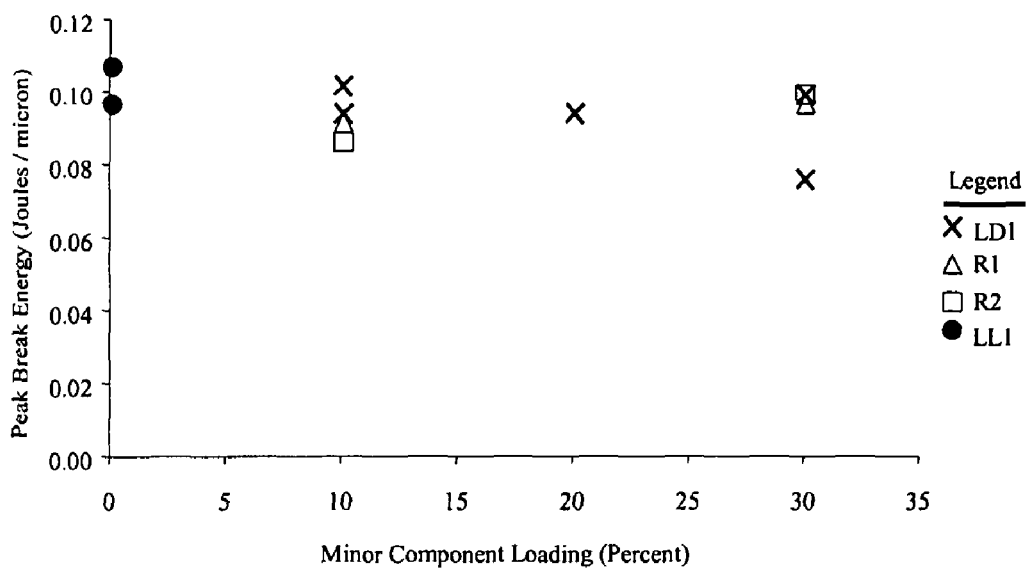
FIG. 20 is an illustration of an embodiment of the puncture resistance energy of Exceed LLDPE 1018 versus the minor component loading by minor component type.
Figure 21:
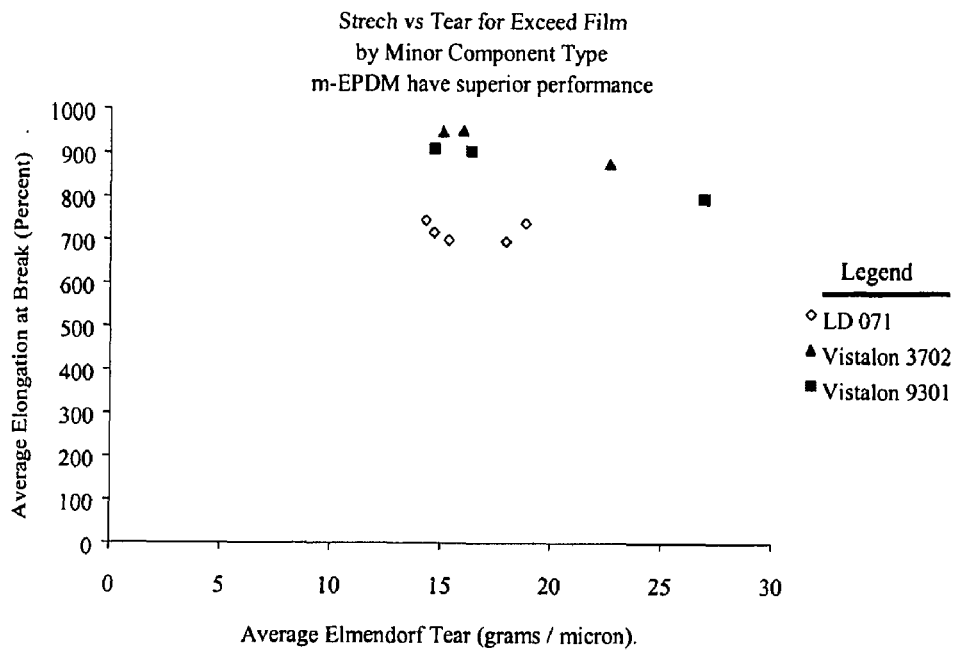
FIG. 21 is an illustration of an embodiment of the average elongation at break of Exceed LLDPE 1018 versus the average Elmendorf tear by minor component type.
Figure 22:
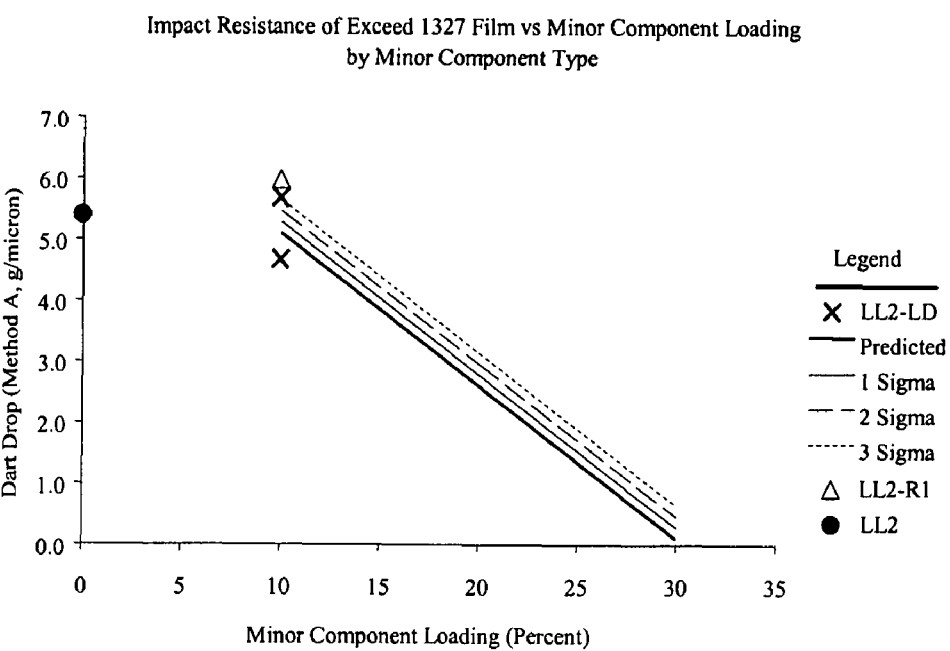
FIG. 22 is an illustration of an embodiment of the dart drop of Exceed™ LLDPE 1327 versus the minor component loading by minor component type.
Figure 23:
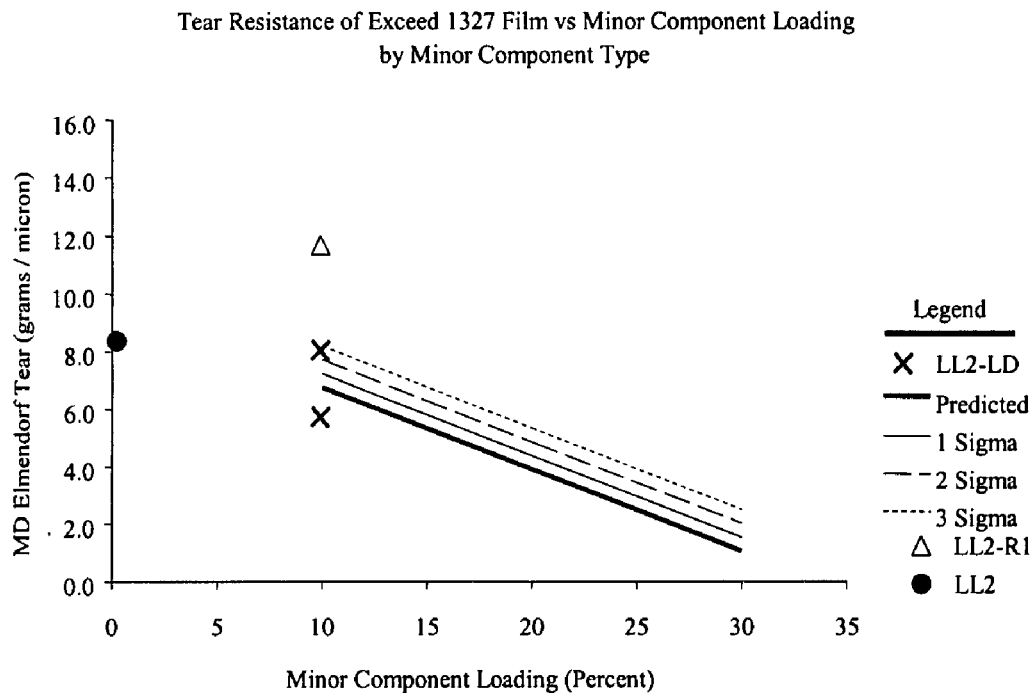
FIG. 23 is an illustration of an embodiment of the machine direction tear of Exceed LLDPE 1327 versus the minor component loading by minor component type.
Figure 24:
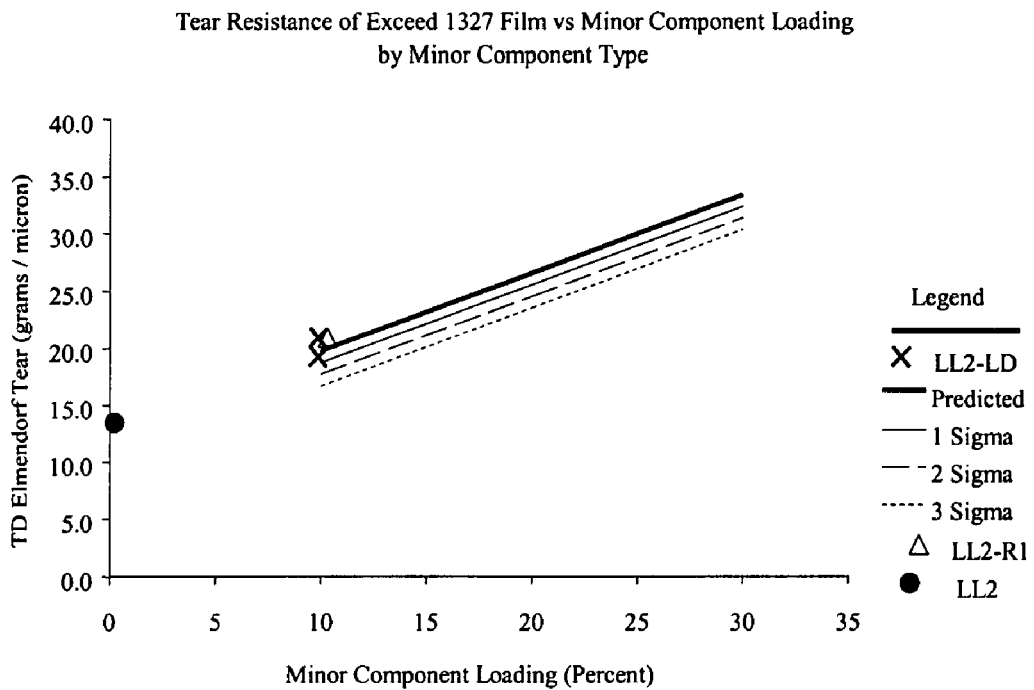
FIG. 24 is an illustration of an embodiment of the transverse Elmendorf tear of Exceed LLDPE 1327 versus the minor component loading by minor component type.
Figure 25:
FIG. 25 is an illustration of an embodiment of the balance of tear resistance of Exceed LLDPE 1327 versus the minor component loading by minor component type.
Figure 26:
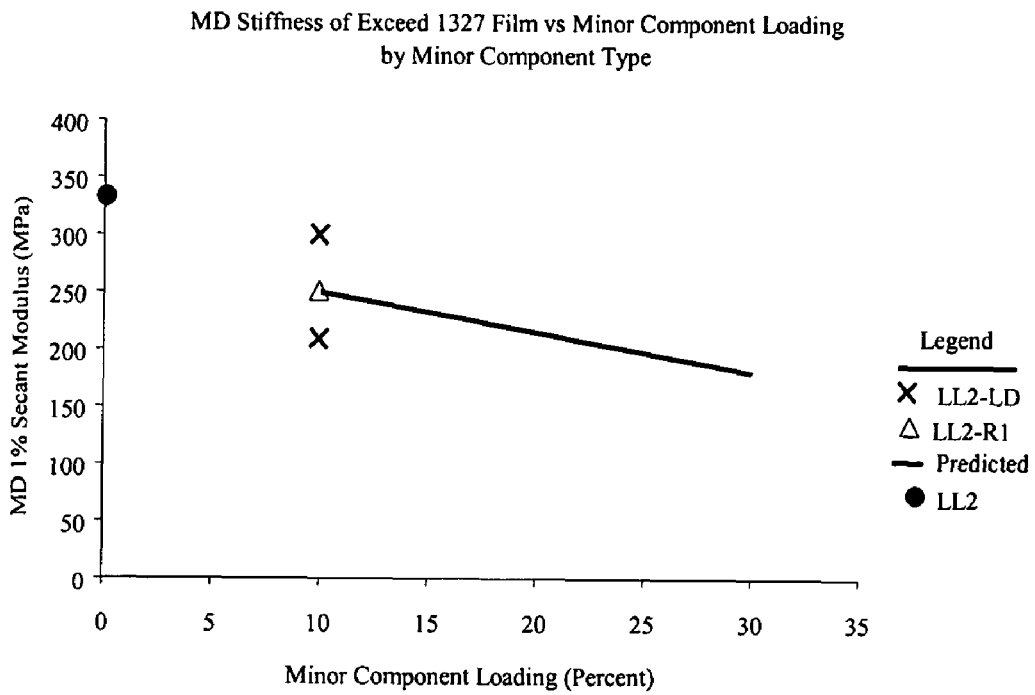
FIG. 26 is an illustration of an embodiment of the machine direction stiffness of Exceed LLDPE 1327 versus the minor component loading by minor component type.
Figure 27:
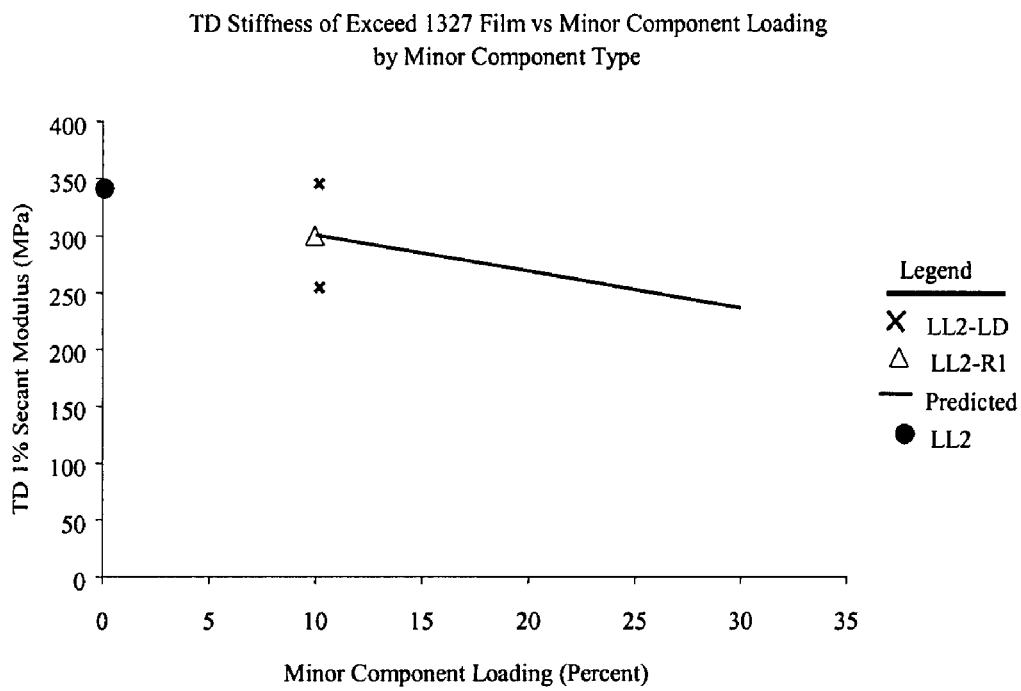
FIG. 27 is an illustration of an embodiment of the transverse direction stiffness of Exceed LLDPE 1327 versus the minor component loading by minor component type.
Figure 28:
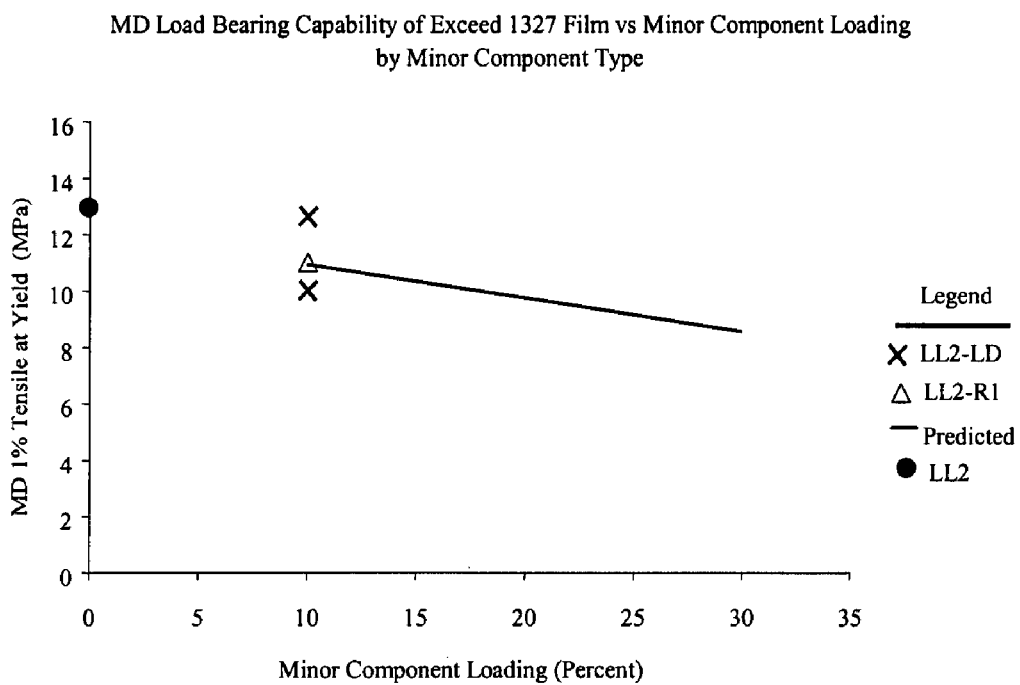
FIG. 28 is an illustration of an embodiment of the machine direction 1% tensile at yield of Exceed LLDPE 1327 versus the minor component loading by minor component type.
Figure 29:
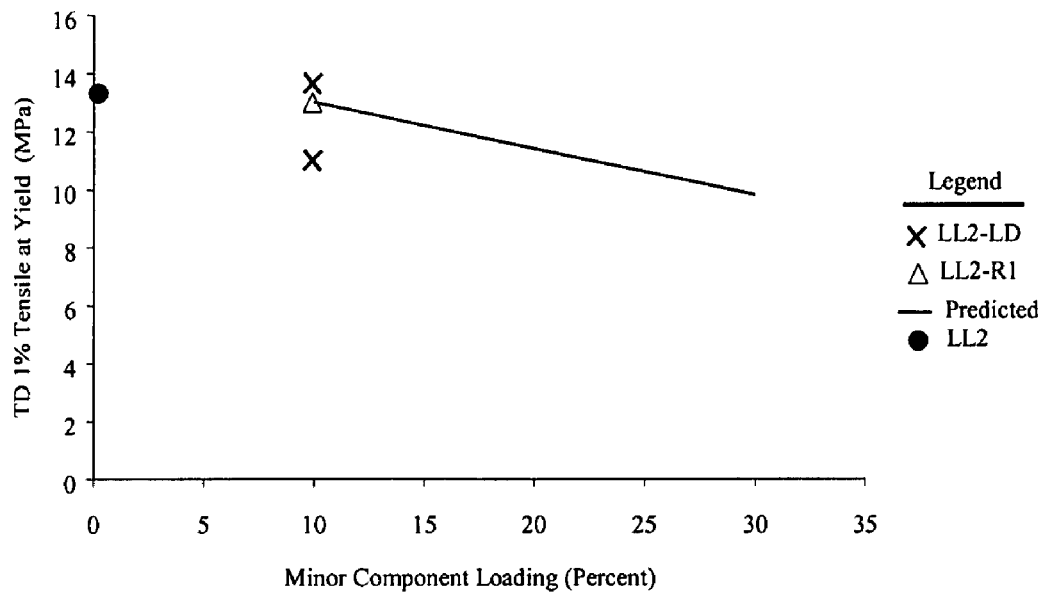
FIG. 29 is an illustration of an embodiment of the transverse direction 1% tensile at yield of Exceed LLDPE 1327 versus the minor component loading by minor component type.
Figure 30:
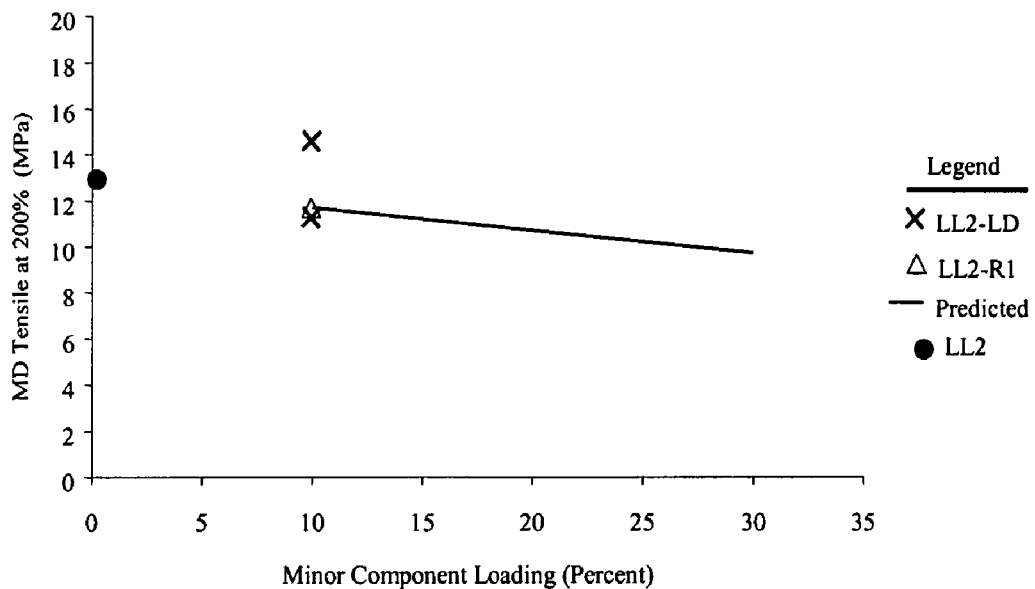
FIG. 30 is an illustration of an embodiment of the machine direction tensile at 200% of Exceed LLDPE 1327 versus the minor component loading by minor component type.
Figure 31:
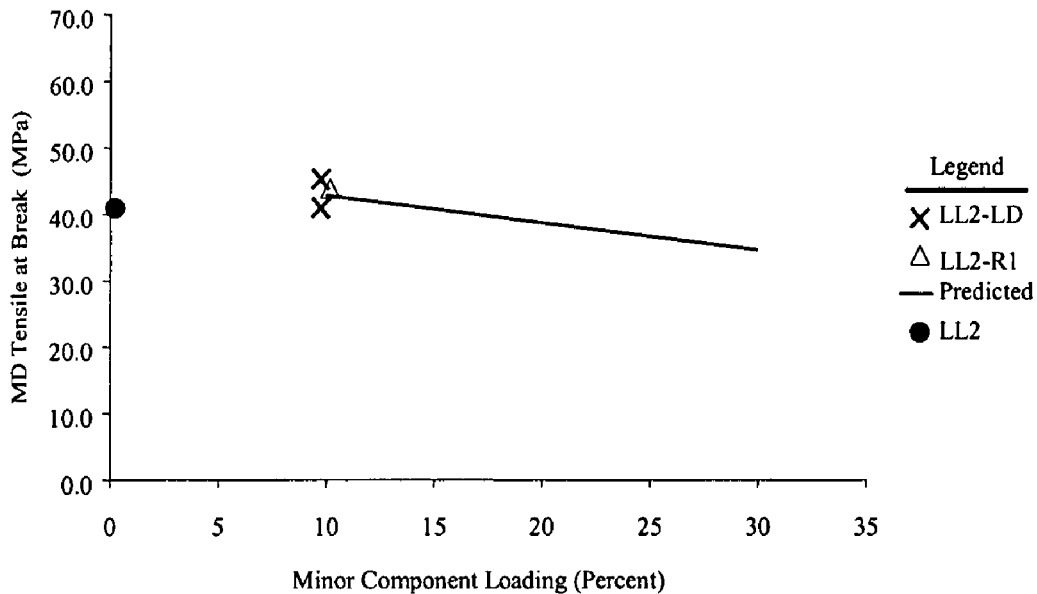
FIG. 31 is an illustration of an embodiment of the machine direction tensile at break of Exceed LLDPE 1327 versus the minor component loading by minor component type.
Figure 32:
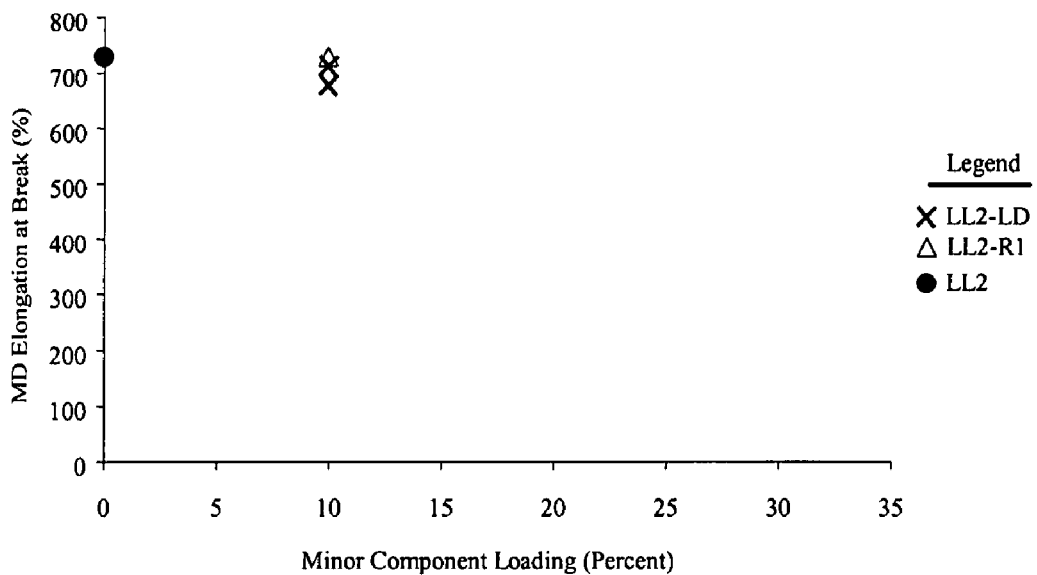
FIG. 32 is an illustration of an embodiment of the machine direction elongation at break of Exceed LLDPE 1327 versus the minor component loading by minor component type.
Figure 33:
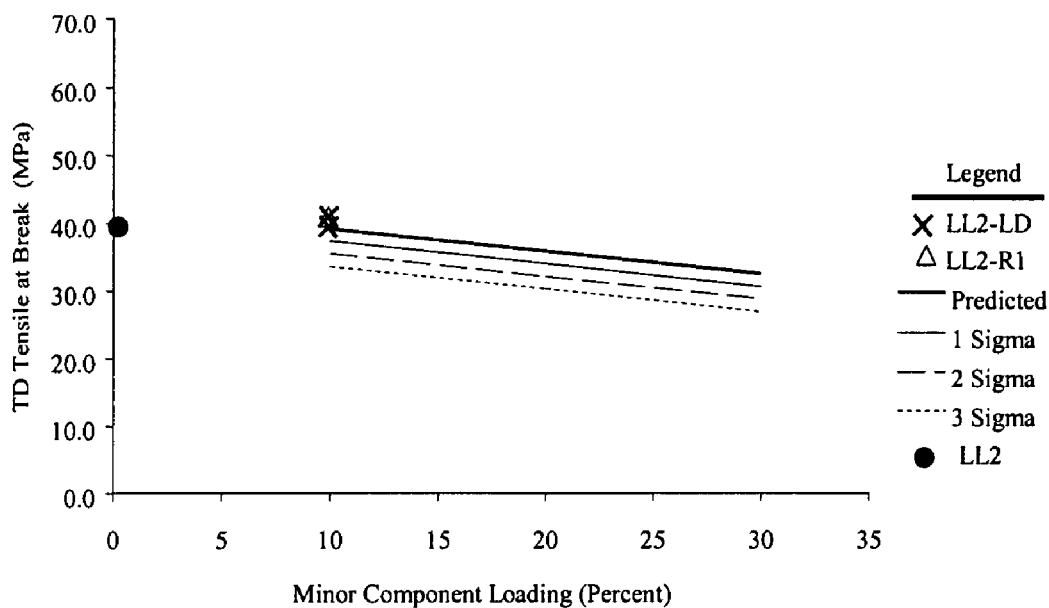
FIG. 33 is an illustration of an embodiment of the transverse direction tensile at break of Exceed LLDPE 1327 versus the minor component loading by minor component type.
Figure 34:
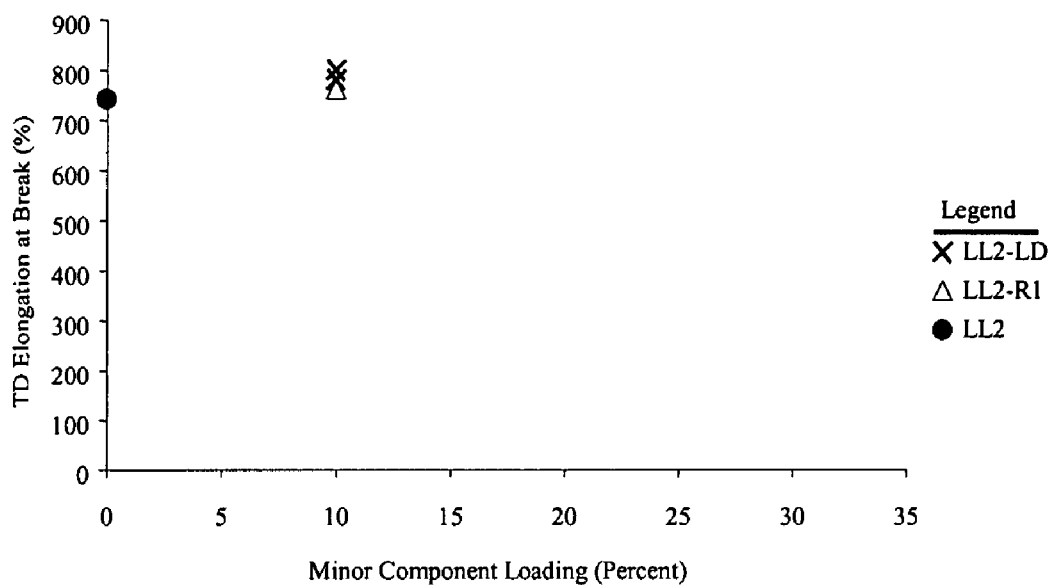
FIG. 34 is an illustration of an embodiment of the tensile direction elongation at break of Exceed LLDPE 1327 versus the minor component loading by minor component type.
Figure 35:
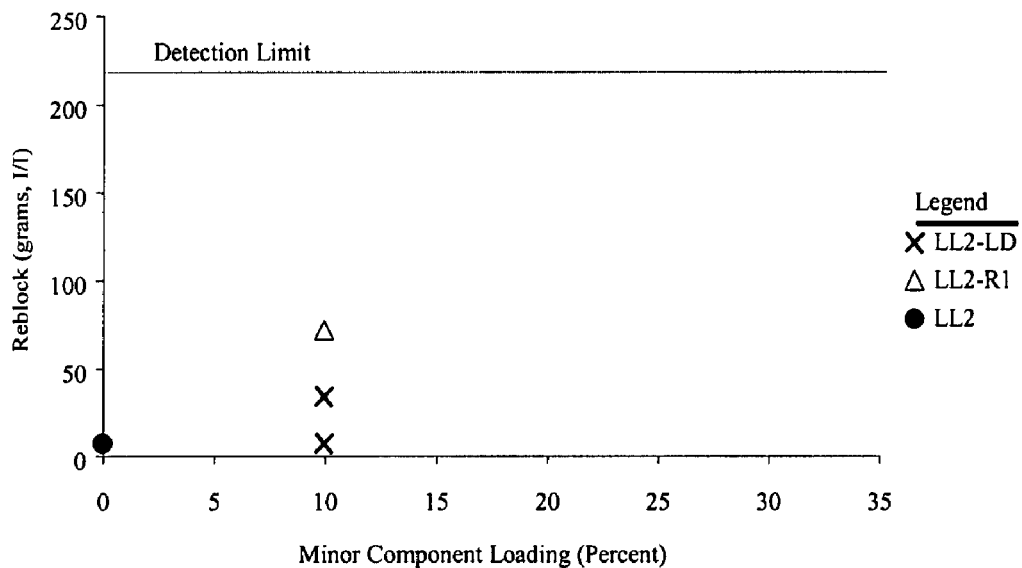
FIG. 35 is an illustration of an embodiment of the reblock of Exceed LLDPE 1327 versus the minor component loading by minor component type.
Figure 36:
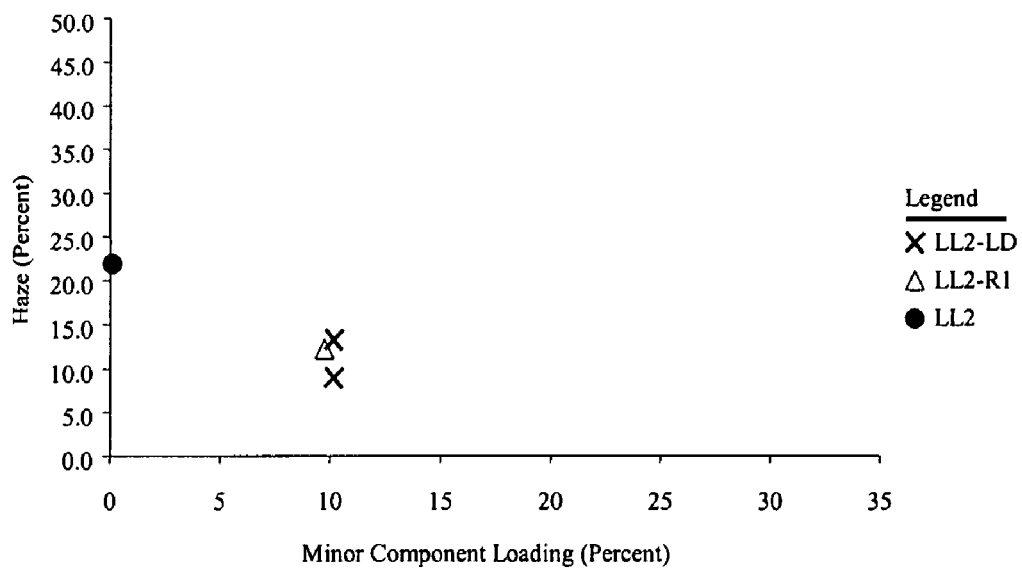
FIG. 36 is an illustration of an embodiment of the haze of Exceed LLDPE 1327 versus the minor component loading by minor component type.
Figure 37:
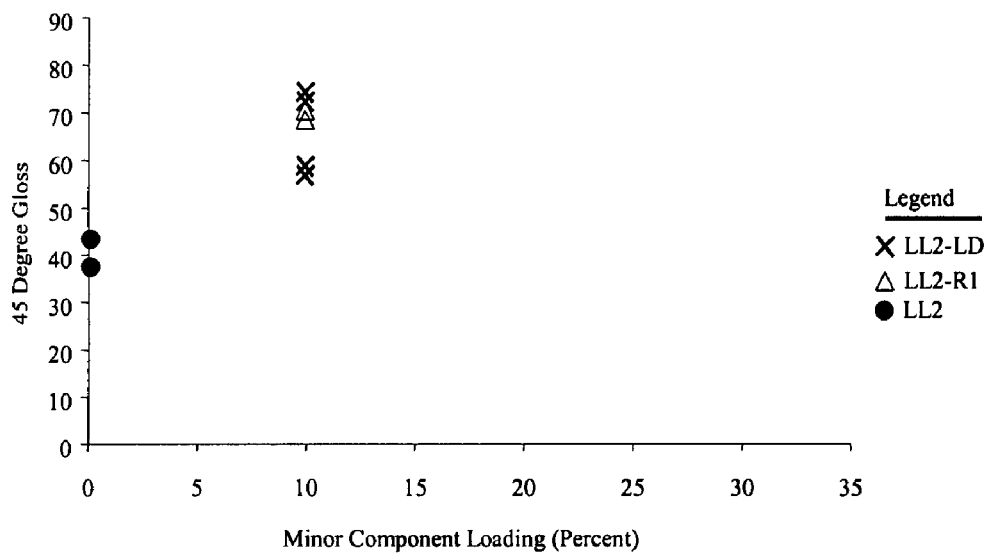
FIG. 37 is an illustration of an embodiment of the gloss of Exceed LLDPE 1327 versus the minor component loading by minor component type.
Figure 38:
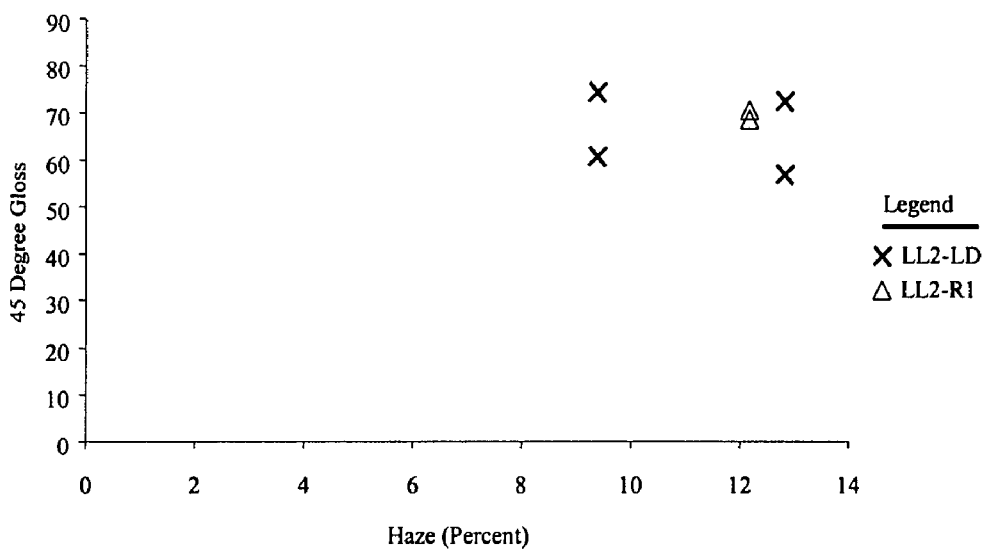
FIG. 38 is an illustration of an embodiment of the 45 degree gloss of Exceed LLDPE 1327 versus the haze by minor component type.
Figure 39:
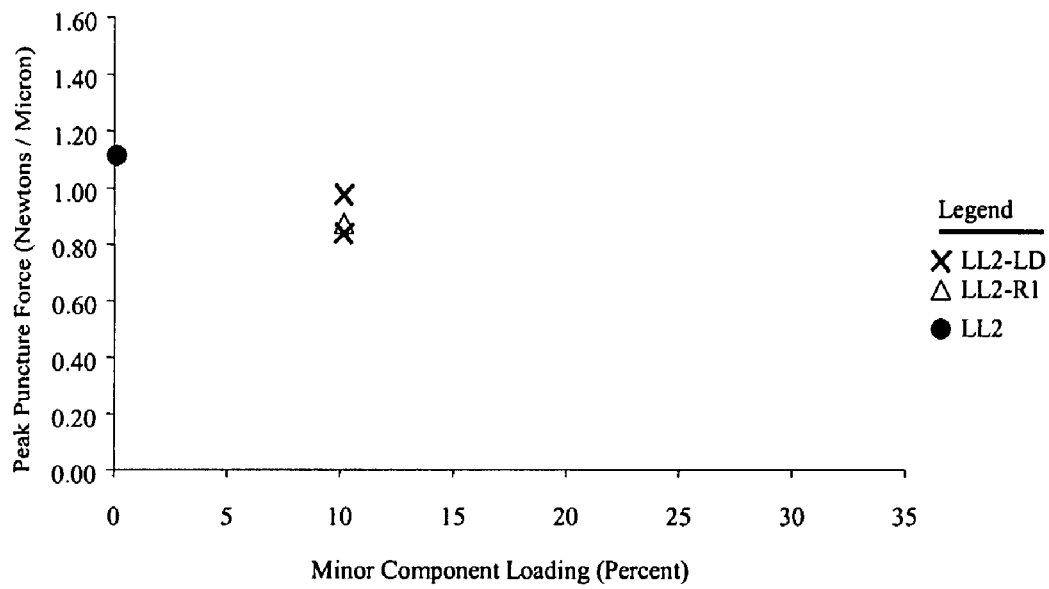
FIG. 39 is an illustration of an embodiment of the peak puncture force of Exceed LLDPE 1327 versus the minor component loading by minor component type.
Figure 40:
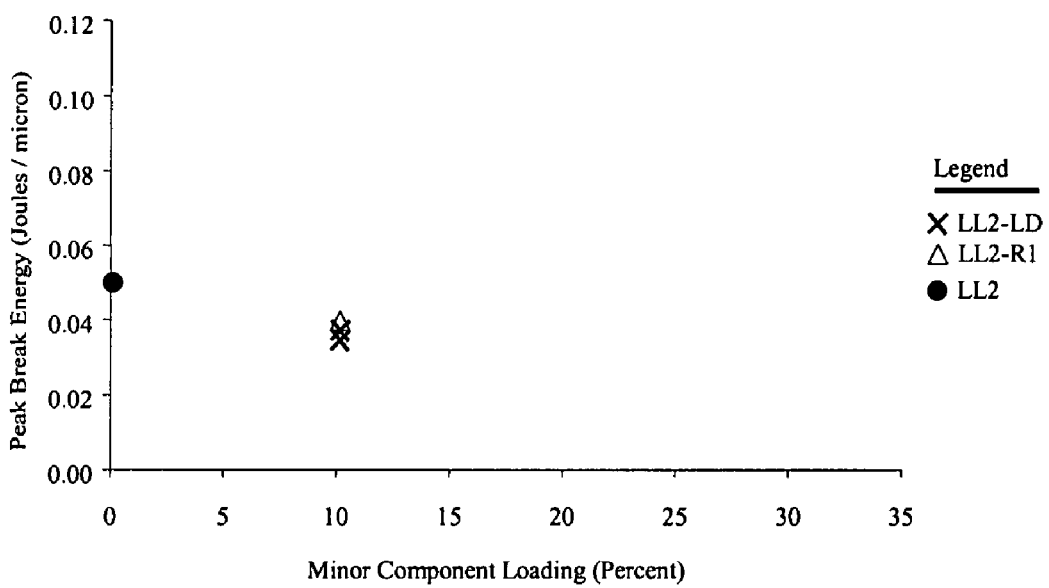
FIG. 40 is an illustration of an embodiment of the peak break energy of Exceed LLDPE 1327 versus the minor component loading by minor component type.
Figure 41:
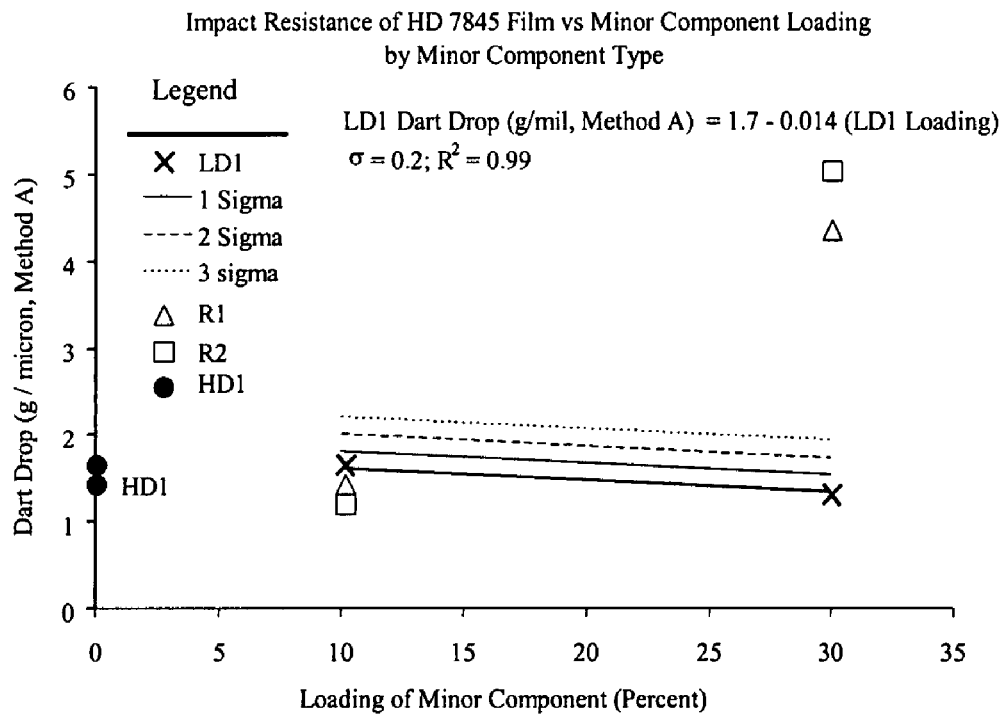
FIG. 41 is an illustration of an embodiment of the draft drop of HD 7845 PE versus the minor component loading by minor component type.
Figure 42:
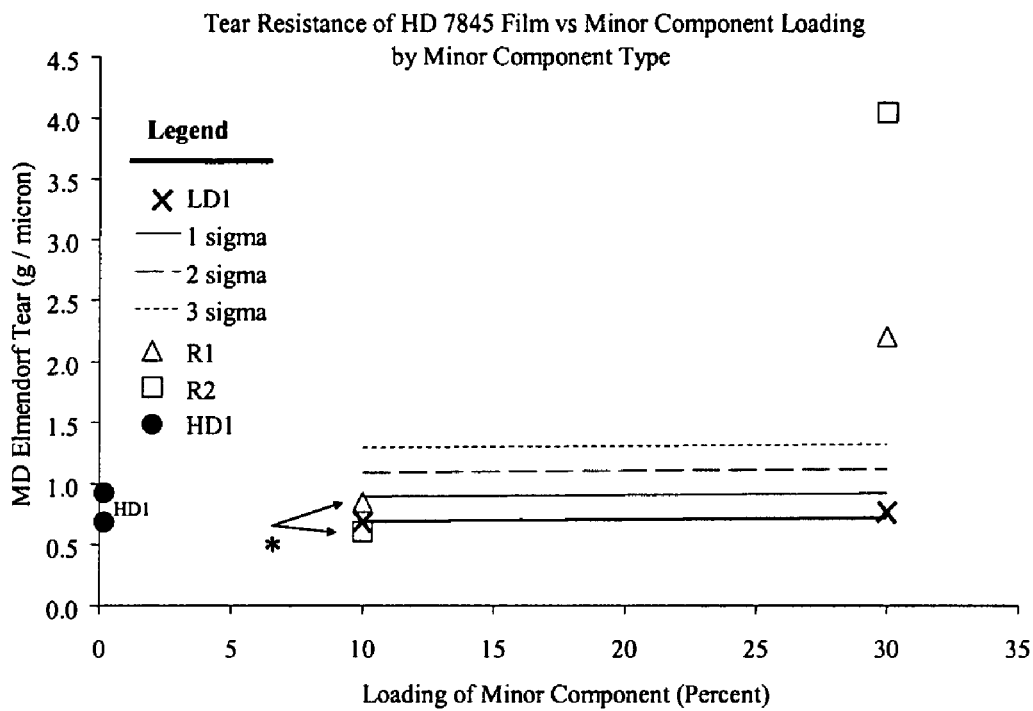
FIG. 42 is an illustration of an embodiment of the machine direction Elmendorf tear of HD 7845 PE versus the minor component loading by minor component type.
Figure 43:
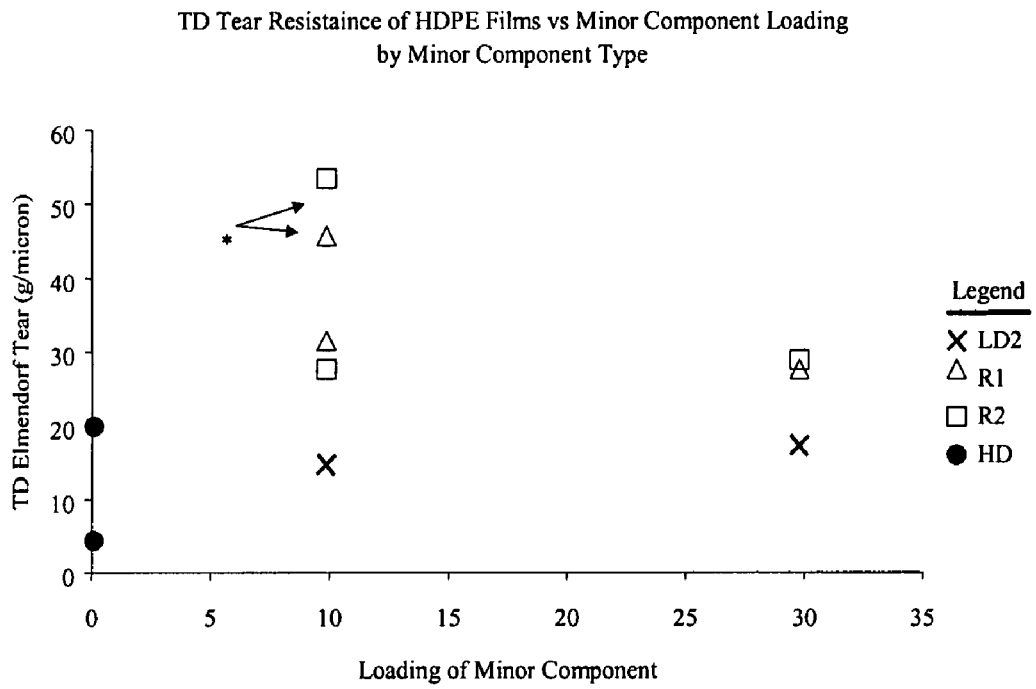
FIG. 43 is an illustration of an embodiment of the transverse direction Elmendorf tear of HD versus the minor component loading by minor component type.
Figure 44:
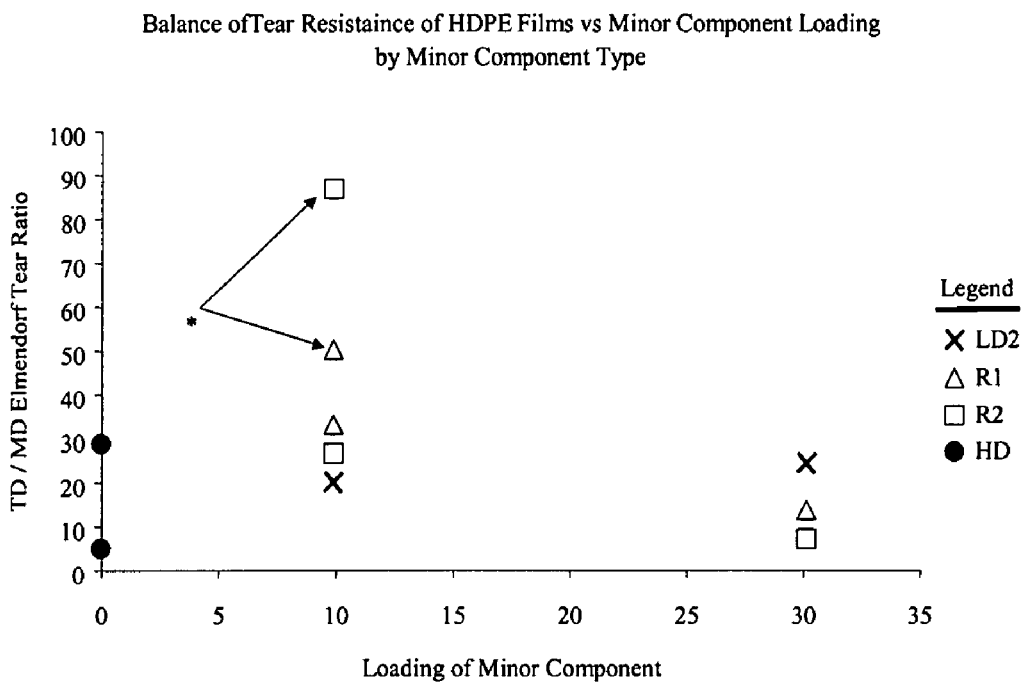
FIG. 44 is an illustration of an embodiment of the balance of tear resistance of HD 7845 PE versus the minor component loading by minor component type.
Figure 45:
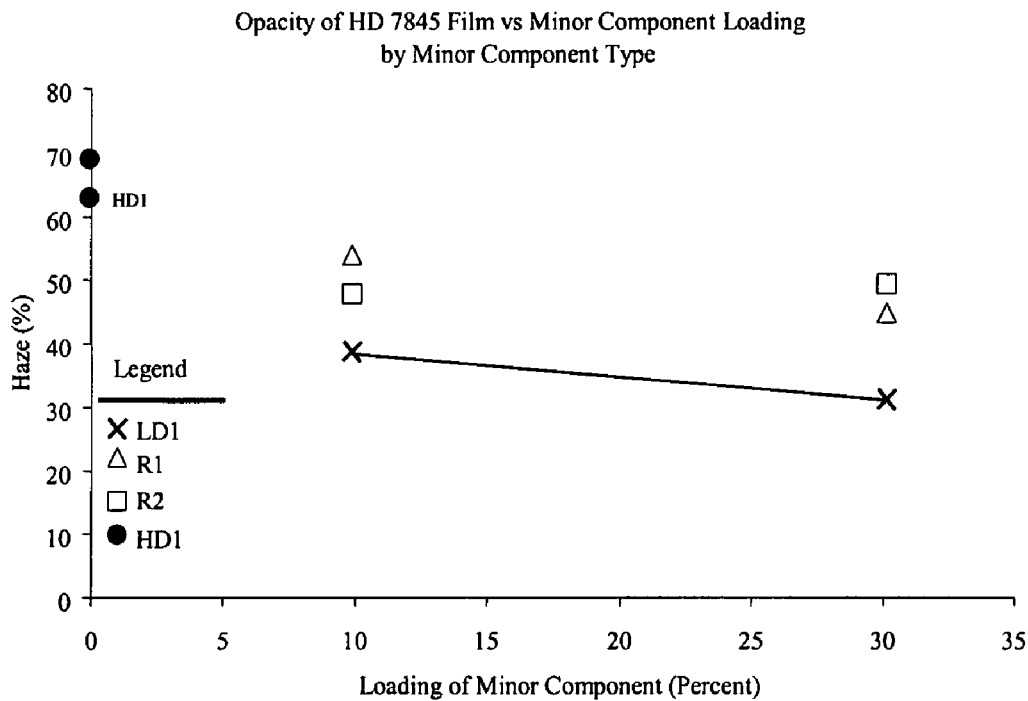
FIG. 45 is an illustration of an embodiment of the haze of HD 7845 PE versus the minor component loading by minor component type.
Figure 46:
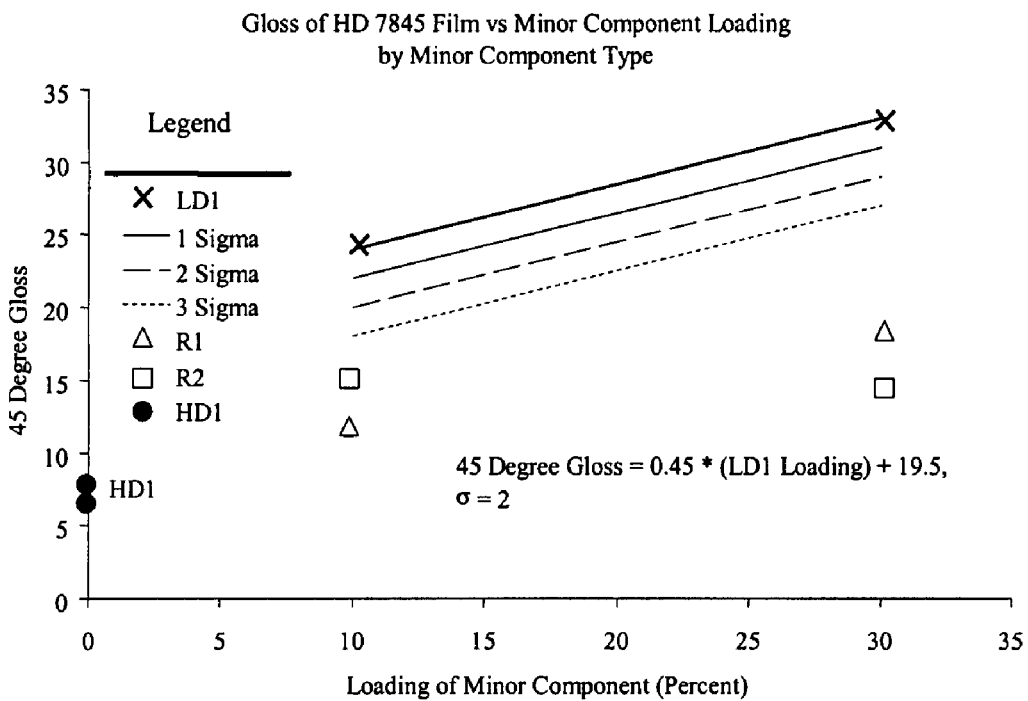
FIG. 46 is an illustration of an embodiment of the 45 degree gloss of HD 7845 PE versus the minor component loading by minor component type.
Figure 47:
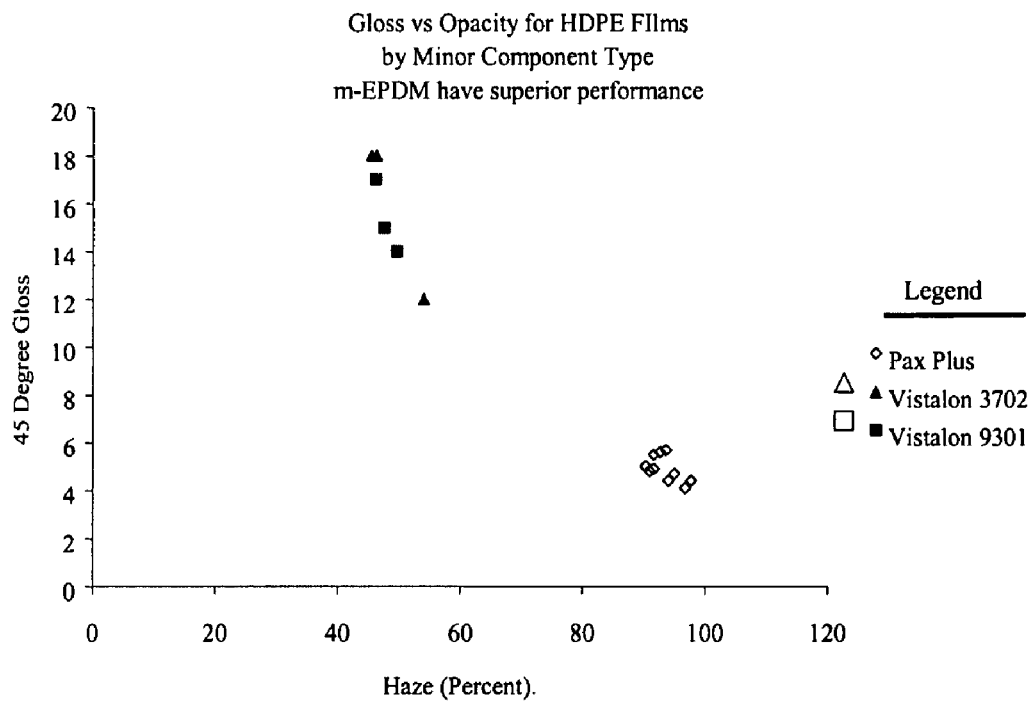
FIG. 47 is an illustration of an embodiment of the 45 degree gloss of HD 7845 PE versus the haze by minor component type.
Figure 48:
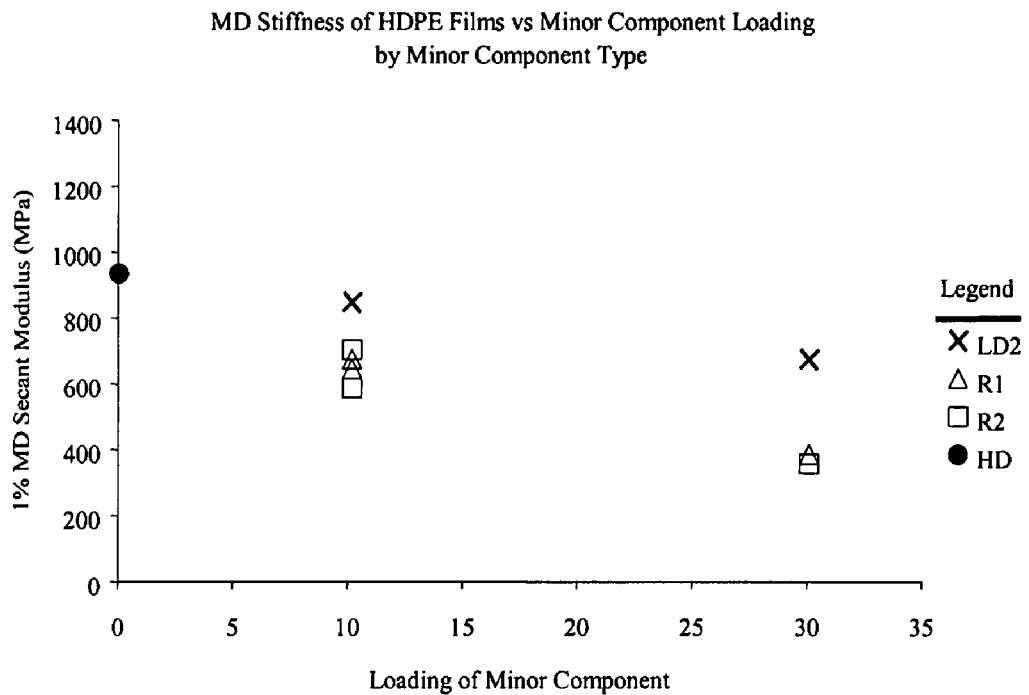
FIG. 48 is an illustration of an embodiment of the 1% machine direction secant modulus of HD 7845 PE versus the minor component loading by minor component type.
Figure 49:
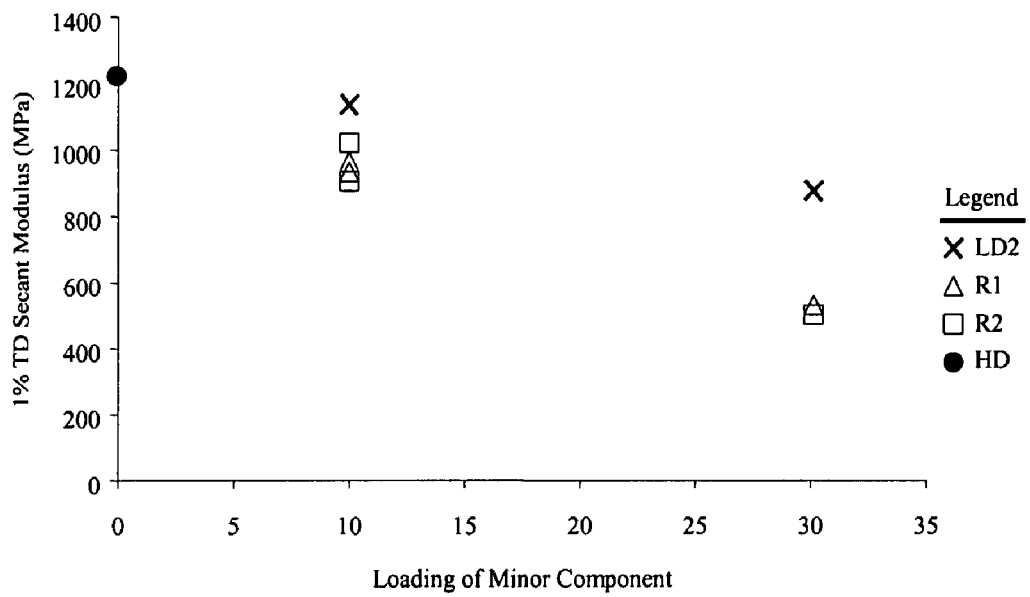
FIG. 49 is an illustration of an embodiment of the 1% transverse direction modulus of HD 7845 PE versus the minor component loading by minor component type.
Figure 50:
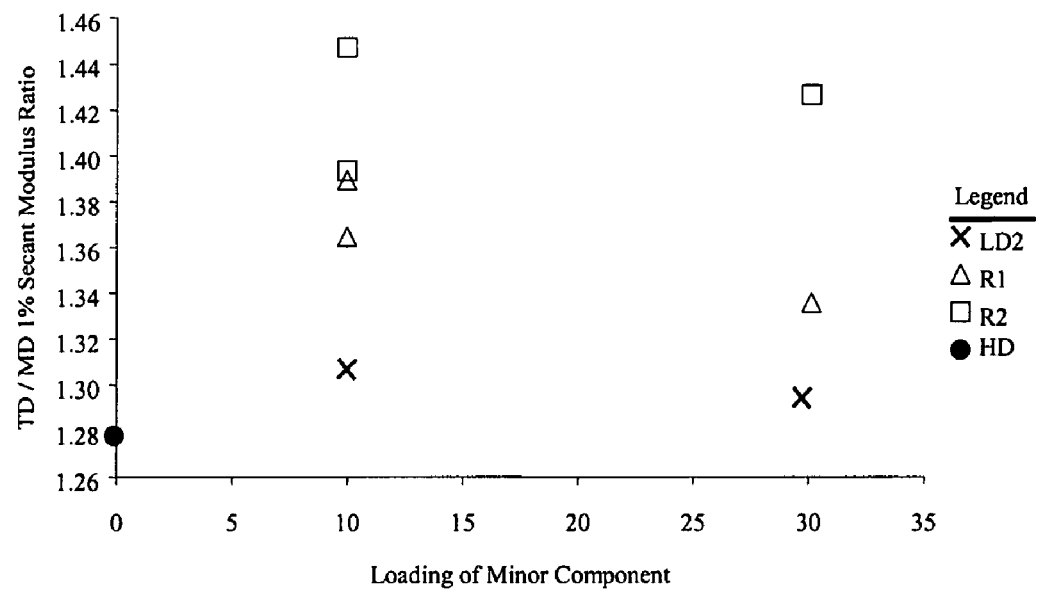
FIG. 50 is an illustration of an embodiment of the balance of stiffness of HD 7845 PE versus the minor component loading by minor component type.
Figure 51:
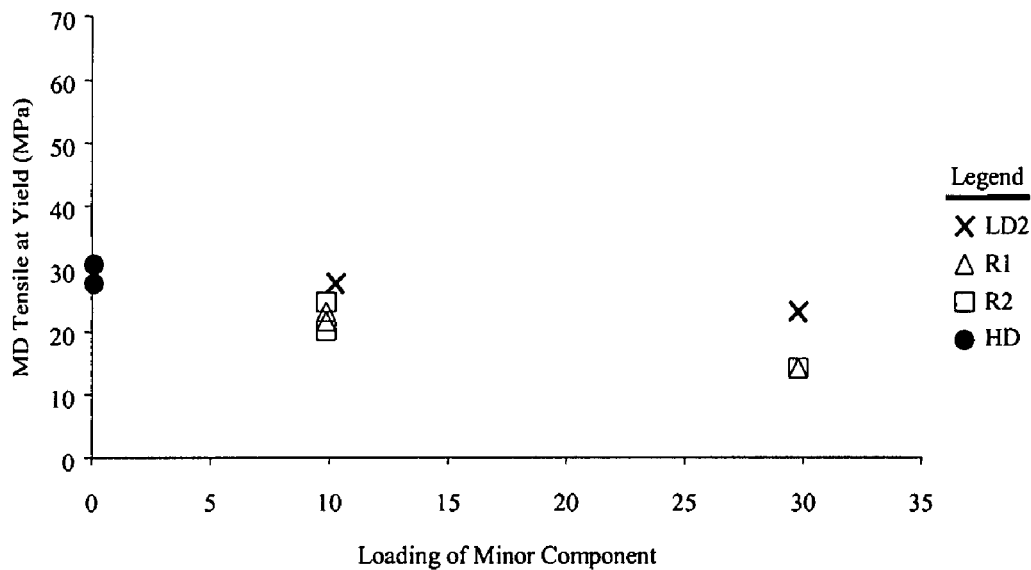
FIG. 51 is an illustration of an embodiment of the machine direction tensile at yield of HD 7845 PE versus the minor component loading by minor component type.
Figure 52:
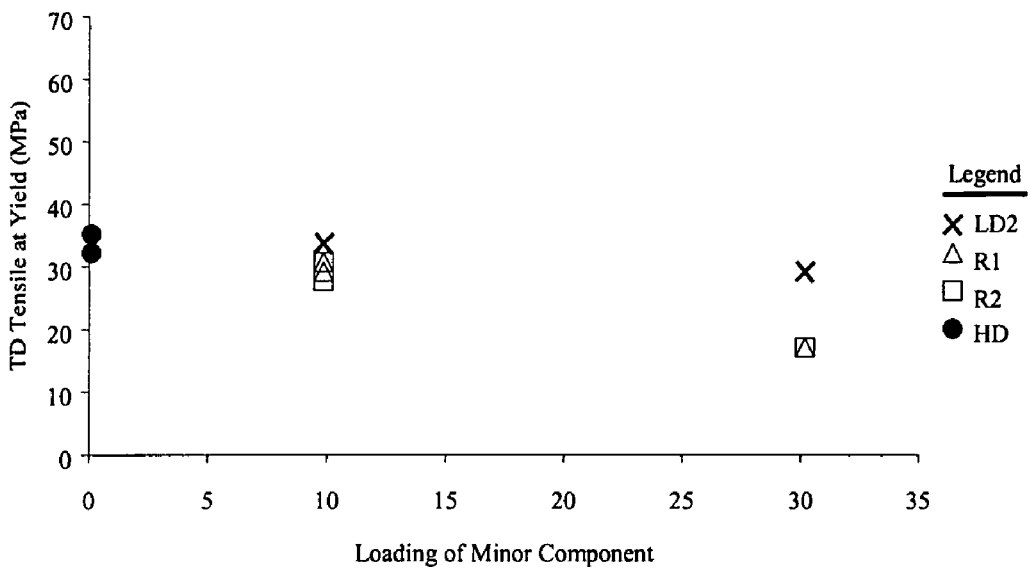
FIG. 52 is an illustration of an embodiment of the transverse direction tensile at yield of HD 7845 PE versus the minor component loading by minor component type.
Figure 53:
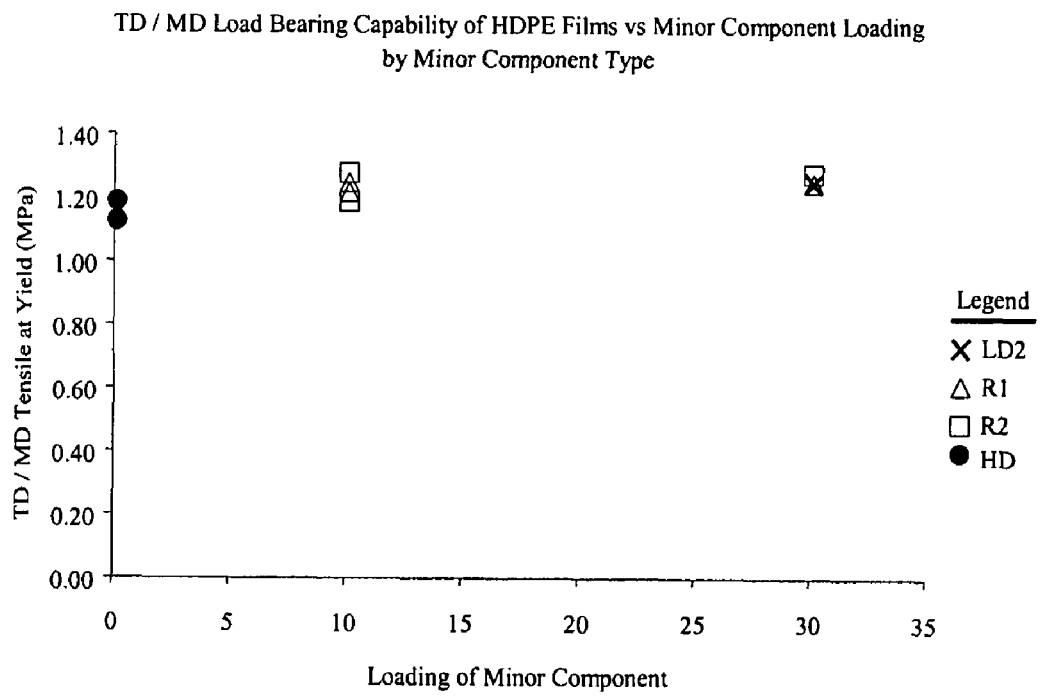
FIG. 53 is an illustration of an embodiment of the transverse direction/machine direction load bearing capability of HD 7845 PE versus the minor component loading by minor component type.
Figure 54:
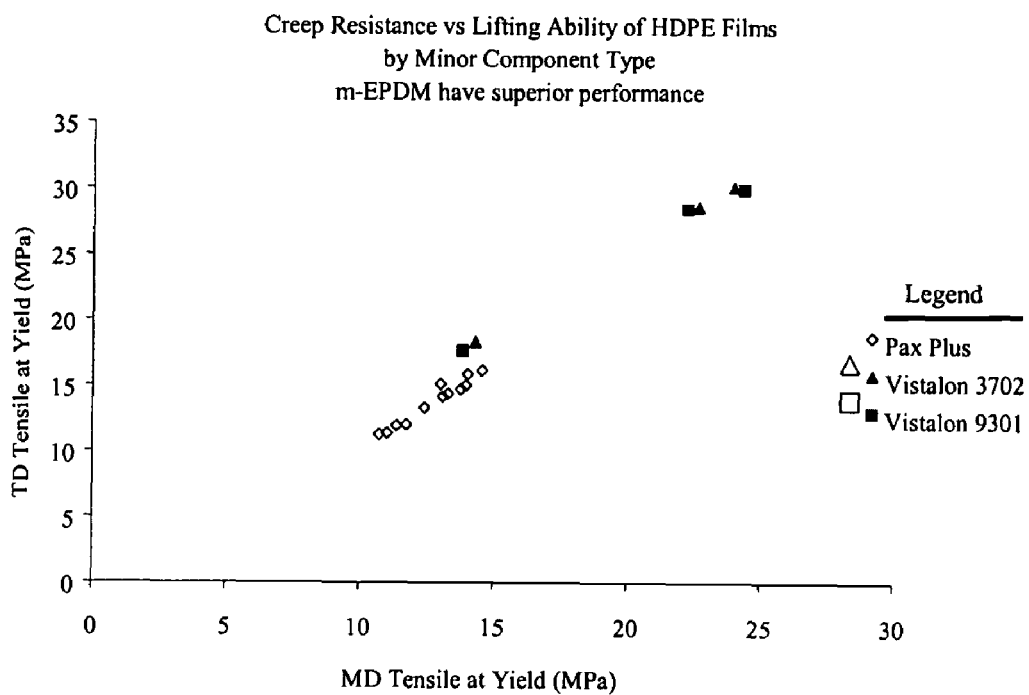
FIG. 54 is an illustration of an embodiment of the transverse direction tensile at yield of HD 7845 PE versus the machine direction at yield loading by minor component type.
Figure 55:
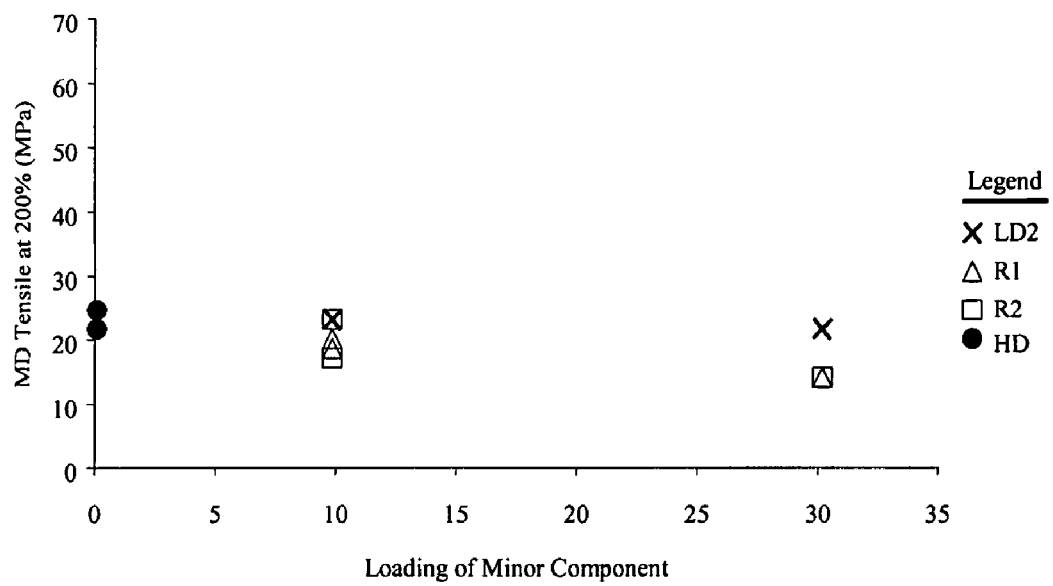
FIG. 55 is an illustration of an embodiment of the draft drop of HD 7845 PE versus the minor component loading by minor component type.
Figure 56:
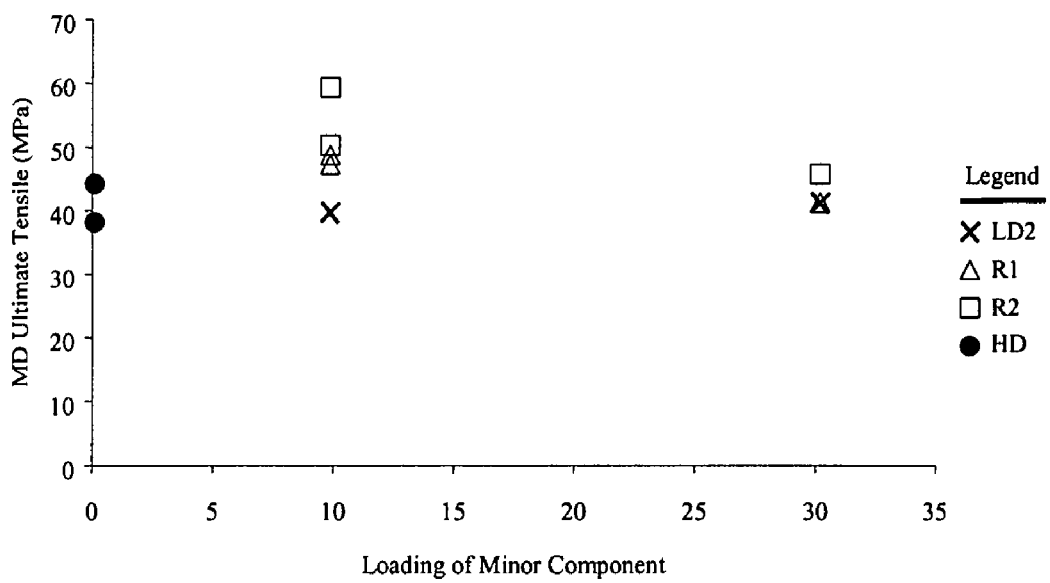
FIG. 56 is an illustration of an embodiment of the machine direction ultimate tensile of HD 7845 PE versus the minor component loading by minor component type.
Figure 57:
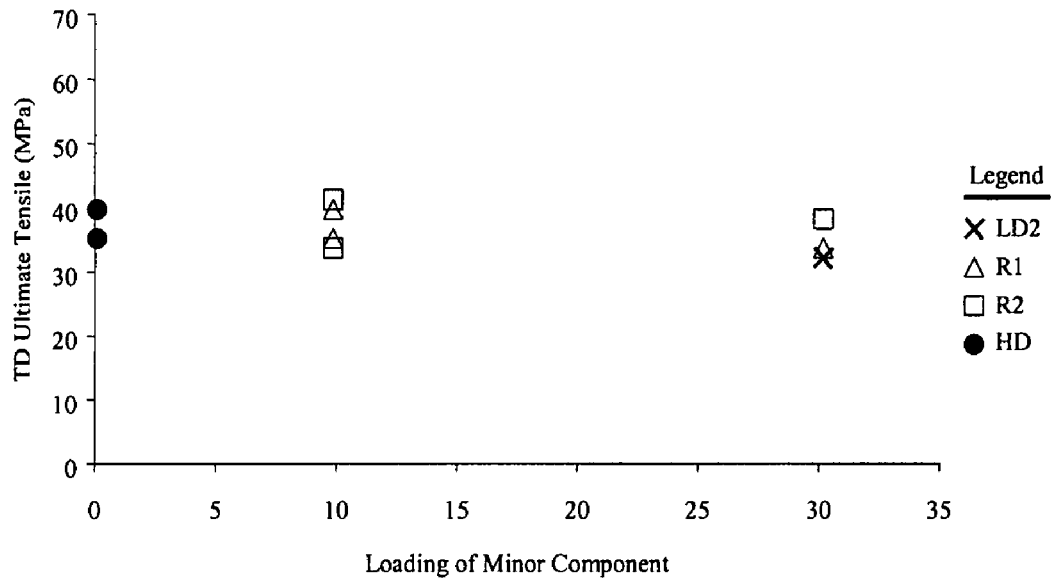
FIG. 57 is an illustration of an embodiment of the transverse direction ultimate tensile of HD 7845 PE versus the minor component loading by minor component type.
Figure 58:
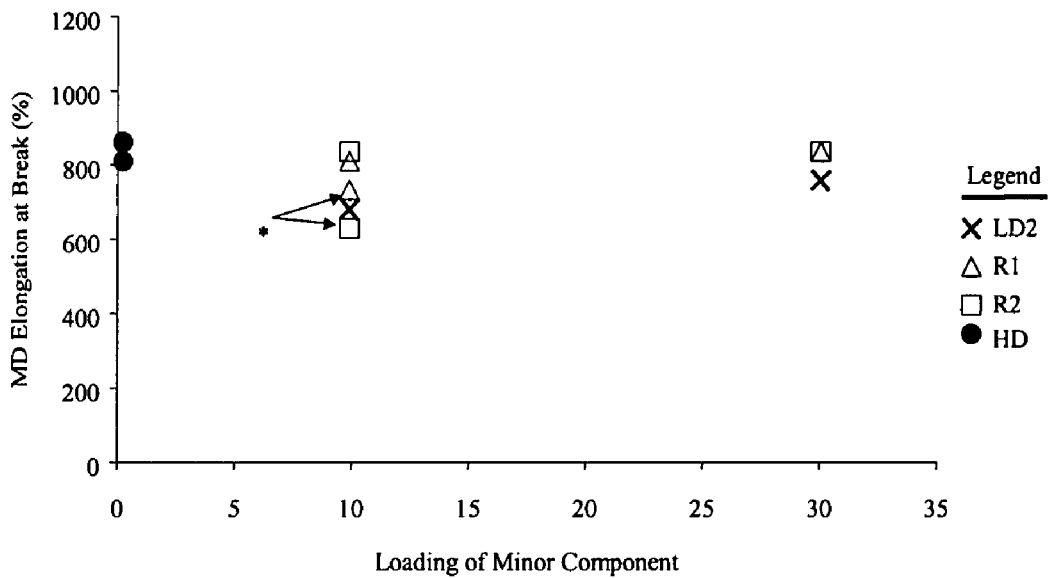
FIG. 58 is an illustration of an embodiment of the machine direction elongation at break of HD 7845 PE versus the minor component loading by minor component type.
Figure 59:
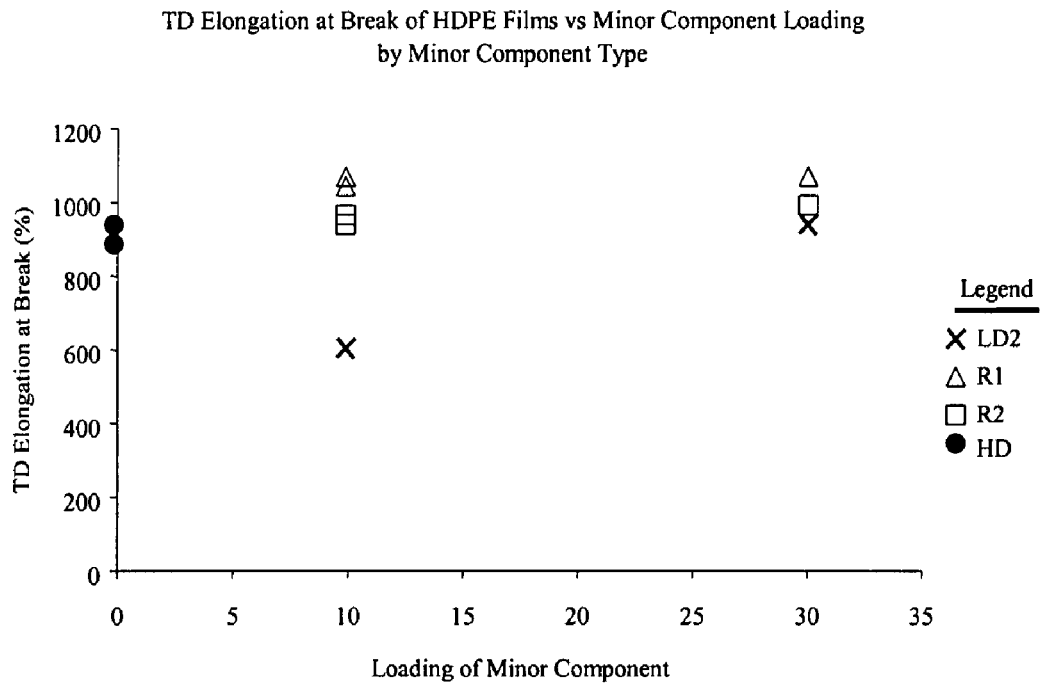
FIG. 59 is an illustration of an embodiment of the transverse direction at break of HD 7845 PE versus the minor component loading by minor component type.
Figure 60:
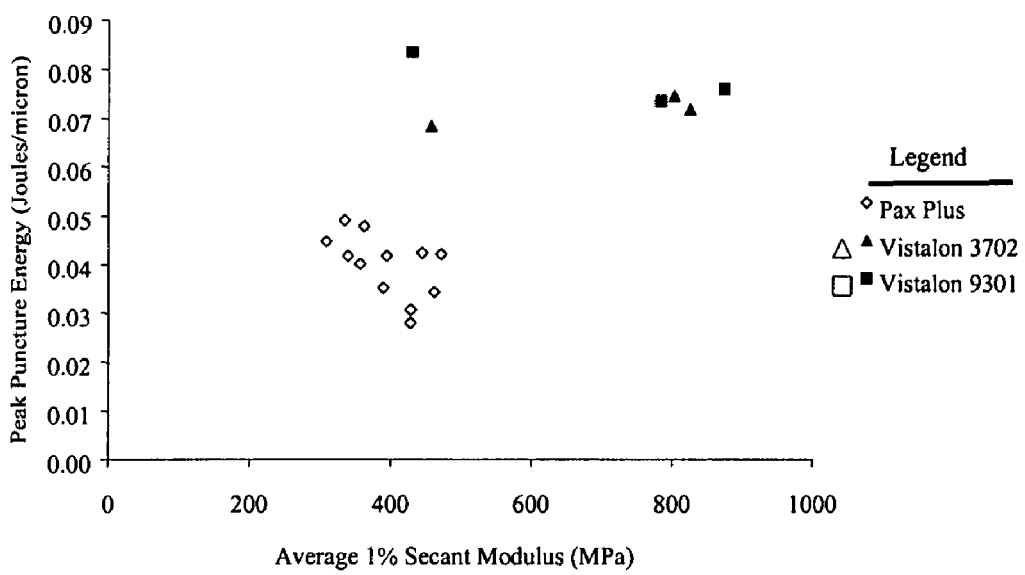
FIG. 60 is an illustration of an embodiment of the peak puncture energy of HD 7845 PE versus the average 1% secant modulus by minor component type.
Figure 61:
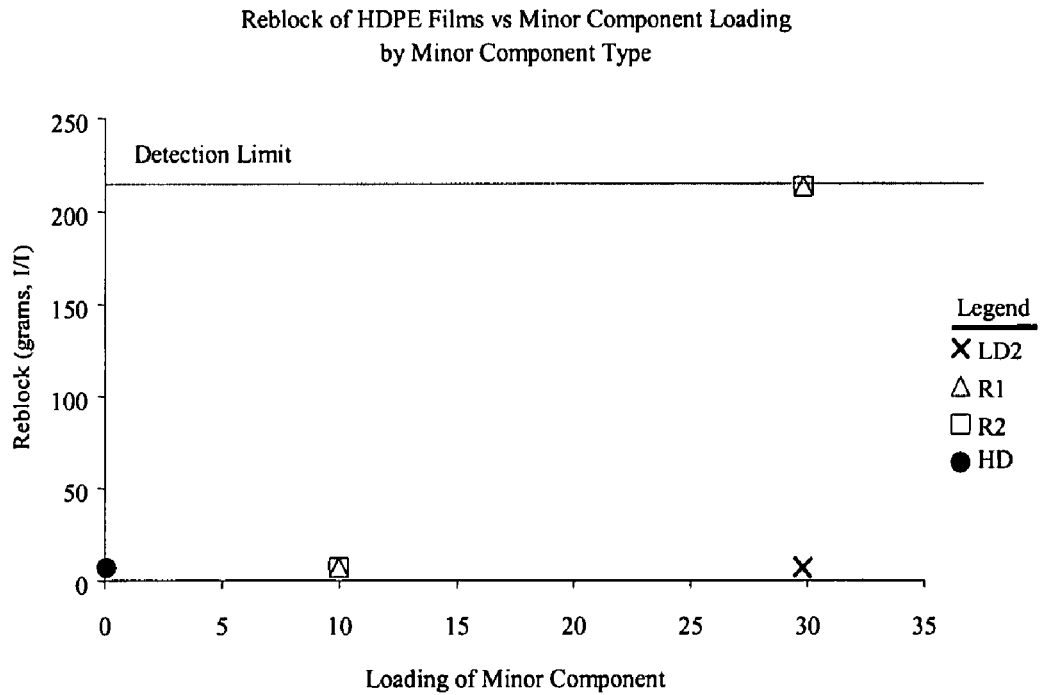
FIG. 61 is an illustration of an embodiment of the reblock of HD 7845 PE versus the minor component loading by minor component type.
Figure 62:
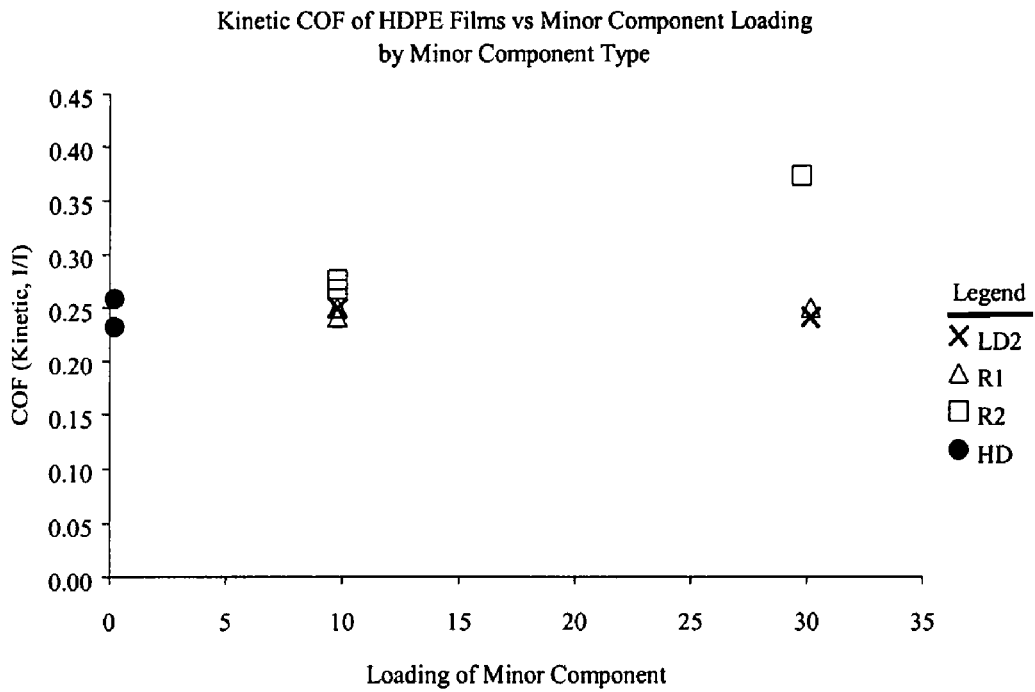
FIG. 62 is an illustration of an embodiment of the kinetic COF of HD 7845 PE versus the minor component loading by minor component type.
Figure 63:
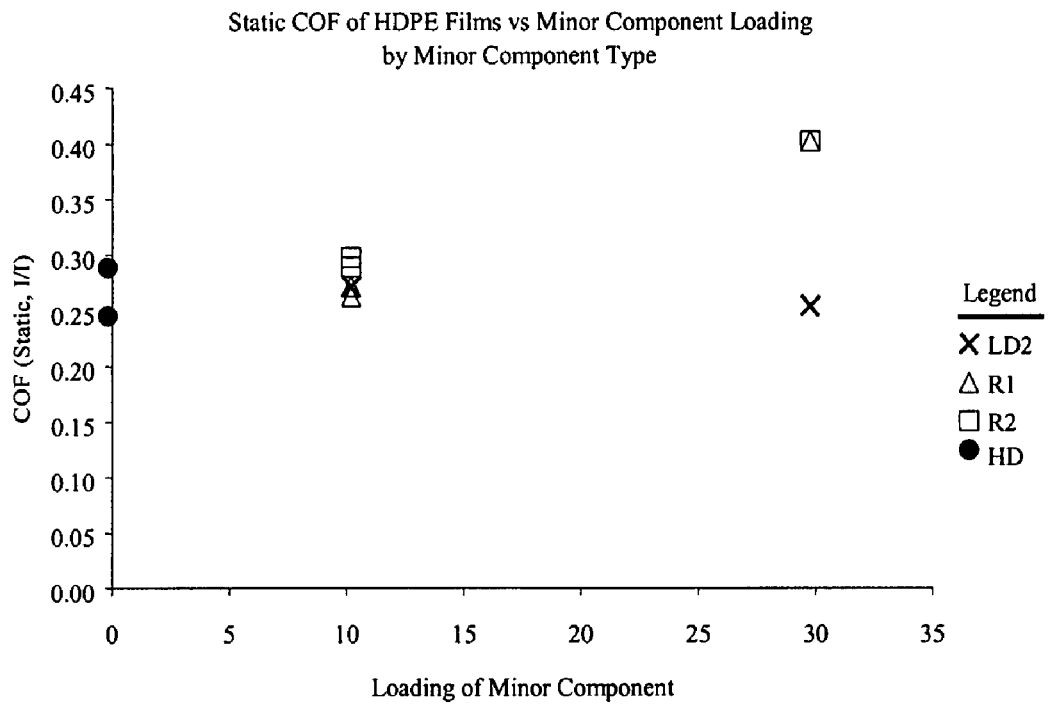
FIG. 63 is an illustration of an embodiment of the static COF of HD 7845 PE versus the minor component loading by minor component type.
Figure 64:
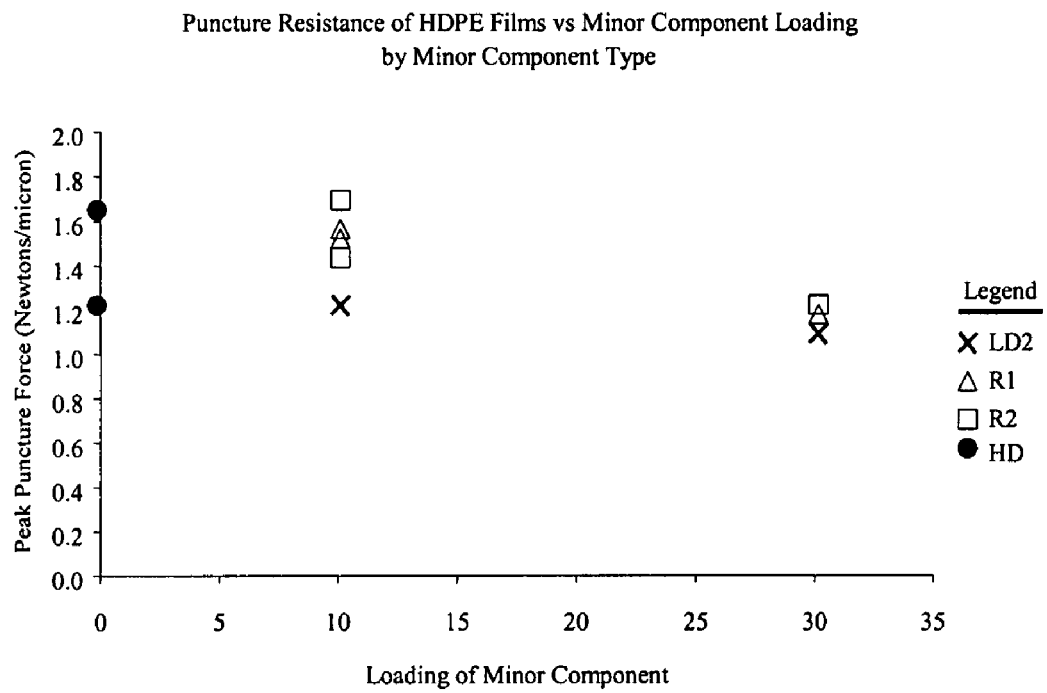
FIG. 64 is an illustration of an embodiment of the puncture resistance of HD 7845 PE versus the minor component loading by minor component type.
Figure 65:
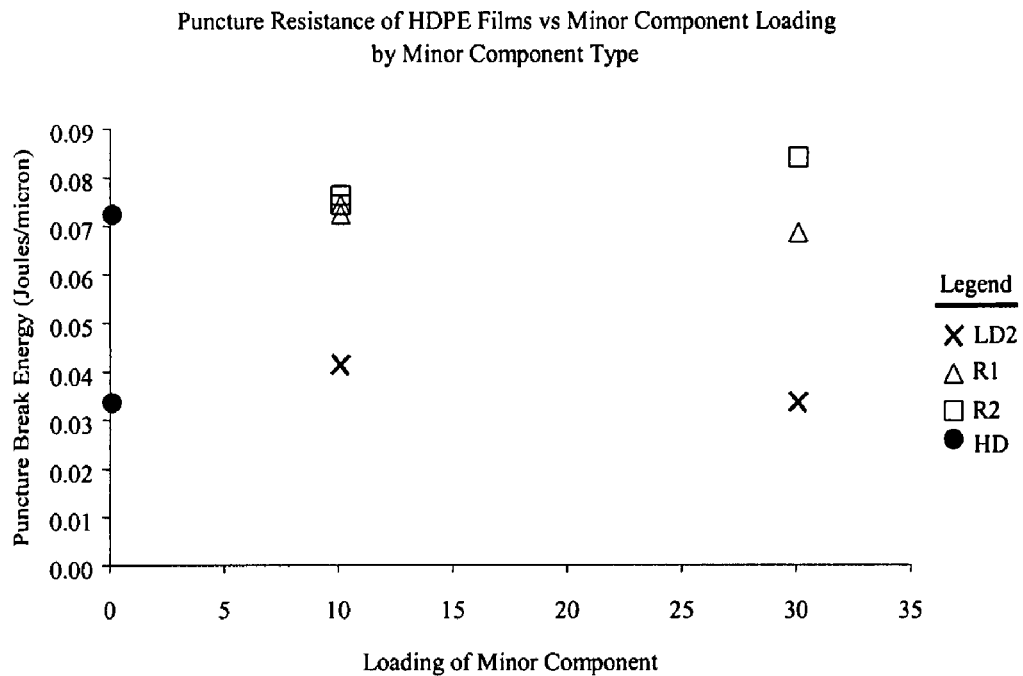
FIG. 65 is an illustration of an embodiment of the puncture break energy of HD 7845 PE versus the minor component loading by minor component type.
Figure 66:
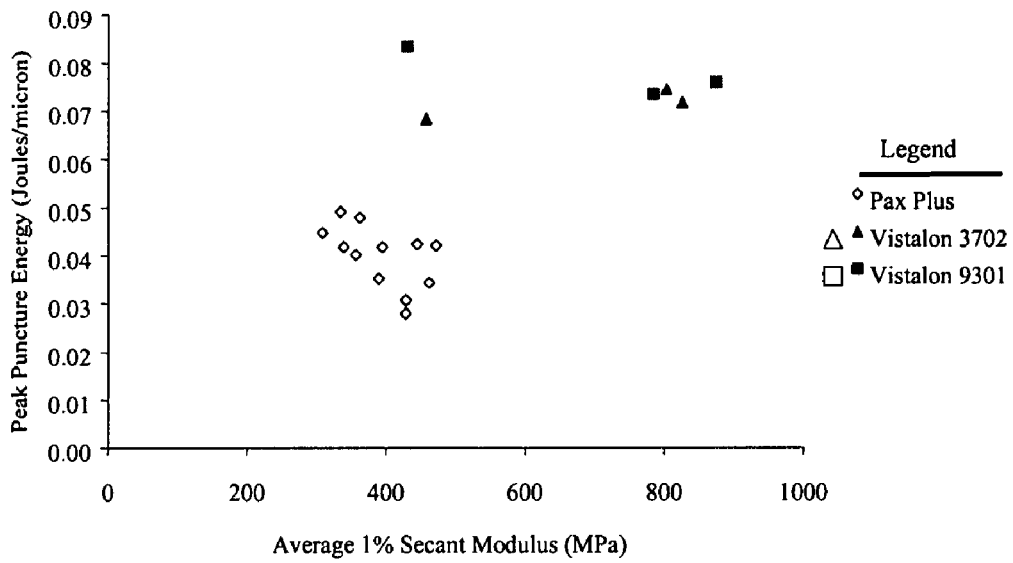
FIG. 66 is an illustration of an embodiment of the peak puncture energy of HD 7845 PE versus the 1% average secant modulus loading by minor component type.
Figure 67:
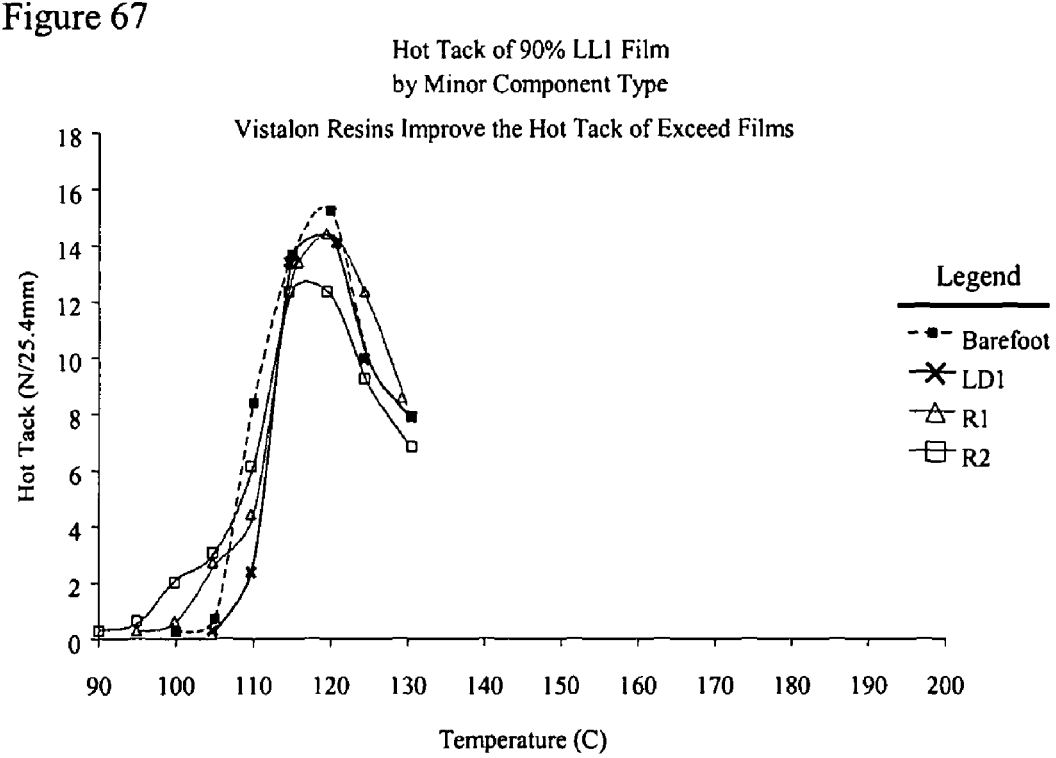
FIG. 67 is an illustration of an embodiment of the hot tack of 90% Exceed LLDPE 1018 versus temperature by minor component type.
Figure 68:
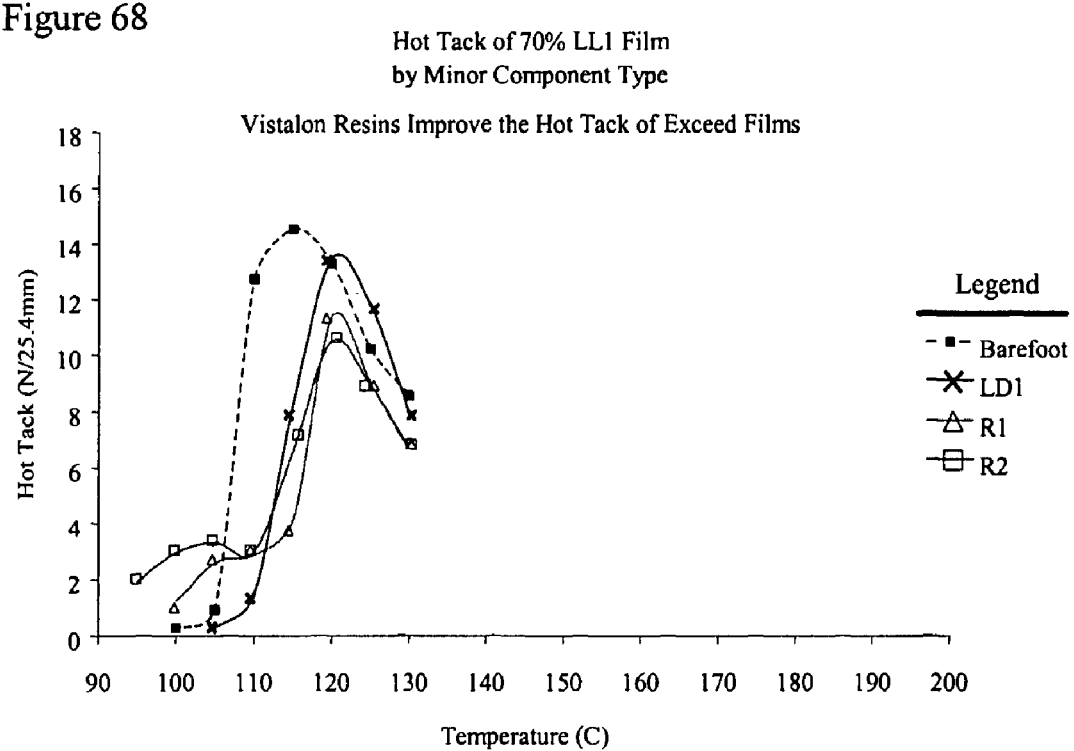
FIG. 68 is an illustration of an embodiment of the hot tack of 70% Exceed LLDPE 1018 versus temperature by minor component type.
Figure 69:
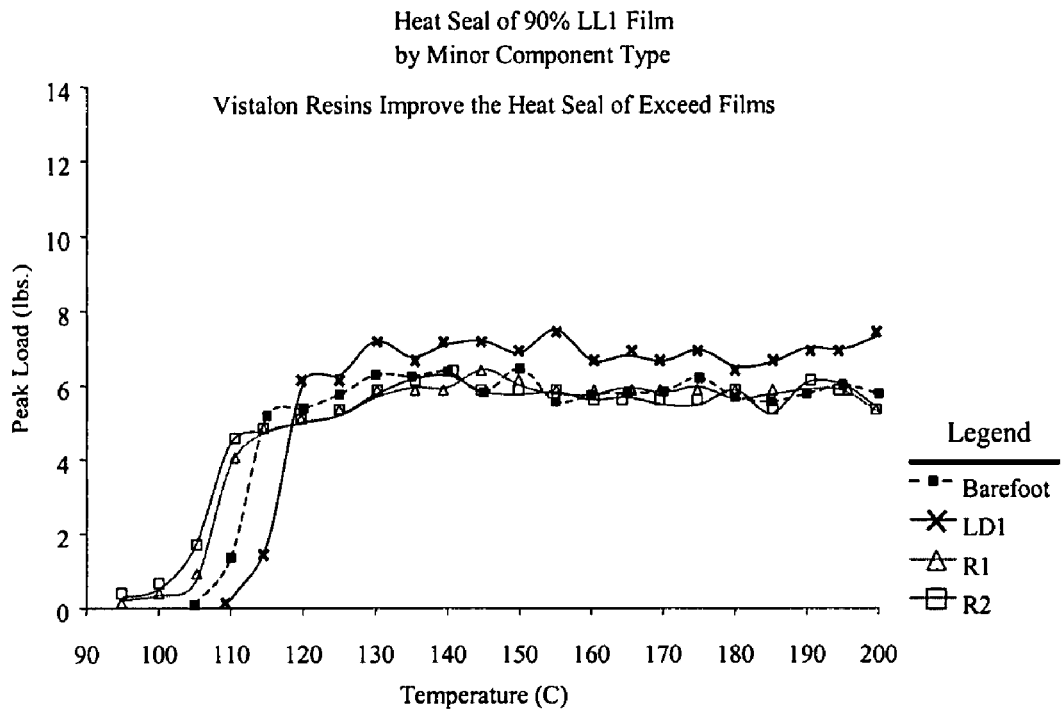
FIG. 69 is an illustration of an embodiment of the peak load of 90% Exceed LLDPE 1018 versus temperature by minor component type.
Figure 70:
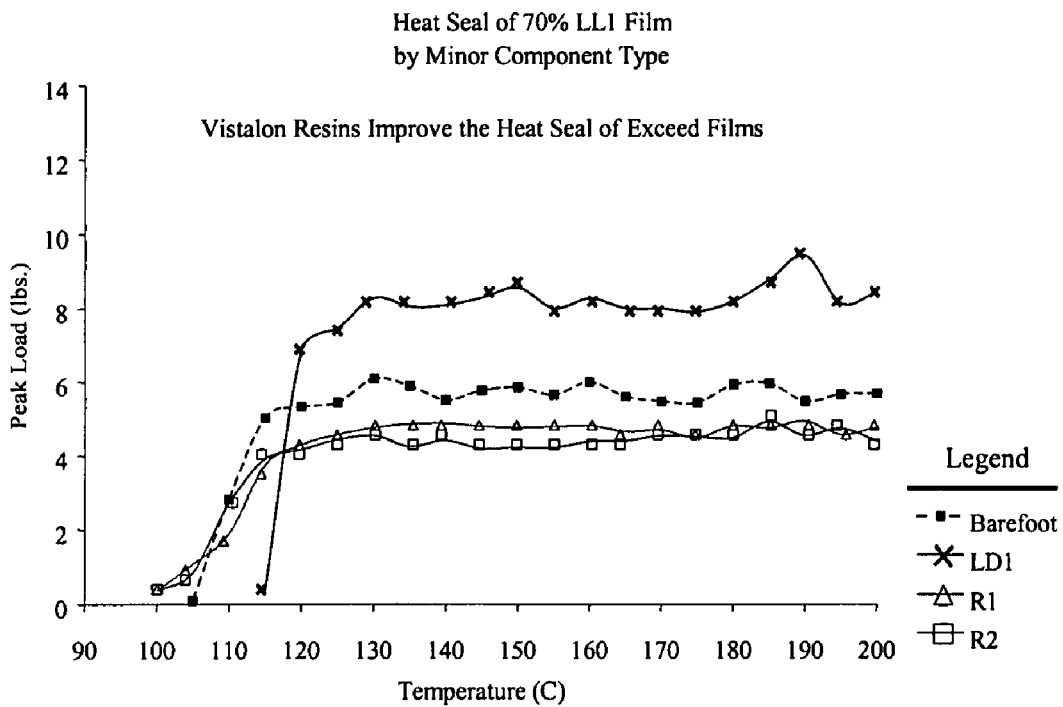
FIG. 70 is an illustration of an embodiment of the peak load of 70% Exceed LLDPE 1018 versus temperature by minor component type.
Figure 71:
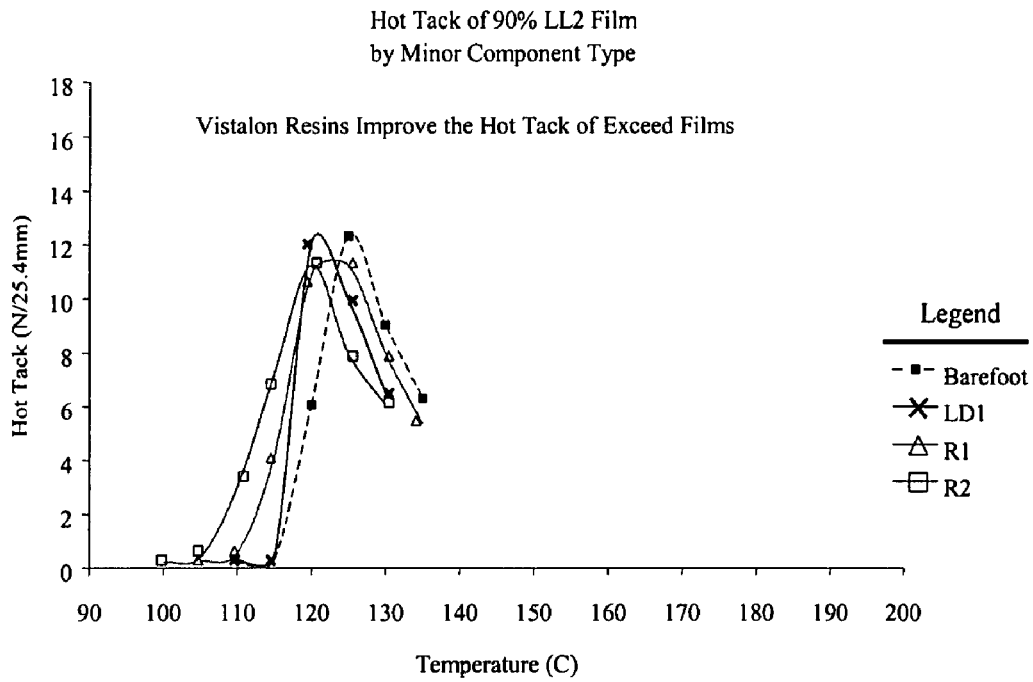
FIG. 71 is an illustration of an embodiment of the hot tack of 90% Exceed LLDPE 1327 versus temperature by minor component type.
Figure 72:
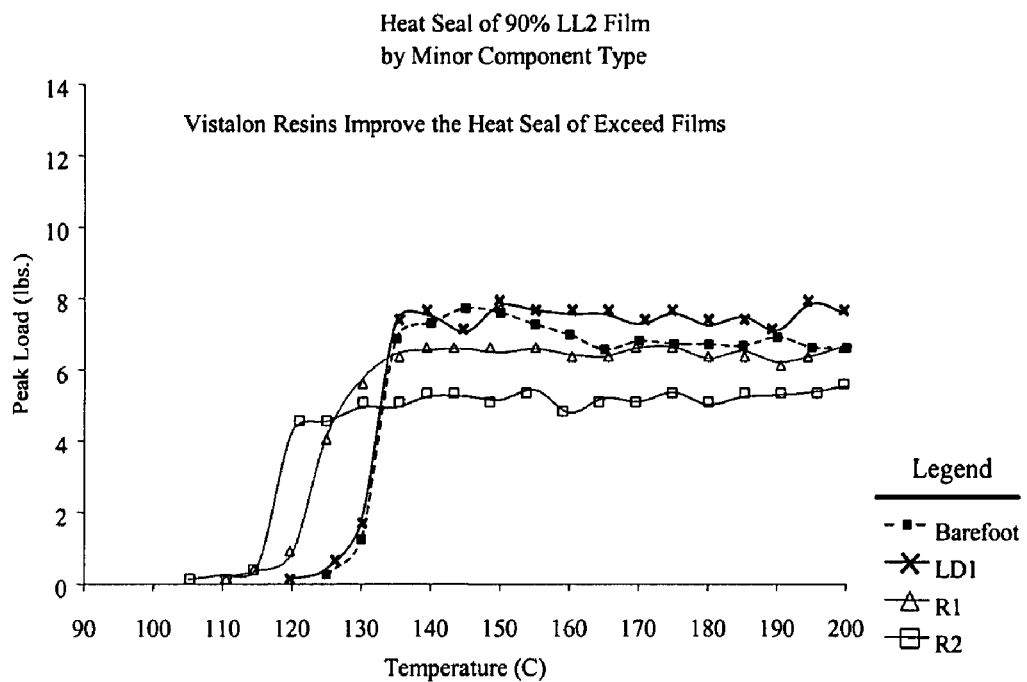
FIG. 72 is an illustration of an embodiment of the peak load of 90% Exceed LLDPE 1327 versus temperature by minor component type.
Figure 76:
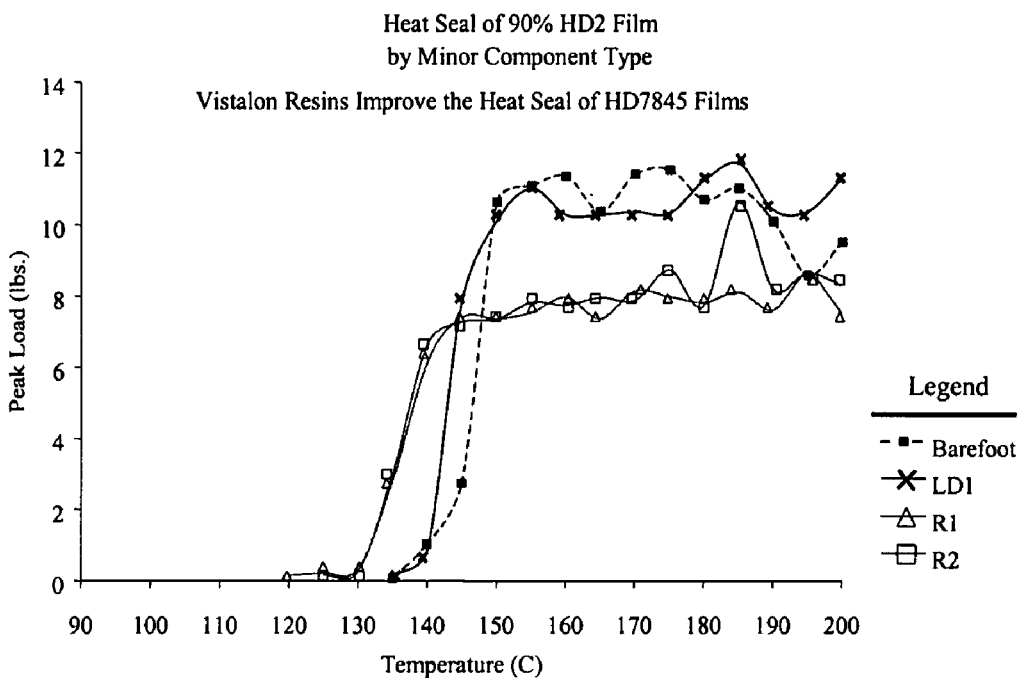
FIG. 76 is an illustration of an embodiment of the peak load of 90% HD 7845 PE versus temperature by minor component type.

With reference to Tables 1 through 10, FIGS. 1 through 76 illustrate graphical representations of various properties and combinations of various properties of the films disclosed herein. FIG. 1 is an illustration of an embodiment of the impact resistance of Exceed LLDPE 1018 versus the minor component loading by minor component type. FIG. 2 is an illustration of an embodiment of the machine-direction tear resistance of Exceed LLDPE 1018 versus the minor component loading by minor component type. FIG. 3 is an illustration of an embodiment of the transverse-direction tear resistance of Exceed LLDPE 1018 versus the minor component loading by minor component type. FIG. 4 is an illustration of an embodiment of the balance of the tear resistance of Exceed LLDPE 1018 versus the minor component loading by minor component type. FIG. 5 is an illustration of an embodiment of the haze of Exceed LLDPE 1018 versus the minor component loading by minor component type. FIG. 6 is an illustration of an embodiment of the gloss of Exceed LLDPE 1018 versus the minor component loading by minor component type. FIG. 7 is an illustration of an embodiment of the machine-direction stiffness of Exceed LLDPE 1018 versus the minor component loading by minor component type. FIG. 8 is an illustration of an embodiment of the transverse direction stiffness of Exceed LLDPE 1018 versus the minor component loading by minor component type. FIG. 9 is an illustration of an embodiment of the machine direction load bearing capability of Exceed LLDPE 1018 versus the minor component loading by minor component type. FIG. 10 is an illustration of an embodiment of the traverse direction load bearing capability of Exceed LLDPE 1018 versus the minor component loading by minor component type. FIG. 11 is an illustration of an embodiment of the machine direction load bearing capability of Exceed LLDPE 1018 versus the minor component loading by minor component type. FIG. 12 is an illustration of an embodiment of the ultimate load bearing capability of Exceed LLDPE 1018 versus the minor component loading by minor component. FIG. 13 is an illustration of an embodiment of the machine direction elongation break of Exceed LLDPE 1018 versus the minor component loading by minor component type. FIG. 14 is an illustration of an embodiment of the traverse direction tensile break of Exceed LLDPE 1018 versus the minor component loading by minor component type. FIG. 15 is an illustration of an embodiment of the traverse direction elongation break of Exceed LLDPE 1018 versus the minor component loading by minor component type. FIG. 16 is an illustration of an embodiment of the reblock of Exceed LLDPE 1018 versus the minor component loading by minor component type. FIG. 17 is an illustration of an embodiment of the kinetic COF of Exceed LLDPE 1018 versus the minor component loading by minor component type. FIG. 18 is an illustration of an embodiment of the static COF of Exceed LLDPE 1018 versus the minor component loading by minor component type. FIG. 19 is an illustration of an embodiment of the puncture resistance force of Exceed LLDPE 1018 versus the minor component loading by minor component type. FIG. 20 is an illustration of an embodiment of the puncture resistance energy of Exceed LLDPE 1018 versus the minor component loading by minor component type. FIG. 21 is an illustration of an embodiment of the average elongation at break of Exceed LLDPE 1018 versus the average Elmendorf tear by minor component type. FIG. 22 is an illustration of an embodiment of the dart drop of Exceed LLDPE 1327 versus the minor component loading by minor component type. FIG. 23 is an illustration of an embodiment of the machine direction tear of Exceed LLDPE 1327 versus the minor component loading by minor component type. FIG. 24 is an illustration of an embodiment of the transverse Elmendorf tear of Exceed LLDPE 1327 versus the minor component loading by minor component type. FIG. 25 is an illustration of an embodiment of the balance of tear resistance of Exceed LLDPE 1327 versus the minor component loading by minor component type. FIG. 26 is an illustration of an embodiment of the machine direction stiffness of Exceed LLDPE 1327 versus the minor component loading by minor component type. FIG. 27 is an illustration of an embodiment of the transverse direction stiffness of Exceed LLDPE 1327 versus the minor component loading by minor component type. FIG. 28 is an illustration of an embodiment of the machine direction 1% tensile at yield of Exceed LLDPE 1327 versus the minor component loading by minor component type. FIG. 29 is an illustration of an embodiment of the transverse direction 1% tensile at yield of Exceed LLDPE 1327 versus the minor component loading by minor component type. FIG. 30 is an illustration of an embodiment of the machine direction tensile at 200% of Exceed LLDPE 1327 versus the minor component loading by minor component type. FIG. 31 is an illustration of an embodiment of the machine direction tensile at break of Exceed LLDPE 1327 versus the minor component loading by minor component type. FIG. 32 is an illustration of an embodiment of the machine direction elongation at break of Exceed LLDPE 1327 versus the minor component loading by minor component type. FIG. 33 is an illustration of an embodiment of the transverse direction tensile at break of Exceed LLDPE 1327 versus the minor component loading by minor component type. FIG. 34 is an illustration of an embodiment of the tensile direction elongation at break of Exceed LLDPE 1327 versus the minor component loading by minor component type. FIG. 35 is an illustration of an embodiment of the reblock of Exceed LLDPE 1327 versus the minor component loading by minor component type. FIG. 36 is an illustration of an embodiment of the haze of Exceed LLDPE 1327 versus the minor component loading by minor component type. FIG. 37 is an illustration of an embodiment of the gloss of Exceed LLDPE 1327 versus the minor component loading by minor component type. FIG. 38 is an illustration of an embodiment of the 45 degree gloss of Exceed LLDPE 1327 versus the haze by minor component type. FIG. 39 is an illustration of an embodiment of the peak puncture force of Exceed LLDPE 1327 versus the minor component loading by minor component type. FIG. 40 is an illustration of an embodiment of the peak break energy of Exceed LLDPE 1327 versus the minor component loading by minor component type. FIG. 41 is an illustration of an embodiment of the draft drop of HD 7845 PE versus the minor component loading by minor component type. FIG. 42 is an illustration of an embodiment of the machine direction Elmendorf tear of HD 7845 PE versus the minor component loading by minor component type. FIG. 43 is an illustration of an embodiment of the transverse direction Elmendorf tear of HD versus the minor component loading by minor component type. FIG. 44 is an illustration of an embodiment of the balance of tear resistance of HD 7845 PE versus the minor component loading by minor component type. FIG. 45 is an illustration of an embodiment of the haze of HD 7845 PE versus the minor component loading by minor component type. FIG. 46 is an illustration of an embodiment of the 45 degree gloss of HD 7845 PE versus the minor component loading by minor component type. FIG. 47 is an illustration of an embodiment of the 45 degree gloss of HD 7845 PE versus the haze by minor component type. FIG. 48 is an illustration of an embodiment of the 1% machine direction secant modulus of HD 7845 PE versus the minor component loading by minor component type. FIG. 49 is an illustration of an embodiment of the 1% transverse direction modulus of HD 7845 PE versus the minor component loading by minor component type. FIG. 50 is an illustration of an embodiment of the balance of stiffness of HD 7845 PE versus the minor component loading by minor component type. FIG. 51 is an illustration of an embodiment of the machine direction tensile at yield of HD 7845 PE versus the minor component loading by minor component type. FIG. 52 is an illustration of an embodiment of the transverse direction tensile at yield of HD 7845 PE versus the minor component loading by minor component type. FIG. 53 is an illustration of an embodiment of the transverse direction/machine direction load bearing capability of HD 7845 PE versus the minor component loading by minor component type. FIG. 54 is an illustration of an embodiment of the transverse direction tensile at yield of HD 7845 PE versus the machine direction at yield loading by minor component type. FIG. 55 is an illustration of an embodiment of the draft drop of HD 7845 PE versus the minor component loading by minor component type. FIG. 56 is an illustration of an embodiment of the machine direction ultimate tensile of HD 7845 PE versus the minor component loading by minor component type. FIG. 57 is an illustration of an embodiment of the transverse direction ultimate tensile of HD 7845 PE versus the minor component loading by minor component type. FIG. 58 is an illustration of an embodiment of the machine direction elongation at break of HD 7845 PE versus the minor component loading by minor component type. FIG. 59 is an illustration of an embodiment of the transverse direction at break of HD 7845 PE versus the minor component loading by minor component type. FIG. 60 is an illustration of an embodiment of the peak puncture energy of HD 7845 PE versus the average 1% secant modulus by minor component type. FIG. 61 is an illustration of an embodiment of the reblock of HD 7845 PE versus the minor component loading by minor component type. FIG. 62 is an illustration of an embodiment of the kinetic COF of HD 7845 PE versus the minor component loading by minor component type. FIG. 63 is an illustration of an embodiment of the static COF of HD 7845 PE versus the minor component loading by minor component type. FIG. 64 is an illustration of an embodiment of the puncture resistance of HD 7845 PE versus the minor component loading by minor component type. FIG. 65 is an illustration of an embodiment of the puncture break energy of HD 7845 PE versus the minor component loading by minor component type. FIG. 66 is an illustration of an embodiment of the peak puncture energy of HD 7845 PE versus the 1% average secant modulus loading by minor component type. FIG. 67 is an illustration of an embodiment of the hot tack of 90% Exceed LLDPE 1018 versus temperature by minor component type. FIG. 68 is an illustration of an embodiment of the hot tack of 70% Exceed LLDPE 1018 versus temperature by minor component type. FIG. 69 is an illustration of an embodiment of the peak load of 90% Exceed LLDPE 1018 versus temperature by minor component type. FIG. 70 is an illustration of an embodiment of the peak load of 70% Exceed LLDPE 1018 versus temperature by minor component type. FIG. 71 is an illustration of an embodiment of the hot tack of 90% Exceed LLDPE 1327 versus temperature by minor component type. FIG. 72 is an illustration of an embodiment of the peak load of 90% Exceed LLDPE 1327 versus temperature by minor component type.

Figure 73:
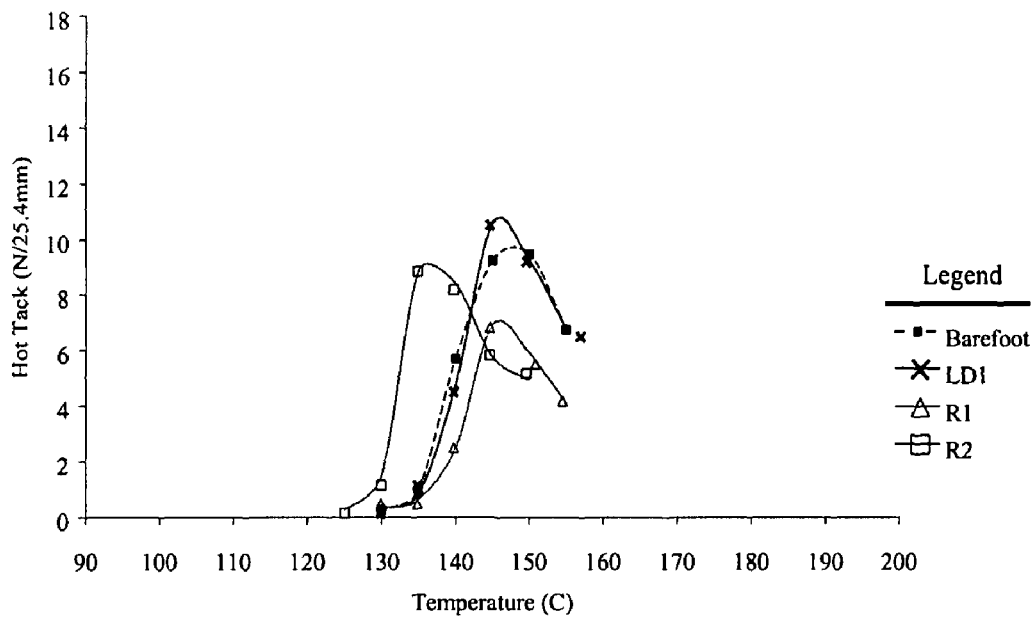
FIG. 73 is an illustration of an embodiment of the hot tack of 90% HD 7845 PE versus temperature by minor component type.
Figure 74:
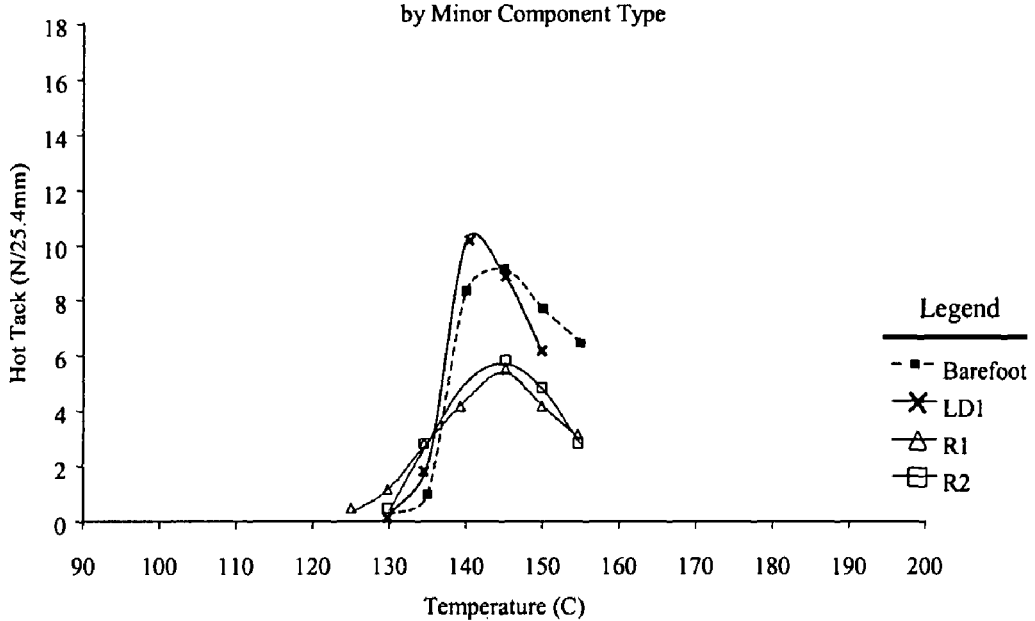
FIG. 74 is an illustration of an embodiment of the hot tack of 70% HD 7845 PE versus temperature by minor component type.
Figure 75:
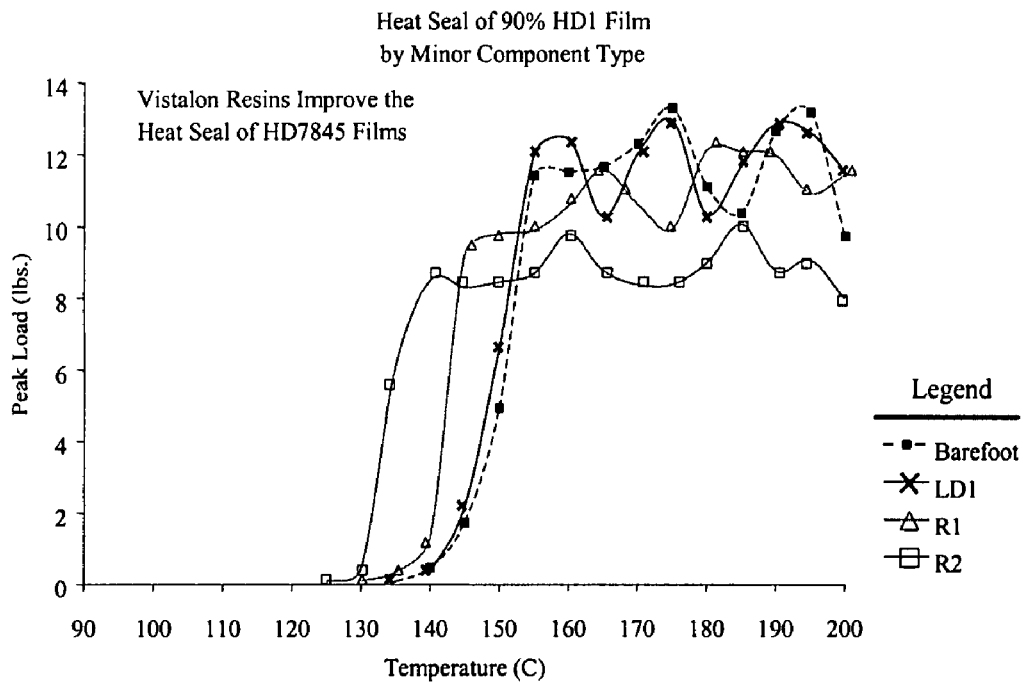
FIG. 75 is an illustration of an embodiment of the peak load of 90% HD 7845 PE versus temperature by minor component type.

FIG. 73 is an illustration of an embodiment of the hot tack of 90% HD 7845 PE versus temperature by minor component type. FIG. 74 is an illustration of an embodiment of the hot tack of 70% HD 7845 PE versus temperature by minor component type. FIG. 75 is an illustration of an embodiment of the peak load of 90% HD 7845 PE versus temperature by minor component type. FIG. 76 is an illustration of an embodiment of the peak load of 90% HD 7845 PE versus temperature by minor component type.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A composition comprising:
   (a) from about 11 to about 35 weight % of a first component, wherein said first component is a mEPDM low density modifier having a branching index of at least 0.7, and an Mw of 500,000 g/mole or more, said mEDPM low density modifier comprising:
      i) 10 to 30 weight percent semi crystalline minor component having 40 to 77 weight percent ethylene derived units; 0 to 10 weight percent diene derived units; and alpha-olefin derived units having 3 to 10 carbon atoms making up the remainder of the minor component; and
      ii) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and
         wherein the mEPDM has a diene content of at least 0.5 weight percent based on the total weight of the mEPDM; and
   (b) from about 89 to about 65 weight % of a second component, wherein said second component is selected from a mLLDPE having a density ranging from about 0.910 to about 0.940 g/cc, an HDPE having a density ranging from about 0.940 g/cc and less than 0.970 g/cc, or a mixture thereof;
   wherein the weight % is based on the total weight of said first component and said second component.

2. A film having at least one layer, the at least one layer comprising the composition of claim 1.

3. A process for making an article, the process comprising:
   (a) forming a blend:
      (i) from about 11 to about 35 weight % a first component, wherein said first component is a mEPDM low density modifier having a branching index of at least 0.7, and an Mw of 500,000 g/mole or more, said mEDPM low density modifier comprising:
         A) 10 to 30 weight percent semi crystalline minor component having 40 to 77 weight percent ethylene derived units; 0 to 10 weight percent diene derived units; and alpha-olefin derived units having 3 to 10 carbon atoms making up the remainder of the minor component; and
         B) 70 to 90 weight percent component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component; and
         wherein the mEPDM has a diene content of at least 0.5 weight percent based on the total weight of the mEPDM; and
      (ii) from about 89 to about 65 weight % of a second component, wherein said second component is selected from a mLLDPE having a density ranging from about 0.910 to about 0.940 g/cc, an HDPE having a density ranging from about 0.940 g/cc and less than 0.970 g/cc, or a mixture thereof;
      wherein the weight % is based on the total weight of said first component and said second component; and
   (b) forming the blend of (a) into the article.

4. The process according to claim 3, wherein the forming of the article comprises one of blow molding, cast molding, injection molding, roto-molding or sheet thermoforming.

5. A composition comprising:
   (a) from about 5 to about 50 weight % of a first component, wherein said first component is a mEDPM low density modifier having a branching index of at least 0.7; and
   (b) from about 95 to about 50 weight % of a second component, wherein said second component is selected from a mLLDPE having a density ranging from about 0.910 to about 0.940 g/cc, an HDPE having a density ranging from about 0.940 g/cc and less than 0.970 g/cc, or a mixture thereof;
   wherein the weight % is based on the total weight of said first component and said second component;
   wherein the mEDPM low density modifier comprises a metallocene catalyzed reactor-blended polymer having an Mw of 500,000 g/mole or more and comprising: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

6. A film comprising at least one layer, the at least one layer comprising the composition of claim 5.

7. A process for making an article, the process comprising:
   (a) blending
      (i) from about 5 to about 50 weight % of a first component, wherein said first component is a mEDPM low density modifier having a branching index of at least 0.7; and
      (ii) from about 95 to about 50 weight % of a second component, wherein said second component is selected from a mLLDPE having a density ranging from about 0.910 to about 0.940 g/cc, an HDPE having a density ranging from about 0.940 g/cc and less than 0.970 g/cc, or a mixture thereof;
   wherein the weight % is based on the total weight of said first component and said second component, and
      wherein the mEDPM low density modifier comprises a metallocene catalyzed reactor-blended polymer having an Mw of 500,000 g/mole or more and comprising: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend; and (b) forming the blend of (a) into the article.

8. A process for making a composition, the process comprising: blending
  (a) from about 5 to about 50 weight % pelletized mEPDM low density modifier having a branching index of at least 0.7, and an Mw of 500,000 g/mole or more; and
  (b) from about 95 weight % to about 50 weight % of a first mPE;
  wherein the weight % is based on the total weight of the mEPDM and the mPE, and wherein the mEPDM low density modifier comprises a metallocene catalyzed reactor-blended polymer comprising: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity the major component is less than on fourth the viscosity of the minor component, and wherein the blend has a dime content of at least 0.5 weight percent based on the total weight of the blend.

9. The process of claim 8, wherein the pelletized mEPDM and the first mPE are blended within a hopper of a blown-film extruder.

10. The process of claim 8, wherein the pelletized mEPDM and the first mPE are compounded to form a rubber modified resin and the process further includes blending the rubber modified resin and a second mPE.

11. A process for making a composition, the process comprising blending:
  (a) from about 11 to about 35 weight % of a mEPDM low density modifier having a branching index of at least 0.7, and an Mw of 500,000 g/mole or more; and
  (b) from about 89 to about 65 weight % of a PE;
  wherein the low density modifier and the PE are blended during the polymerization of the low density modifier, and
  wherein the mEPDM low density modifier comprises a metallocene catalyzed reactor-blended polymer comprising: a) 10 to 30 weight percent semi crystalline minor component having 65 to 75 weight percent ethylene derived units; 0 to 10 weight percent dime derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha of derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

12. A process for making a composition, the process comprising blending:
  (a) from about 11 to about 35 weight % of a in EPDM low density modifier having a branching index of at least 0.7, and an Mw of 500,000 g/mole or more; and
  (b) from about 89 to about 65 weight % of a PE;
  wherein the low density modifier and the PE are blended during the polymerization of the PE, and
  wherein the mEPDM low density modifier comprises a metallocene catalyzed reactor-blended polymer comprising: a) 1.0 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component and wherein the blend has a diene content of at least 0.5 weight percent based on the total weight of the blend.

13. A process for making a film, the process comprising:
(1) blending:
  (a) from about 5 to about 95 weight % pelletized mEPDM having a branching index of at least 0.7, and an Mw of 500,000 g/mole or more; and
  (b) from about 95 weight % to about 5 weight % of a PE; to form a mEPDM-PE blend; and
(2) forming the mEPDM-PE blend into a mEPDM-PE masterbatch:
(3) blending:
  (a) from about 5 to about 95 weight 9 mEPDM-PE masterbatch; and
  (b) from about 95 weight % to about 5 weight % of a first mPE; to form a mEPDM-mPE blend comprising:
  (a) from about 5 to about 50 weight % pelletized mEPDM; and
  (b) from about 95 weight % to about 50 weight % of a first mPE;
  to form a mEPDM-mPE blend; and
(4) forming the mEPDM-mPE blend into the film;
  wherein the weight % is based on the total weight of the mEPDM and the mPE, and wherein the mEPDM low density modifier comprises a metallocene catalyzed reactor-blended polymer comprising: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

14. A composition comprising:
(a) from about 10 to about 35 weight % of a mEPDM low density modifier having a branching index of at least 0.7, and an Mw of 500,000 g/mole or more;
(b) from about 80 to about 20 weight % of a mLLDPE having a density ranging from about 0.910 to about 0.940 g/cc;
(c) from about 10 to about 40 weight % (based upon the weight of the blend) of a high density ethylene polymer having a density of 0.940 g/cc or more; and wherein the weight % is based on the total weight of the composition, and
wherein the mEPDM low density modifier comprises a metallocene catalyzed reactor-blended polymer comprising: a) 10 to 30 weight percent semi crystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component, and wherein the blend has a diene content of at least 0.5 weight percent based on the total weight of the blend.

15. A film having at least one layer, the at least one layer comprising the composition of claim 14.

16. A method of forming the film of claim 2, 6, or 15, into an article, comprising:
(a) contacting a first film portion with a second film portion; and
(b) allowing the first film portion and the second film portion to become adhered together,
wherein the first film portion and the second film portion may be part of the same or different film.

17. An article comprising the film of claim 2, 6, or 15, wherein the article is selected from the group consisting of 50 gallon trash bags, 30 gallon trash bags, 20 gallon trash bags, 10 gallon trash bags, adult care items, agricultural films, agriculture, aluminum foil laminates, aluminum laminates, asphalt films, auto panel films, bacon packaging, bag-in-box liquid packaging applications, bakery goods, banana film, batch inclusion bags, bathroom tissue, biaxially oriented films, biaxially oriented polypropylene (BOPP) films, biscuits, boutique bags, bread bags, bubble wrap, building film, cake mix packaging, can liners, candy, cardboard liquid packaging, carpet film, carry-out sacks, cement packaging, cereal liners, cheese packaging, chemical, clarity films, coffee packaging, coin bags, collation shrink films, confections, construction, construction sheeting, construction film, consumer goods, consumer trash bags, continuous wrap, convenience packaging, cosmetics packaging, counter bags, cover film, cup/cutlery overwrap, deli and bakery wrap, deli wrap, detergent packaging, diaper backsheet, disposables (diapers, sanitary, etc), dry food packaging, dry grains, dunnage bags, fertilizer, fish & seafood, food packaging, foundation film, freeze-dried products, freezer films, frozen food, fruit juice packaging, furniture bags, garden sacks, garment bags, geomembrane liners, gloves, gravel, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware, industrial liner, industrial trash bags, industrial spare parts, instore self-service, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat, meat packaging, medical, medical products, medical draping, medium duty bags, merchandise bags, metallized laminates, military hardware, milk bags, milk powder packaging, modified atmosphere packaging, mulch film, multiwall sack liner, newspaper bags, nose tissue, olive oil packaging, oriented films, oriented polypropylene (OPP) films, packaging of beans, packaging of cementations products such as grout, packaging of dry and sharp products, pallet shrink film, pancake batter bags, paper handkerchief overwrap, paper laminates, pasta, pasta overwrap, pelletized polymer, perfumes, personal care, pesticides, pharmaceuticals packaging, pigments, pizza, polyamide laminates, polyester laminates, potato products, potting soil, pouches, poultry, poultry packaging, pre-formed pouches, produce, produce bags, produce packaging, rack and counter film, ready made food packaging, ready meals, retortable products, rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil, soups, spices, stand up pouches, storage bags, stretch films, stretch hood, stretch wrap, supermarket bags, surgical garb, take out food bags, textile refuse, thermoformed containers, thin films, tissue overwrap, tissues, tomato ketchup packaging, trash bags, t-shirt bags, vacuum skin packaging, vegetables, vertical form-fill-and-seal (FFS) packaging, water bottle packaging, wet-pack, and wrap.

* * * * *